(12) United States Patent
Knecht et al.

(10) Patent No.: US 12,358,222 B2
(45) Date of Patent: Jul. 15, 2025

(54) ADDITIVE MANUFACTURING APPARATUS, SYSTEM, AND METHOD

(71) Applicant: PAXIS LLC, Crystal Lake, IL (US)

(72) Inventors: Frederick Knecht, Woodstock, IL (US); Michael G. Littrell, Crystal Lake, IL (US)

(73) Assignee: PAXIS LLC, Crystal Lake, IL (US)

( * ) Notice: Subject to any disclaimer, the term of this patent is extended or adjusted under 35 U.S.C. 154(b) by 573 days.

(21) Appl. No.: 17/403,410

(22) Filed: Aug. 16, 2021

(65) Prior Publication Data

US 2022/0048250 A1    Feb. 17, 2022

Related U.S. Application Data

(60) Provisional application No. 63/065,682, filed on Aug. 14, 2020.

(51) Int. Cl.
    *B29C 64/282* (2017.01)
    *B29C 64/209* (2017.01)
    (Continued)

(52) U.S. Cl.
    CPC .......... *B29C 64/282* (2017.08); *B29C 64/209* (2017.08); *B29C 64/286* (2017.08);
    (Continued)

(58) Field of Classification Search
    CPC ... B29C 64/209; B29C 64/218; B29C 64/282; B29C 64/286; B29C 64/264;
    (Continued)

(56) References Cited

U.S. PATENT DOCUMENTS 4,865,029 A    9/1989  Pankratov et al.
4,915,402 A    4/1990  Brinker
(Continued)

FOREIGN PATENT DOCUMENTS

CN    101489766 A    7/2009
CN    101554778 A    10/2009
(Continued)

OTHER PUBLICATIONS

Mar. 24, 2017—(WO) International Search Report & Written Opinion—App PCT/US16/61649.
(Continued)

*Primary Examiner* — Philip C Tucker
*Assistant Examiner* — Jimmy R Smith, Jr.
(74) *Attorney, Agent, or Firm* — Banner & Witcoff, Ltd.

(57) ABSTRACT

A deposition mechanism is configured for producing a three-dimensional object within a build area using a flowable material in a layer-by-layer technique, and includes an exposure device configured for emitting electromagnetic waves, the exposure device having an array of outlets configured for emitting electromagnetic waves toward an exposure site to solidify applied flowable material to produce the three-dimensional object, and a lens array positioned between the outlets of the exposure device and the exposure site and configured to focus the electromagnetic waves exiting the outlets toward the exposure site, where the lens array includes a plurality of ball lenses, each ball lens configured to reduce an image formed by the electromagnetic waves passing through the respective ball lens. The exposure device may include circuit boards, each having a plurality of light emitting devices connected thereto, and optical fibers extending from the light emitting devices to form the array of outlets.

24 Claims, 48 Drawing Sheets

(51) Int. Cl.
*B29C 64/286* (2017.01)
*B33Y 30/00* (2015.01)
*G02B 3/00* (2006.01)
*G02B 19/00* (2006.01)

(52) U.S. Cl.
CPC ............ *B33Y 30/00* (2014.12); *G02B 3/0037* (2013.01); *G02B 19/0009* (2013.01)

(58) Field of Classification Search
CPC ..... B29C 64/268; B29C 64/277; B33Y 30/00; G02B 19/0009; G02B 19/0066; B22F 12/60; B22F 12/63
See application file for complete search history.

(56) References Cited

U.S. PATENT DOCUMENTS

| | | | |
|---|---|---|---|
| 5,248,456 A | 9/1993 | Evans, Jr. et al. | |
| 5,263,130 A | 11/1993 | Pomerantz et al. | |
| 5,902,537 A | 5/1999 | Almquist et al. | |
| 6,207,097 B1 | 3/2001 | Iverson | |
| 7,195,472 B2 | 3/2007 | John | |
| 7,229,201 B2 | 6/2007 | Krupa et al. | |
| 7,296,990 B2 | 11/2007 | Devos et al. | |
| 7,357,629 B2 | 4/2008 | Weiskopf et al. | |
| 7,438,846 B2 | 10/2008 | Johr | |
| 7,467,837 B2 | 12/2008 | Silverbrook | |
| 7,806,493 B2 | 10/2010 | Gazeau et al. | |
| 8,252,223 B2 | 8/2012 | Medina et al. | |
| 8,317,508 B2 | 11/2012 | Bokodi et al. | |
| 8,696,971 B2 | 4/2014 | Boot et al. | |
| 8,961,167 B2 | 2/2015 | Swanson et al. | |
| 9,011,136 B1 | 4/2015 | Uzan et al. | |
| 9,254,535 B2 | 2/2016 | Buller et al. | |
| 9,481,133 B2 | 11/2016 | Carbone et al. | |
| 9,597,840 B2 | 3/2017 | Bradway et al. | |
| 10,022,911 B2 | 7/2018 | Yasukochi | |
| 10,343,390 B2 | 7/2019 | Knecht et al. | |
| 10,618,270 B2 | 4/2020 | Knecht et al. | |
| 10,703,085 B2 | 7/2020 | Yasukochi | |
| 10,717,263 B2 | 7/2020 | Knecht et al. | |
| 10,780,497 B2 | 9/2020 | Ng et al. | |
| 10,792,868 B2 | 10/2020 | Ermoshkin et al. | |
| 11,192,302 B2 | 12/2021 | Rademacher et al. | |
| 2004/0233271 A1* | 11/2004 | Nojima | B41J 2/451 347/238 |
| 2005/0280185 A1 | 12/2005 | Russell et al. | |
| 2008/0109102 A1 | 5/2008 | Sutcliffe | |
| 2008/0169589 A1 | 7/2008 | Sperry et al. | |
| 2009/0309267 A1 | 12/2009 | Boot et al. | |
| 2010/0177151 A1 | 7/2010 | Thompson et al. | |
| 2010/0191360 A1 | 7/2010 | Napadensky et al. | |
| 2012/0045617 A1 | 2/2012 | Yasukochi | |
| 2012/0313294 A1 | 12/2012 | Vermeer et al. | |
| 2014/0070463 A1 | 3/2014 | Boot et al. | |
| 2014/0268077 A1 | 9/2014 | Melde et al. | |
| 2014/0271328 A1 | 9/2014 | Burris et al. | |
| 2014/0353878 A1 | 12/2014 | Driessen et al. | |
| 2015/0016556 A1 | 1/2015 | Chen et al. | |
| 2015/0084240 A1 | 3/2015 | Shuck et al. | |
| 2015/0110910 A1 | 4/2015 | Hartmann et al. | |
| 2015/0165556 A1 | 6/2015 | Jones et al. | |
| 2015/0273762 A1 | 10/2015 | Okamoto | |
| 2015/0360419 A1 | 12/2015 | Willis et al. | |
| 2015/0375458 A1 | 12/2015 | Chen et al. | |
| 2016/0158962 A1 | 6/2016 | Balistreri et al. | |
| 2016/0236422 A1 | 8/2016 | Sakura | |
| 2016/0311023 A1 | 10/2016 | Schirtzinger et al. | |
| 2016/0311163 A1 | 10/2016 | Yasukochi | |
| 2016/0311166 A1 | 10/2016 | Campbell | |
| 2017/0015059 A1 | 1/2017 | Lewicki | |
| 2017/0136688 A1 | 5/2017 | Knecht et al. | |
| 2017/0136701 A1 | 5/2017 | Knecht et al. | |
| 2017/0192377 A1 | 7/2017 | Batchelder et al. | |
| 2017/0239885 A1* | 8/2017 | Knecht | B29C 64/129 |
| 2017/0239932 A1 | 8/2017 | Knecht et al. | |
| 2017/0271843 A1* | 9/2017 | Batchelder | B29C 64/135 |
| 2017/0348902 A1 | 12/2017 | Ohara et al. | |
| 2018/0141126 A1 | 5/2018 | Buller et al. | |
| 2018/0141268 A1 | 5/2018 | Holt | |
| 2018/0253080 A1 | 9/2018 | Meess et al. | |
| 2018/0264724 A1 | 9/2018 | Feller et al. | |
| 2019/0022937 A1 | 1/2019 | Stelter et al. | |
| 2019/0126347 A1 | 5/2019 | Roman et al. | |
| 2019/0308371 A1 | 10/2019 | Knecht et al. | |
| 2020/0298440 A1 | 9/2020 | Aoto et al. | |
| 2021/0187829 A1 | 6/2021 | Ji | |
| 2021/0358342 A1 | 11/2021 | Liu et al. | |

FOREIGN PATENT DOCUMENTS

| | | |
|---|---|---|
| CN | 102049858 A | 5/2011 |
| CN | 103921444 A | 7/2014 |
| EP | 3085516 A1 | 10/2016 |
| EP | 3374163 A1 | 9/2018 |
| JP | S61118273 A | 6/1986 |
| JP | H05237942 A | 9/1993 |
| JP | H0768647 A | 3/1995 |
| JP | 2000211031 A | 8/2000 |
| JP | 2003251480 A | 9/2003 |
| JP | 2004122501 A | 4/2004 |
| JP | 2009543717 A | 12/2009 |
| JP | 2011098484 A | 5/2011 |
| JP | 201533771 A | 2/2015 |
| JP | 2015120261 A | 7/2015 |
| KR | 20100080298 A | 7/2010 |
| RU | 2569516 C2 | 11/2015 |
| RU | 2610505 C2 | 2/2017 |
| RU | 2640551 C1 | 1/2018 |
| RU | 2642654 C1 | 1/2018 |
| WO | 9623647 A2 | 8/1996 |
| WO | 2012143786 A1 | 10/2012 |
| WO | 2014006399 A1 | 1/2014 |
| WO | 2014013312 A1 | 1/2014 |
| WO | 2015093032 A1 | 6/2015 |
| WO | 2015116639 A1 | 8/2015 |
| WO | 2015177598 A1 | 11/2015 |
| WO | 2016030405 A1 | 3/2016 |
| WO | 2016124432 A1 | 8/2016 |
| WO | 2017083734 A1 | 5/2017 |
| WO | 2018208799 A1 | 11/2018 |

OTHER PUBLICATIONS

Sep. 12, 2018—(WO) International Search Report and Written Opinion—App PCT/US18/31630.
Mar. 19, 2019—(AU) Office Action—App 2016353326.
Apr. 2, 2019—(CA) Office Action—App 3,005,229.
Jul. 19, 2019—(EESR) Supplementary European Search Report & Opinion—App EP16865142.
Aug. 5, 2019—(WO) International Search Report & Written Opinion—App PCT/US19/26026.
Jul. 30, 2019—(JP) First Office Action—App 2018-544773.
Nov. 12, 2019—(CN) OA—App 2019110701451180—Eng Tran.
Nov. 26, 2019—(JP) Office Action—App 2014-174966—Eng Tran.
Jan. 1, 2020—(KR) OA—App 10-2018-7016314.
Feb. 10, 2020—(EP) Office Action—App 16865142.0—1017.
Jan. 24, 2020—(CA) Office Action—App 3,005,2293.
Mar. 11, 2020—(AU) Full Examination Report—App 2016353326.
Apr. 9, 2020—(AU) Notice of Allowance—App 2016353326.
Jun. 9, 2020—(US) Notice of Allowance—U.S. Appl. No. 15/589,609.
Jul. 26, 2020—(KR) Notice of Allowance—App 10-2018-7016314.
Aug. 5, 2020—(CN) Office Action—App 2016800757907 (trans).
Aug. 25, 2020—(CA) Notice of Allowance—App 3005229.
Sep. 1, 2020—(JP) Notice of Allowance—App 2018-544773.
Sep. 22, 2020—(IN) Office Action—App 201817019642.
Sep. 24, 2020—(EP) Examination Report—App 16865142.0.
Nov. 20, 2020—(KR) Notice of Allowance—App 10-2020-7025007.
Nov. 20, 2020 (EP) Communication—App 19781703.3.

(56) References Cited

OTHER PUBLICATIONS

Feb. 7, 2021—(CN) Notice of Allowance—App 201680075790.7 (Eng Trans).
Mar. 26, 2021—(EP) Examination Report—App 16865142.0-1017.
Apr. 27, 2021—(JP) Office Action—App 2020-054655.
May 19, 2021—(RU) Office Action—App 2020136323/05 (Eng Trans).
May 19, 2021—(RU) Search Report—App 2020136323 (Eng Trans).
Jun. 10, 2021 (SG) Examination Report—App 11202009858U (Eng).
Jul. 28, 2021—(AU) Examination Report No. 1—App 2019247458 (Eng Trans).
Nov. 19, 2021—(CA) Examination Search Report—App 3,096,390.
Aug. 11, 2021—(IL) Office Action—App No. 259305.
Dec. 7, 2021—(JP) Office Action—App 2020-554499.
Dec. 20, 2021—(CN) Fisrt Office Action—App 201980037625.6.
Jan. 4, 2022—(EP) Supplementary European Search Report and Search Opinion—App. No. 19781708.3.
Nov. 22, 2021—(WO) ISR & WO—WO2022036325A1.
Oct. 7, 2024—European Search Report and Written Opinion—PCT/US2021/046162.
Jul. 10, 2024—(EP) Extended Search Report—App 201856866.5.
Jul. 30, 2024—(EP) Office Action Communication—App 21856866.5.

\* cited by examiner

ADDITIVE MANUFACTURING APPARATUS, SYSTEM, AND METHOD

CROSS-REFERENCE TO RELATED APPLICATION

This application is a non-provisional of, and claims priority to, U.S. Provisional Application No. 63/065,682, filed Aug. 14, 2020, which prior application is incorporated by reference herein in its entirety.

TECHNICAL FIELD

The present disclosure generally relates to an apparatus and system for producing a three-dimensional object in an additive manufacturing technique and method for operating the apparatus and system, and more specifically, to an apparatus, system, and method that uses a roller in contact with a flowable resin or other precursor material in building each layer of the object.

BACKGROUND

Current techniques for additive manufacturing of three-dimensional objects (e.g., stereolithography, 3-D printing, etc.) can produce excellent quality products with high fidelity, but such techniques have significant limitations. Typically, such techniques work in one of three ways: (a) continually polymerizing layers at or near the surface of liquid resin contained in a stationary vat, (b) continually polymerizing layers of resin at or near the bottom of a stationary vat of resin, or (c) continually polymerizing layers of resin that has been jetted downward by one or more single-nozzle or multi-nozzle print heads. Such techniques are generally limited to small sizes, with maximum sizes for various machines being only a few feet in width or length or even smaller. This limits the size of objects that can be produced. Jet-based processes have significant size limitations and waste a great deal of resin material during production.

Vat-based techniques require that the object is partially or fully submerged during manufacturing, thus requiring the vat of resin to be maintained at a significant volume. This can be costly, as such resins are typically very expensive, and maintenance of resin vats in a collection of machines can be extremely costly. The size of the vat also limits the size of the object that can be produced, as noted above. Additionally, submersion of the object during production often results in cavities within the object being filled with uncured liquid resin, which must be drained, often requiring drilling a drainage hole and subsequent repair. Further, the vat generally only contains a single resin, so manufacture of multi-material parts is not possible. Vat-based techniques have production speed limitations as well, due to wait times for new resin to flow over or under the areas to be polymerized.

The present disclosure seeks to overcome certain of these limitations and other drawbacks of existing apparatuses, systems, and methods, and to provide new features not heretofore available.

BRIEF SUMMARY

Aspects of the disclosure relate to a deposition mechanism configured for producing a three-dimensional object within a build area using a flowable material in a layer-by-layer technique. The deposition mechanism includes a carriage configured for movement relative to the build area, an applicator configured for applying the flowable material at an application site within the build area to produce the three-dimensional object, and an exposure device configured for emitting electromagnetic waves. The exposure device has an array of outlets configured for emitting electromagnetic waves toward an exposure site within the build area to solidify applied flowable material applied by the applicator to produce the three-dimensional object. The deposition mechanism also includes a lens array positioned between the outlets of the exposure device and the exposure site and configured to focus the electromagnetic waves exiting the outlets toward the exposure site, where the lens array includes a plurality of ball lenses, each ball lens configured to reduce an image formed by the electromagnetic waves passing through the respective ball lens.

According to one aspect, the applicator includes a supply of the flowable material mounted on the carriage and a roller in communication with the supply of the flowable material and rotatably mounted on the carriage, wherein the roller is configured for rotating to carry the flowable material to the application site for application to produce the three-dimensional object. In one configuration, the exposure device further has a second array of outlets configured for emitting the electromagnetic waves to an initial exposure site located adjacent to the roller within the supply of the flowable material, to at least partially solidify a layer of the flowable material, and the roller is configured for rotating to carry the layer of the flowable material to the application site. In this configuration, the deposition mechanism may further include a second lens array positioned between the second array of outlets of the exposure device and the initial exposure site and configured to focus the electromagnetic waves exiting the second array of outlets toward the initial exposure site, where the second lens array comprises a plurality of second ball lenses, each second ball lens configured to reduce an image formed by the electromagnetic waves passing through the respective second ball lens. In another configuration, the ball lenses are configured to focus the electromagnetic waves together along a line extending along a length of the roller at the exposure site.

According to another aspect, each ball lens is configured to focus the electromagnetic waves emitted by a plurality of the outlets and to reduce the image formed by the electromagnetic waves emitted by the plurality of the outlets.

According to a further aspect, the plurality of ball lenses includes a first ball lens configured to focus the electromagnetic waves emitted by a first plurality of the outlets and to reduce the image formed by the electromagnetic waves emitted by the first plurality of the outlets, and a second ball lens configured to focus the electromagnetic waves emitted by a second plurality of the outlets and to reduce the image formed by the electromagnetic waves emitted by the second plurality of the outlets. In one configuration, the first ball lens and the second ball lens are offset from each other in both an x-direction and a y-direction with respect to the deposition mechanism.

According to yet another aspect, the plurality of ball lenses are arranged in a first row and a second row, such that the ball lenses in the first row are offset from the ball lenses in the second row in an x-direction with respect to the deposition mechanism. In one configuration, the ball lenses in the first row are also offset from the ball lenses in the second row in a y-direction with respect to the deposition mechanism. In another configuration, the ball lenses in the first row and the ball lenses in the second row are configured to focus the electromagnetic waves together along a line.

According to a still further aspect, the deposition mechanism also includes a lens mounting structure configured for mounting the plurality of ball lenses, the lens mounting structure including one or more bodies having a plurality of receivers each receiving one of the ball lenses and a plurality of conduits aligned with the receivers. The conduits extend through the one or more bodies from the outlets to the receivers, such that the electromagnetic waves emitted by the outlets travel through the conduits to the ball lenses received in the receivers.

Additional aspects of the disclosure relate to a deposition mechanism configured for producing a three-dimensional object within a build area using a flowable material in a layer-by-layer technique. The deposition mechanism includes a carriage configured for movement relative to the build area, an applicator configured for applying the flowable material at an application site within the build area to produce the three-dimensional object, and an exposure device configured for emitting electromagnetic waves. The exposure device has an array of outlets configured for emitting electromagnetic waves toward an exposure site within the build area to solidify applied flowable material applied by the applicator to produce the three-dimensional object, and the exposure device includes a plurality of circuit boards, each circuit board having a plurality of light emitting devices connected thereto, and a plurality of optical fibers extending from the plurality of light emitting devices to form the array of outlets. The deposition mechanism further includes a supporting structure mounting the plurality of circuit boards on the carriage.

According to one aspect, the deposition mechanism further includes one or more reducing lenses positioned between the outlets of the exposure device and the exposure site and configured to focus the electromagnetic waves exiting the outlets toward the exposure site, where the one or more reducing lenses are further configured to reduce an image formed by the electromagnetic waves passing through the reducing lens.

According to another aspect, the supporting structure includes a support beam having a plurality of slots distributed along a length of the support beam, each slot receiving one of the circuit boards.

According to a further aspect, the supporting structure includes first and second support beams each having a plurality of slots distributed along a length thereof, where the slots of the first and second support beams are arranged in pairs, such that each circuit board is received in one of the pairs of the slots.

According to yet another aspect, each of the circuit boards has a first terminal on a front surface and a second terminal on a rear surface opposite the front surface, and the support structure mounts the circuit boards such that the first terminals of the circuit boards contact the second terminals of adjacent circuit boards to electrically connect the circuit boards together.

According to a still further aspect, the exposure device has a second array of outlets configured for emitting electromagnetic waves toward a second exposure site to partially solidify the flowable material prior to application by the applicator to produce the three-dimensional object. The exposure device further includes a plurality of second circuit boards, each second circuit board having a plurality of second light emitting devices connected thereto, and a plurality of second optical fibers extending from the plurality of second light emitting devices to form the second array of outlets. The deposition mechanism also includes a second supporting structure mounting the plurality of second circuit boards on the carriage.

According to another aspect, each circuit board further includes an arm connected to the circuit board and extending from the circuit board, and a holder connected to the arm, each holder having a slot, where the slots of the holders hold exit ends of the plurality of optical fibers.

Further aspects of the disclosure relate to an assembly for use with a deposition mechanism configured for producing a three-dimensional object within a build area using a flowable material in a layer-by-layer technique, as well as a deposition mechanism including such an assembly. The assembly includes an exposure device configured for emitting electromagnetic waves, the exposure device having an array of outlets configured for emitting electromagnetic waves toward an exposure site to solidify applied flowable material to produce the three-dimensional object, and a lens array positioned between the outlets of the exposure device and the exposure site and configured to focus the electromagnetic waves exiting the outlets toward the exposure site, where the lens array includes a plurality of ball lenses, each ball lens configured to reduce an image formed by the electromagnetic waves passing through the respective ball lens. The exposure device includes a plurality of circuit boards, each circuit board having a plurality of light emitting devices connected thereto, and a plurality of optical fibers extending from the plurality of light emitting devices to form the array of outlets. The ball lenses are configured to focus the electromagnetic waves together along a line at the exposure site.

According to one aspect, the assembly further includes a lens mounting structure configured for mounting the plurality of ball lenses, the lens mounting structure including one or more bodies having a plurality of receivers each receiving one of the ball lenses and a plurality of conduits aligned with the receivers. The conduits extend through the one or more bodies from the outlets to the receivers, such that the electromagnetic waves emitted by the outlets travel through the conduits to the ball lenses received in the receivers.

According to another aspect, the assembly further includes a supporting structure mounting the plurality of circuit boards, the supporting structure including first and second support beams each having a plurality of slots distributed along a length thereof, where the slots of the first and second support beams are arranged in pairs, such that each circuit board is received in one of the pairs of the slots.

According to a further aspect, the assembly further includes a roller in configured for rotating to carry the flowable material to an application site for application to produce the three-dimensional object, wherein the line extends proximate an outer surface of the roller and along a length of the roller.

Still further aspects of the disclosure relate to an assembly for use with a deposition mechanism configured for producing a three-dimensional object within a build area using a flowable material in a layer-by-layer technique, as well as a deposition mechanism including such an assembly. The assembly includes an exposure device configured for emitting electromagnetic waves, the exposure device having an array of outlets configured for emitting electromagnetic waves toward an exposure site within the build area to solidify applied flowable material to produce the three-dimensional object, and one or more reducing lenses positioned between the outlets of the exposure device and the exposure site and configured to focus the electromagnetic waves exiting the outlet toward the exposure site, where the one or more reducing lenses are further configured to reduce an image formed by the electromagnetic waves passing through the reducing lens.

Yet additional aspects of the disclosure relate to an assembly for use with a deposition mechanism configured for producing a three-dimensional object within a build area using a flowable material in a layer-by-layer technique, as well as a deposition mechanism including such an assembly. The assembly includes an exposure device configured for emitting electromagnetic waves, the exposure device having one or more outlets configured for emitting electromagnetic waves toward an exposure site within the build area to solidify applied flowable material to produce the three-dimensional object, where the exposure device comprises a plurality of circuit boards, each circuit board having one or more light emitting devices connected thereto, such that the light emitting devices are configured to emit electromagnetic waves through the one or more outlets. The assembly also includes a supporting structure mounting the plurality of circuit boards.

Other aspects of the disclosure relate to an apparatus including a deposition mechanism according to any aspects described above and a support assembly having a build platform with the build area defined adjacent to the build platform. The apparatus may further include a track extending proximate to the build area, where the carriage of the deposition mechanism is connected to the track and is configured to travel along the track adjacent to the build area for building the object.

Other aspects of the disclosure relate to a method of operating a deposition mechanism as disclosed herein, or an apparatus including such a deposition mechanism, which includes operating the deposition mechanism to produce a three-dimensional object using a flowable resin or other flowable material.

Other aspects of the disclosure relate to a method of producing a three-dimensional object using a flowable resin or other flowable material by operating a deposition mechanism as disclosed herein, or an apparatus including such a deposition mechanism, to apply and at least partially solidify the flowable material to form the object.

Other features and advantages of the disclosure will be apparent from the following description taken in conjunction with the attached drawings.

BRIEF DESCRIPTION OF THE DRAWINGS

To understand the present invention, it will now be described by way of example, with reference to the accompanying drawings in which.

DETAILED DESCRIPTION

Figure 1:
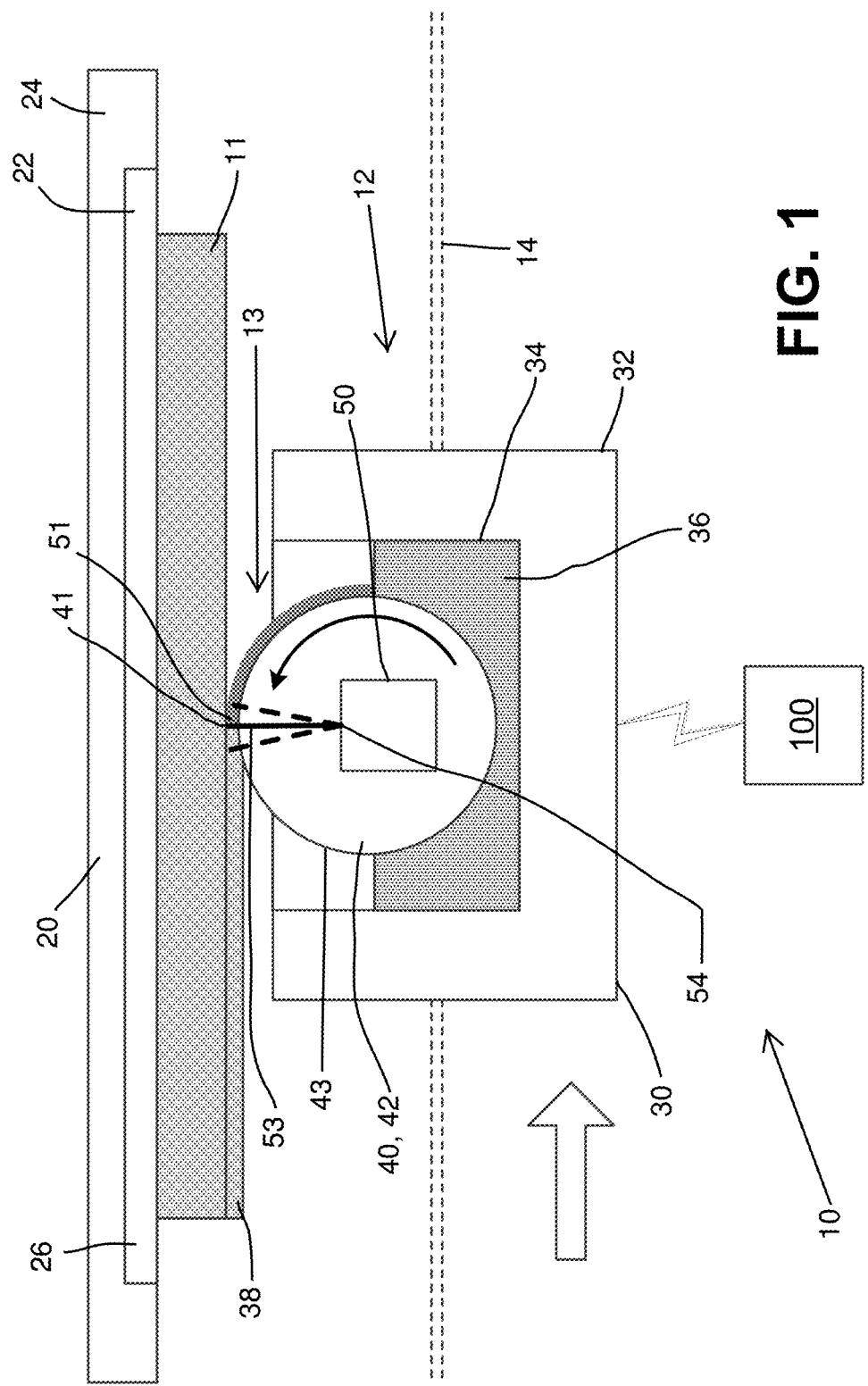
FIG. 1 is a side schematic view of one embodiment of a system and apparatus for producing a three-dimensional object in operation, according to aspects of the disclosure.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

In general, the disclosure relates to systems, apparatuses, and methods for producing three-dimensional objects in a layer-by-layer technique, such as additive manufacturing, 3-D printing, stereolithography, or other rapid prototyping techniques. Referring first to FIG. 1, there is schematically shown an example embodiment of a system 10 that includes a manufacturing apparatus 12 and a computer controller 100 in communication with one or more components of the apparatus 12 and configured for controlling operation of the apparatus 12 and/or the components thereof to manufacture an object 11. The apparatus 12 includes a support assembly 20 for supporting the object 11 within a build area 13 during manufacturing, a track 14 extending through the build area 13, and a material deposition mechanism 30 mounted on the track 14 and configured for producing the object 11 within the build area 13 through layer-by-layer application of a material. The material applied by the deposition mechanism 30 may be any flowable material (e.g., liquids, powders or other particulate solids, and combinations thereof) that are capable of being solidified to manufacture the object 11, such as by polymerization, phase change, sintering, and other techniques or combinations of such techniques. In one example, the material may be or include a resin that can be polymerized by exposure to electromagnetic waves such as light (visible, IR, or UV). When using a resin-based material for manufacturing, the deposition mechanism 30 may be referred to as a "resin deposition mechanism". FIGS. 3A-4, 6-13, and 18-27 illustrate additional schematic and/or structural embodiments of the system 10 and apparatus 12 and/or methods and configurations for operation of the system 10 and apparatus 12. Consistent reference numbers are used throughout this description to refer to structurally or functionally similar or identical components throughout the drawing figures, and it is understood that features and aspects of some embodiments that have already been described in sufficient detail may not be specifically re-described with respect to each embodiment for the sake of brevity.

Production of objects 11 through additive manufacturing often involves the production of support structure, which is formed during manufacturing and supports the object 11 during manufacturing, to be removed later. Such support structure can be formed of the same or a different material from the desired final portions of the object 11. Removal of such support structures can be accomplished using mechanical means (e.g., separation, breakage, machining), solvent-based means (e.g., use of a water-soluble polymer that can be washed away), or other means. Any support structure manufactured along with an object 11 as described herein will be considered to be part of the "object" as defined herein.

The support assembly 20 generally includes at least a build platform 22 that is configured to support the object 11 within the build area 13 during manufacturing. The build area 13 is defined in the area adjacent to the build platform 22, which is immediately below the build platform 22 in the embodiment of FIG. 1. The support assembly 20 in FIG. 1 includes a support platform 24 that is movable in the vertical (z) direction and supports a removable insert 26 that defines the build platform 22. The insert 26 may be removably connected to the support assembly 20 in certain embodiments, such as by application of vacuum suction. It is also understood that the object 11 may be removed from the build platform 22 without removal of the build platform 22, and that the build platform 22 may include no removable structure in other embodiments. Additionally, in one embodiment, the support assembly 20 and the track 14 may be partially or completely modular. This permits ease of build-out and modification of the entire apparatus 12 as desired. This also permits assembling or disassembling the apparatus 12 to move it into or out of a room, even if the apparatus 12 is significantly larger than the door to the room, which can be an issue with current stereolithography machines.

FIG. 1 schematically illustrates an embodiment of the deposition mechanism 30, which generally includes a carriage 32 engaged with the track 14 and configured for movement along the track 14 and through the build area 13, a supply 34 of a flowable material 36 mounted on or otherwise operably connected to the carriage 32, an applicator 40 in communication with the supply 34 of the flowable material 36 and configured to apply the flowable material 36 to an application site 41 within the build area 13, and an exposure device 50 configured for emitting electromagnetic waves to solidify the applied material 36 to form the object 11. The application site 41 is generally defined as the area where the material 36 contacts the deposition surface, i.e., the build platform 22 or the surface of the object 11. Various embodiments of the deposition mechanism 30 are described herein, both schematically and with regard to specific structural embodiments.

The carriage 32 is configured to move along the track 14 to move the deposition mechanism 30 through the build area 13 during manufacturing. The track 14 is generally configured for guiding the carriage 32 of the deposition mechanism 30 through the build area 13 for creation of the object 11. The track 14 and the carriage 32 may have complementary engaging structure to permit movement of the carriage 32 along the track 14. For example, the track 14 may include two parallel beams, and the carriage 32 and the track 14 may have complementary gear surfaces (not shown) that allow the carriage 32 to roll along the beams by rotation of the gear surfaces on the carriage 32. The carriage 32 may be powered for movement in various embodiments, such as by wheels or gear arrangements. In other embodiments, the power for movement may be supplied by external mechanisms which may or may not be incorporated into the track 14, such as chains, cables, belts, sprockets, pistons, etc. The speed of the carriage 32 may be adjusted depending on the properties of the material 36, as materials 36 with different viscosities and/or solidification rates may benefit from faster or slower drive speeds. The carriage 32 may be configured to support other components of the deposition mechanism 30, such that the other components move with the carriage 32. For example, in the embodiments of FIG. 1, the carriage 32 supports at least the applicator 40, the exposure device 50, and the material supply 34. It is understood that these embodiments are depicted schematically and the carriage 32 may support additional components as well, including the controller 100 and/or other components not pictured. The carriage 32 may be configured for modular connection of components as well, as described elsewhere herein. The controller 100 may be configured to control the operation, speed, elevation, and other aspects of the carriage 32 and the manufacturing process. In one embodiment, numerous parameters may be determined prior to the commencement of the manufacturing process and/or prior to a single pass and executed by the controller 100. Such parameters may be manually determined, automatically determined, or a combination of the same. For example, before a pass is made the layer thickness, the build direction, the build speed, the roller direction and speed, the material-to-roller communication level (determined based on the viscosity of the material 36), and the power output of the exposure device 50 may be determined, and the deposition mechanism 30 may be located to a predetermined starting (registration) position.

Figure 4:
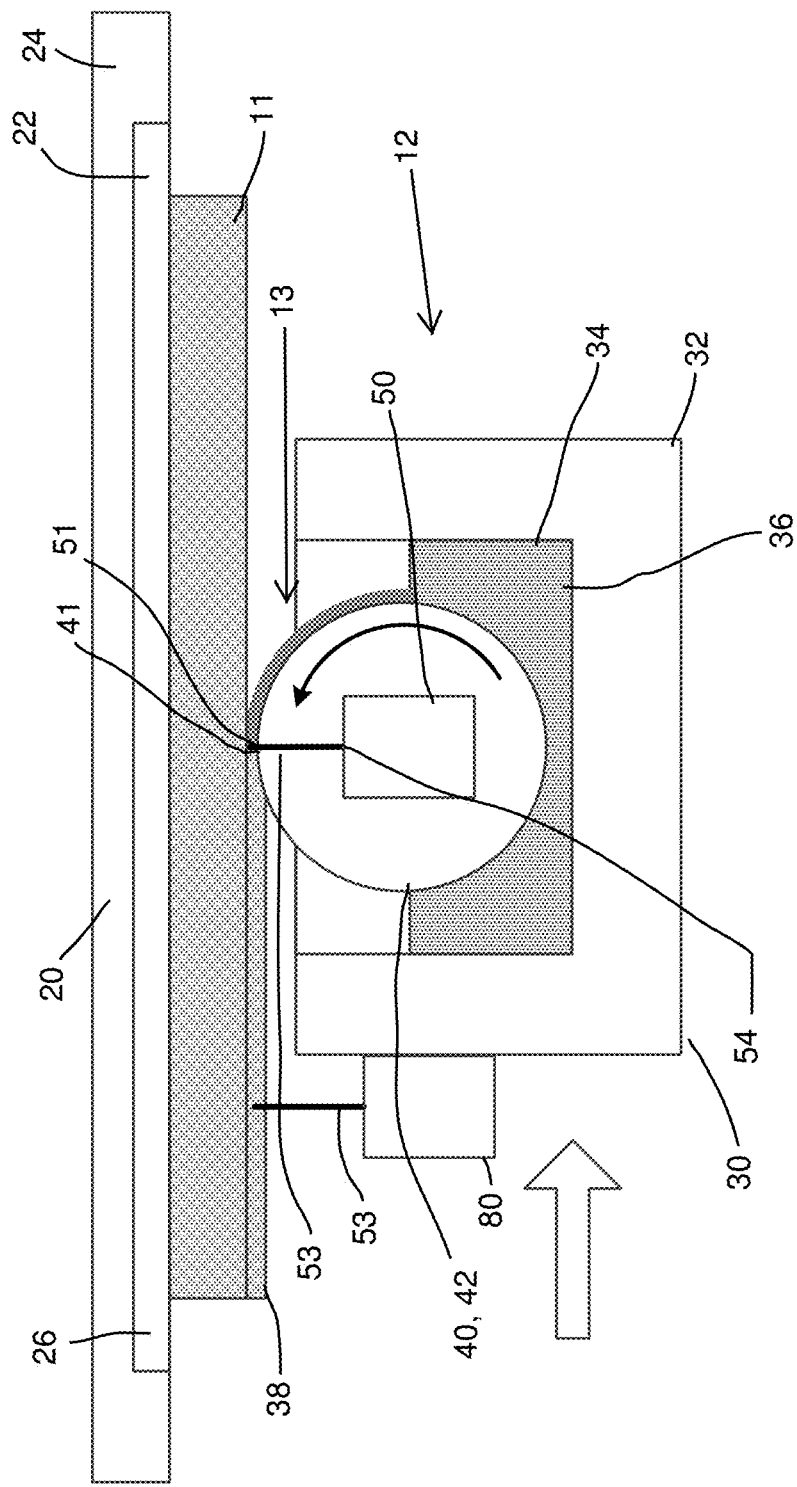
FIG. 4 is a side schematic view of the apparatus of FIG. 1, further including a secondary exposure device.
Figure 24:
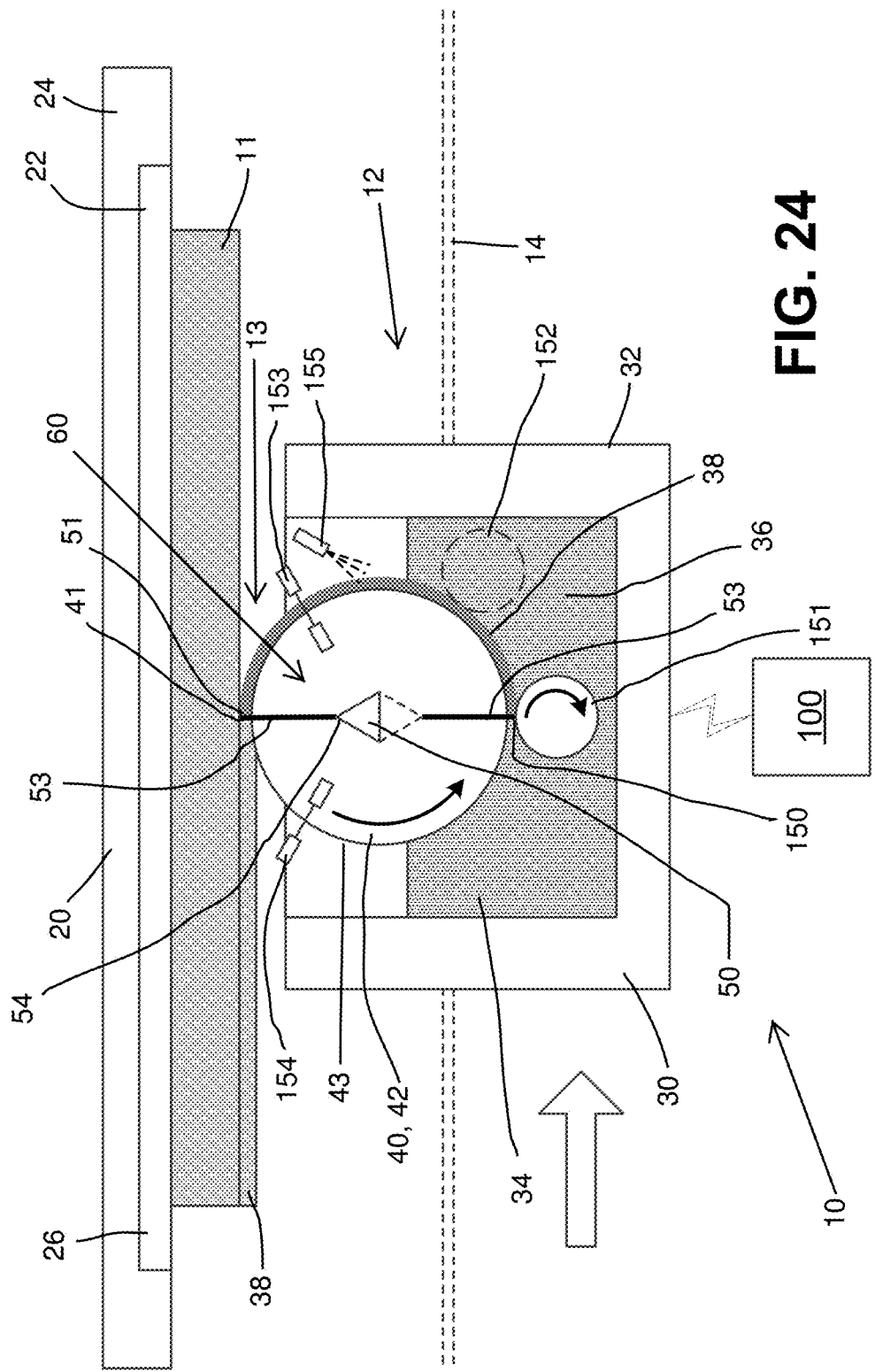
FIG. 24 is a side schematic view of another embodiment of a system and apparatus for producing a three-dimensional object in operation, according to aspects of the disclosure.
Figure 25:
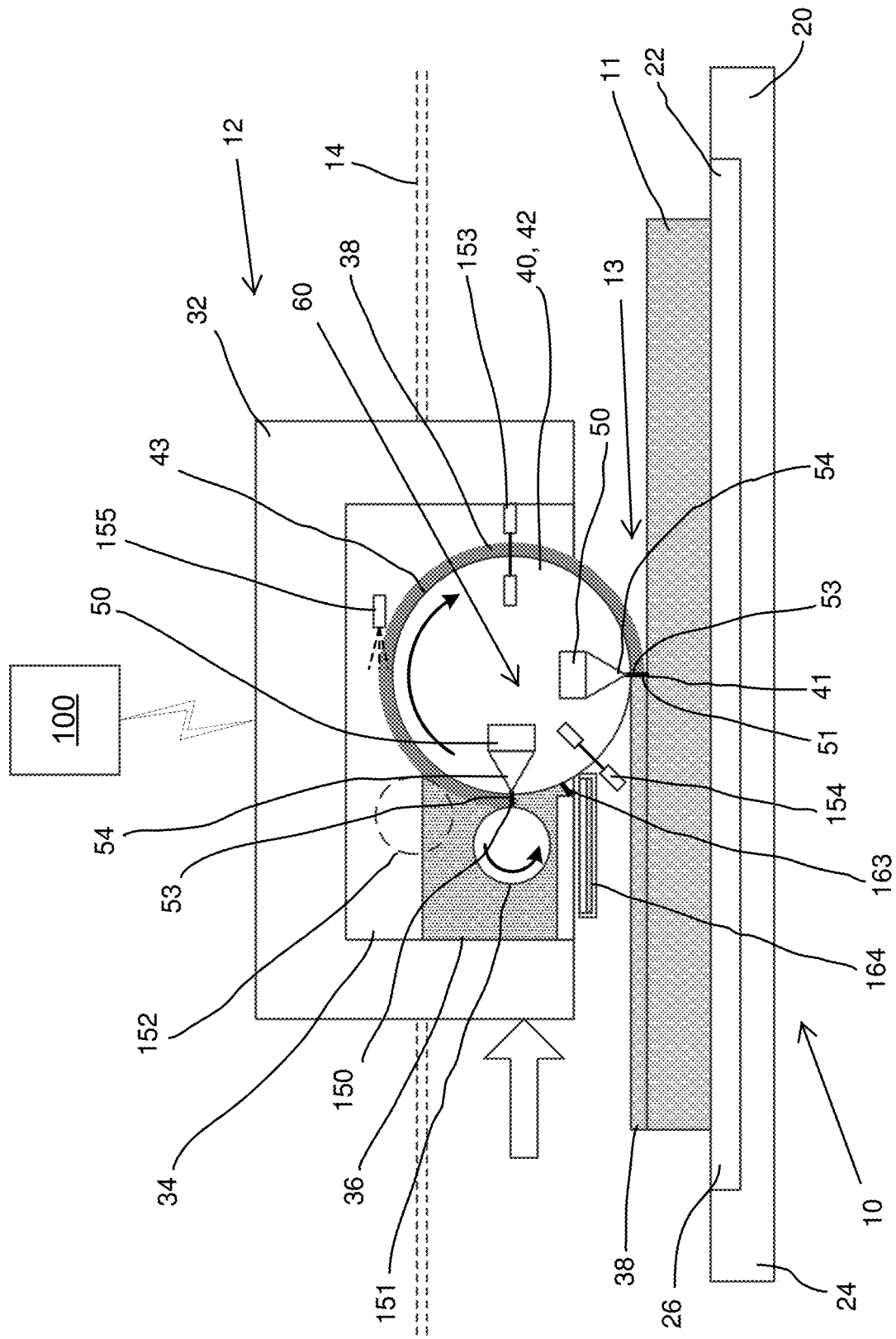
FIG. 25 is a side schematic view of another embodiment of a system and apparatus for producing a three-dimensional object in operation, according to aspects of the disclosure.
Figure 26:
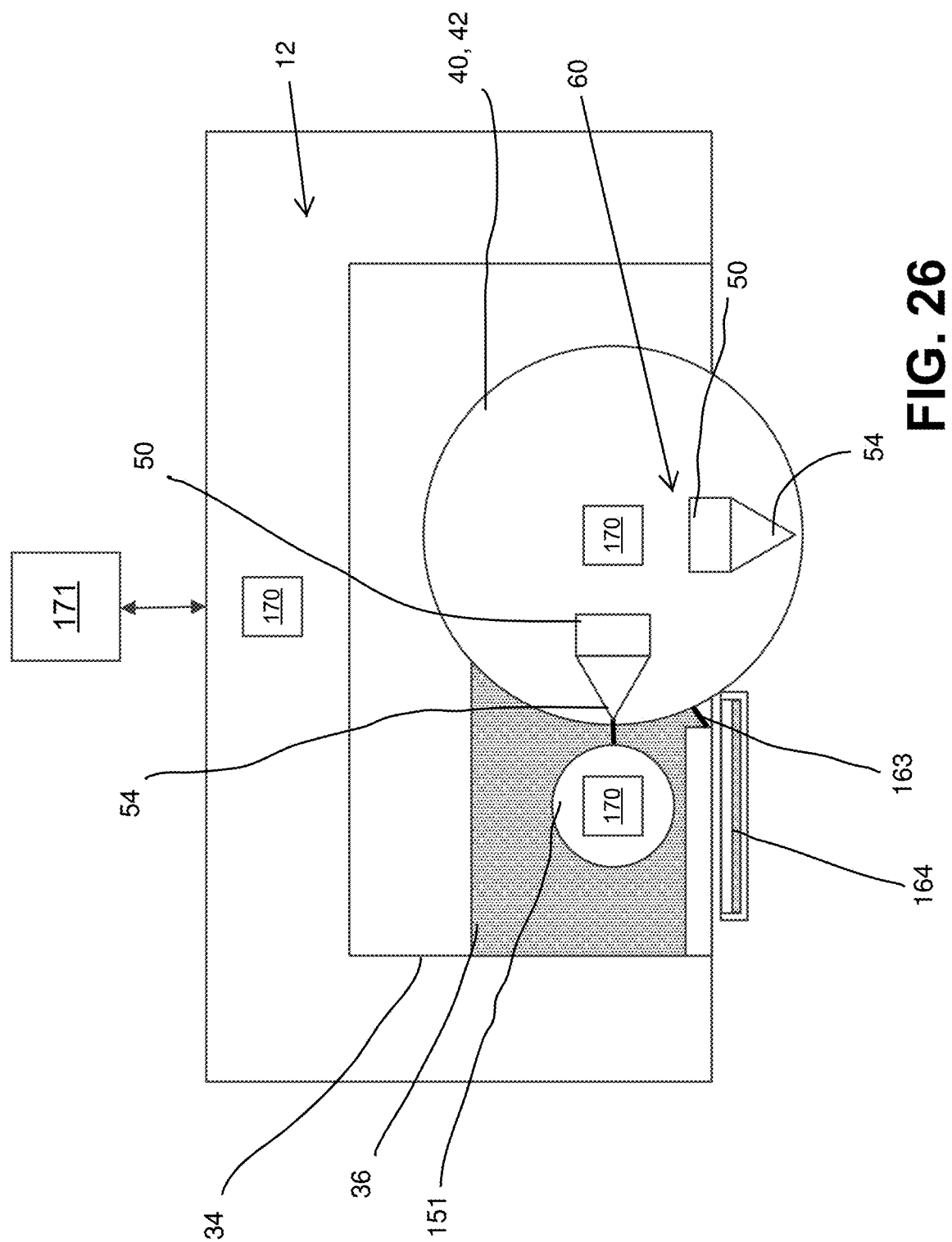
FIG. 26 is a side schematic view of a portion of the system and apparatus of FIG. 25 including temperature regulation elements, according to aspects of the disclosure.
Figure 27:
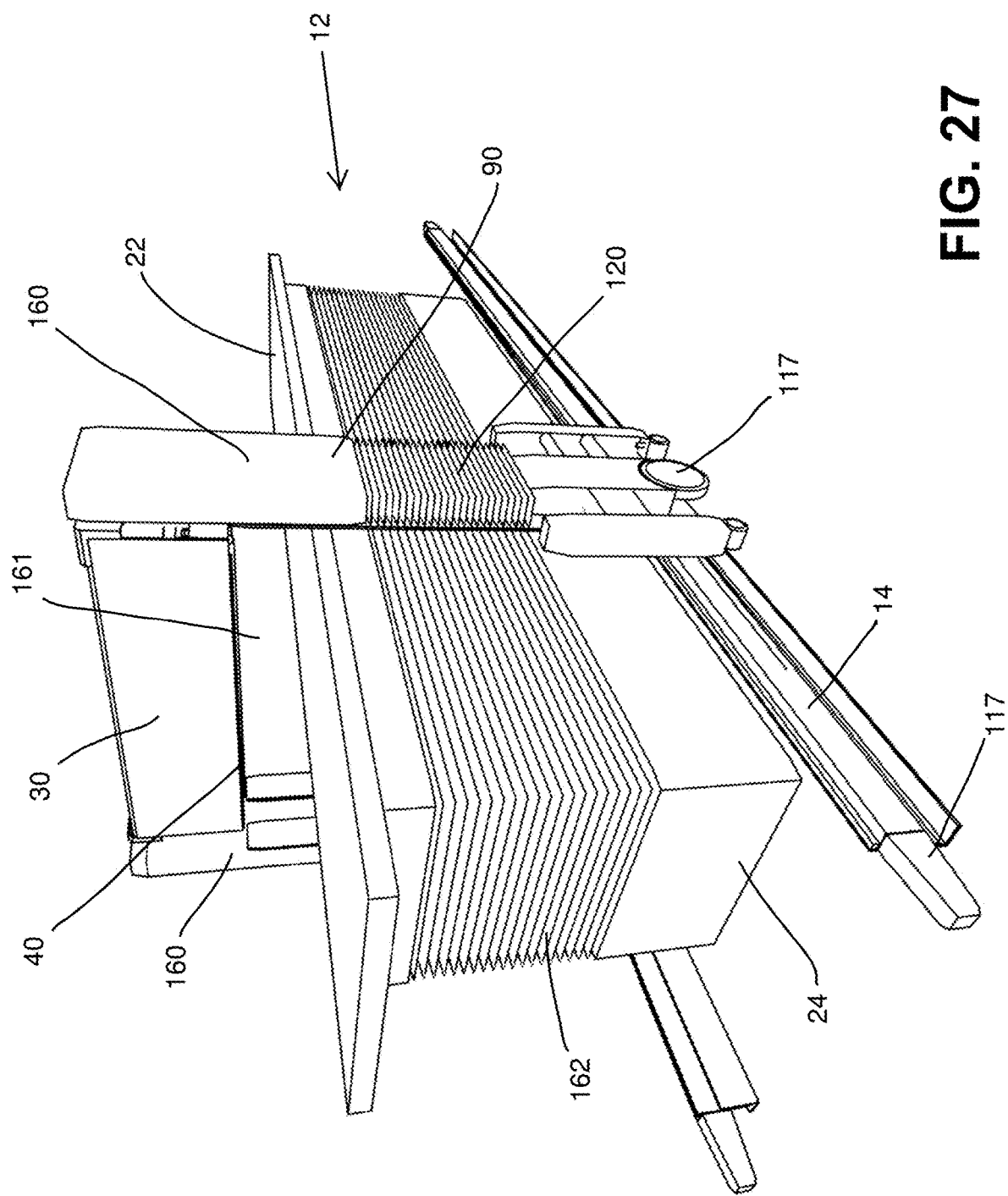
FIG. 27 is a perspective view of the system and apparatus of FIGS. 25 and 26, showing vertical adjustment of the support assembly of the apparatus to a new vertical application location and operation of the deposition mechanism to produce the three-dimensional object.

In the embodiments of FIGS. 1, 3A-4, 6-13, and 18-27, the applicator 40 includes or is in the form of a roller 42 that is in communication or contact with the material supply 34. In these embodiments, the roller 42 is cylindrical and has a cylindrical outer surface 43 in contact with the supply 34. In the embodiment of FIG. 1, as well as other embodiments herein, the roller 42 is hollow or otherwise has an inner chamber. The roller 42 rotates so that material 36 is picked up on the outer surface 43 of the roller 42 and is carried to the application site 41 for manufacturing of the object 11. The roller 42 may be powered for rotation by any of various mechanisms, such as gears, sprockets, wheels, belts, etc. In one embodiment, the roller 42 is configured to rotate in conjunction with the movement of the carriage 32, i.e., such that the top of the roller 42 is moving in the opposite direction to and at approximately the same speed as the movement of the carriage 32. This is schematically shown in FIGS. 1 and 4, as well as FIGS. 19-26, and avoids drag and/or shear on the surface of the object 11 and the applied material 36. In another embodiment, the roller 42 may be configured to rotate at a different speed, i.e., faster or slower than the translational movement speed across the deposition surface. It is contemplated that rotating the roller 42 faster than the translational movement speed can improve curing of the material 36 at the deposition surface, by increasing exposure time of the material 36 at the deposition surface relative to the material 36 on the surface 43 of the roller 42. The roller 42 may further be made from a material that is permeable to the electromagnetic waves that are emitted by the exposure device 50, such that the waves can pass through the roller 42 relatively unchanged. The application site 41 is generally defined between the outer surface 43 of the roller 42 and the deposition surface, i.e., the build platform 22 or the surface of the object 11. The spacing between the outer surface 43 of the roller 42 and the deposition surface may define the thickness of the material 36 that is deposited, and the ultimate thickness of the solidified material layer 38. It is understood that the material of the roller 42 may be customized to the specific wavelength of the electromagnetic waves to ensure sufficient permeability. The applicator 40 may have a different configuration in another embodiment, and may carry the material 36 to the application site 41 using a different mechanism. The applicator 40 may further have a different orientation relative to the build platform 22, such as shown in FIGS. 25-27.

The use of the roller 42 in certain embodiments described herein creates a moving retention area at the apex of the roller 42, and the fixed distance between the apex of the roller 42 and the build surface (i.e., the build platform or the last-deposited layer 38) determines the thickness of the layer being produced. Additionally, because the roller 42 is in communication with the supply 34 of the material 36, any non-solidified material 36 is returned to the supply 34, reducing or eliminating waste.

When the applicator 40 is configured as a roller 42, the surface of the build platform 22 and/or the surface of the roller 42 may be selected or modified for desired adhesion properties. It is beneficial for the surface of the build platform 22 and/or the surface of any applied layer 38 of the object 11 to have greater adhesion to the solidified material 36 than the surface of the roller 42. If this does not occur, material may adhere to the roller 42 and solidify there, causing flaws in the manufactured object 11. In one embodiment, the roller 42 may be made from a low-adhesion material or treated with a coating to reduce adhesion. Likewise, the surface of the build platform 22 may be made from a high-adhesion material or treated with a coating to increase adhesion. In one embodiment, the roller 42 has a lower adhesion property with respect to the solidified material 36 than the adhesion property of the bonding surface for the material 36 (i.e., the build platform 22 or the last-deposited layer 38). The adhesive properties of the flowable material 36 may be different for different materials.

In the embodiments of FIGS. 1, 3A-4, 6-13, and 18-27, the supply 34 is configured as a vat of the flowable material 36 that is in contact with the roller 42, such that rotation of the roller 42 carries the material 36 to the application site 41. In this configuration, the flowable material 36 should have sufficient viscosity that the roller 42 is able to carry a continuous layer of the uncured flowable material 36 to the application site 41. The desired viscosity of the flowable material 36 may depend on the desired build speed or rotation speed of the roller 42, or on the level of the roller 42 relative to the level of the material 36 in the supply 34. A slower rotation speed and/or a lower vat material 36 level may require higher viscosity material 36. It is understood that the power of the exposure device 50 may require a slower or faster speed, as more powerful waves 53 can solidify materials (e.g., polymerizing resins) more quickly. In another embodiment, the supply 34 may be more complex, such as by including injectors or nozzles to force the material 36 onto the roller 42. Additionally, the supply 34 of the flowable material 36 may be configured differently if the configuration of the applicator 40 is changed, and the supply 34 may be configured to be compatible with the design of the applicator 40, or vice-versa. In certain embodiments, the supply 34 may be configured to hold multiple different flowable materials 36 in multiple portions or compartments of the supply 34. It is understood that descriptions of using "different materials" as used herein may also enable usage of the same material with different colorings.

The exposure device 50 is generally configured for emitting electromagnetic waves 53 to solidify the applied material 36 to form the object 11. The wavelength and intensity of the electromagnetic waves may be selected based on the material 36 to be solidified and the speed or mechanism of solidification. For example, when a light-curable resin is used as the material 36, the exposure device 50 may be configured to emit light (visible, IR, UV, etc.) that is an appropriate wavelength for curing/polymerizing the resin to form a solid material layer 38. As another example, if a sintering process is used to solidify the flowable material 36, the waves 53 emitted by the exposure device 50 may have sufficient power to sinter the material 36 to form a solid material layer 38. The exposure device 50 may also include various components and structures to direct the emitted waves toward an exposure site 51 within the build area 13, where the material 36 is exposed to the waves at the exposure site 51. The waves may be directed so that the exposure site 51 is located approximately at the application site 41 in one embodiment, or so that the exposure site 51 is offset from the application site 41 (ahead or behind the application site 41 in the direction of travel) in another embodiment. FIG. 1 illustrates (with solid lines) the waves 53 being directed to an exposure site 51 approximately at the application site 41, and further illustrate (with broken lines) the waves 53 alternately being directed to an exposure site 51 offset behind or ahead of the application site 41.

Figure 2A:
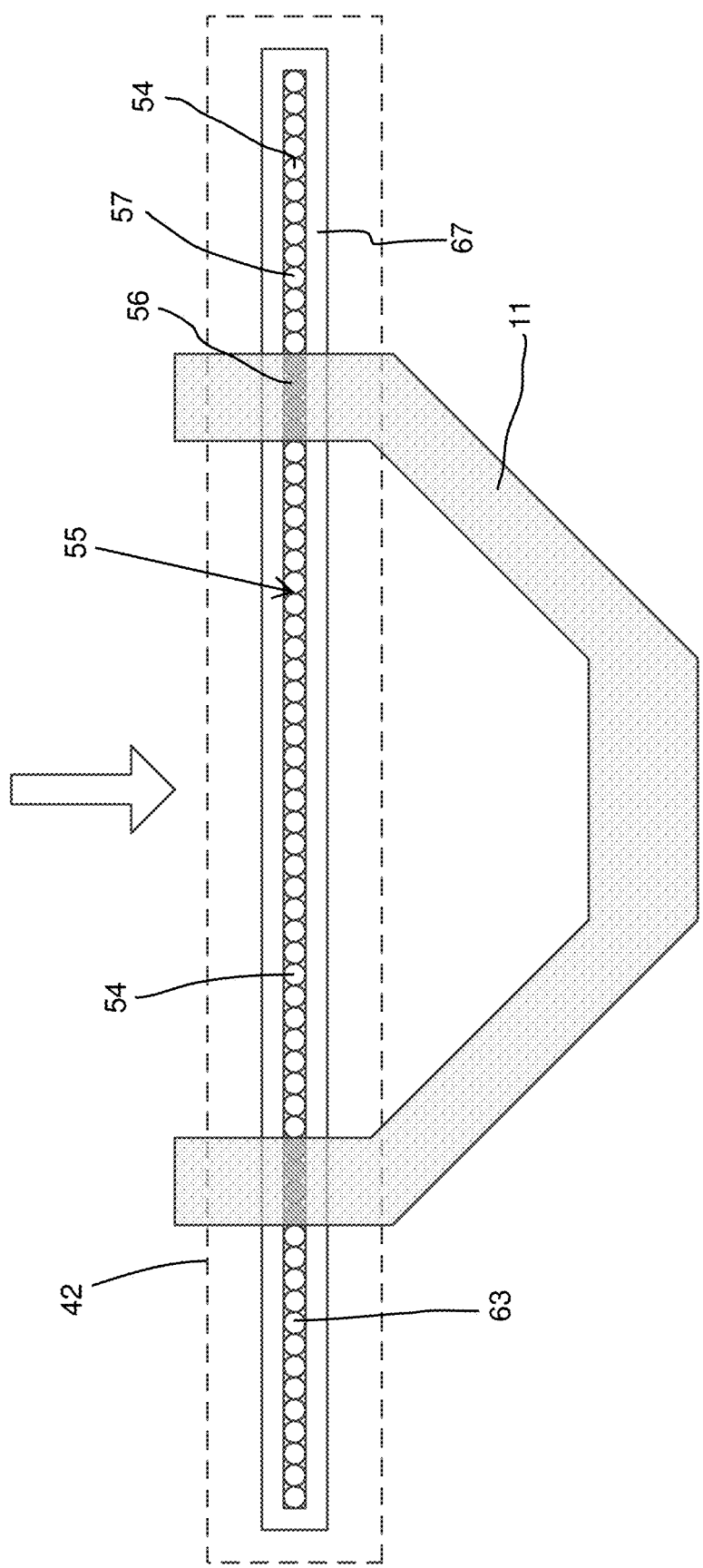
FIGS. 2A and 2B are top schematic views of the system and apparatus of FIG. 1 in operation, according to aspects of the present disclosure.
Figure 2B:
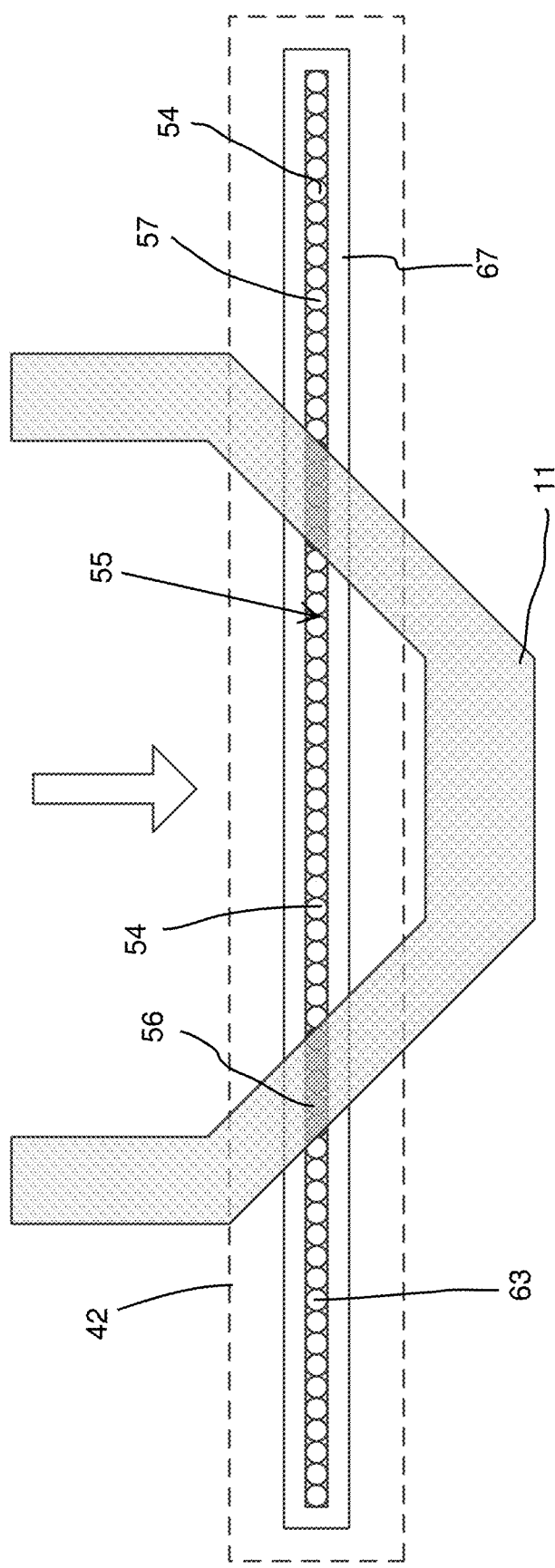
Figure 3A:
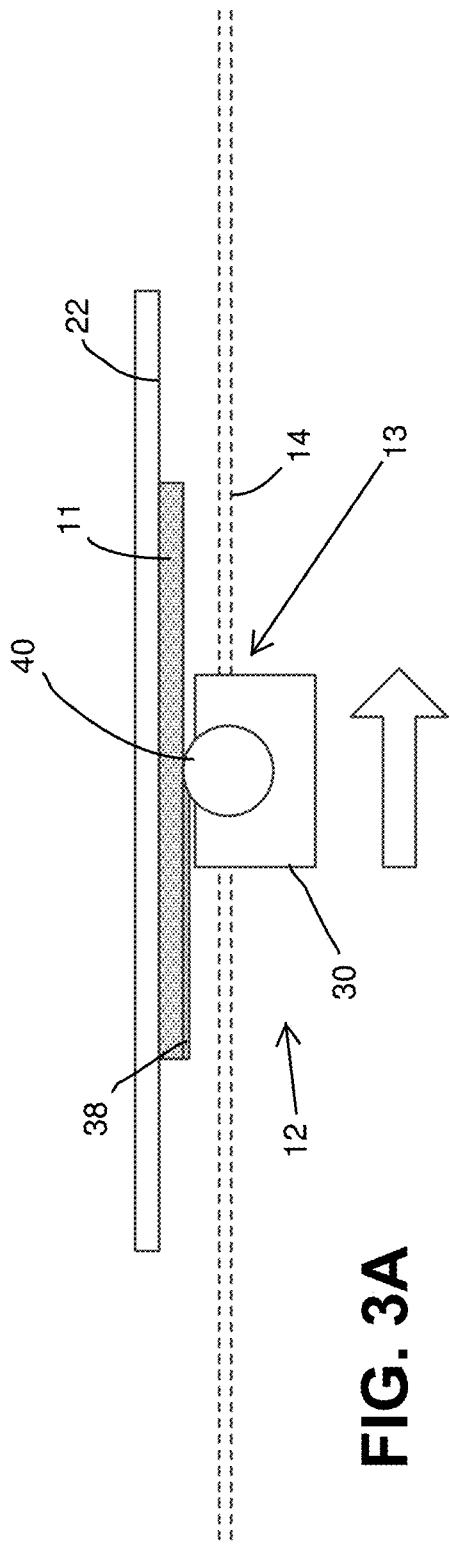
FIGS. 3A and 3B are side schematic views of the system and apparatus of FIG. 1 in operation, according to aspects of the present disclosure.
Figure 3B:
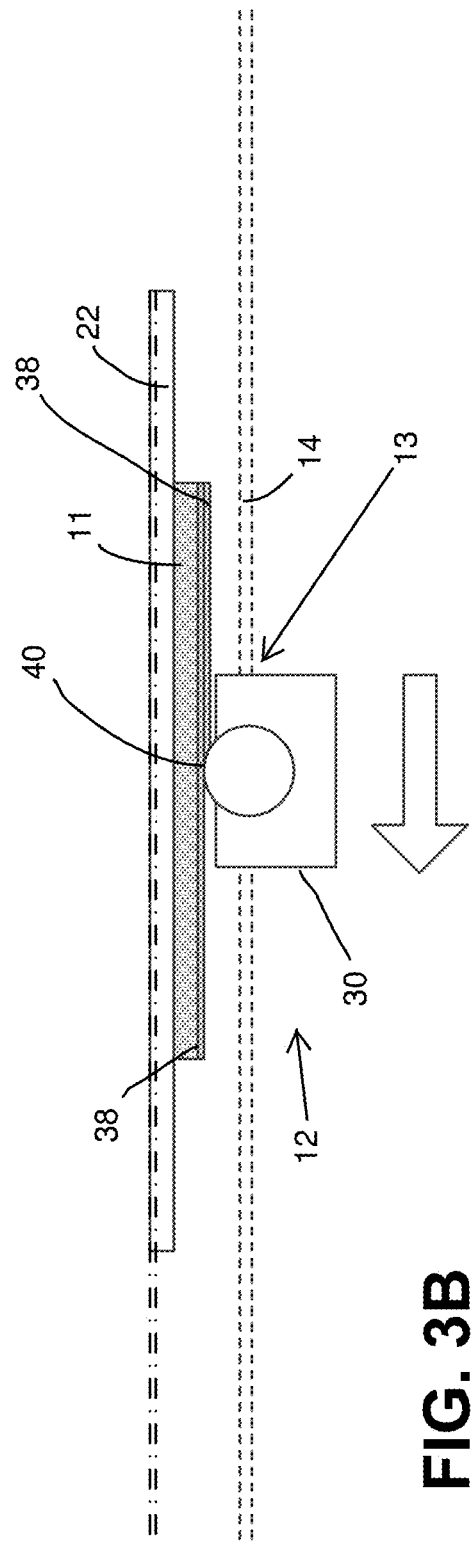
Figure 14:
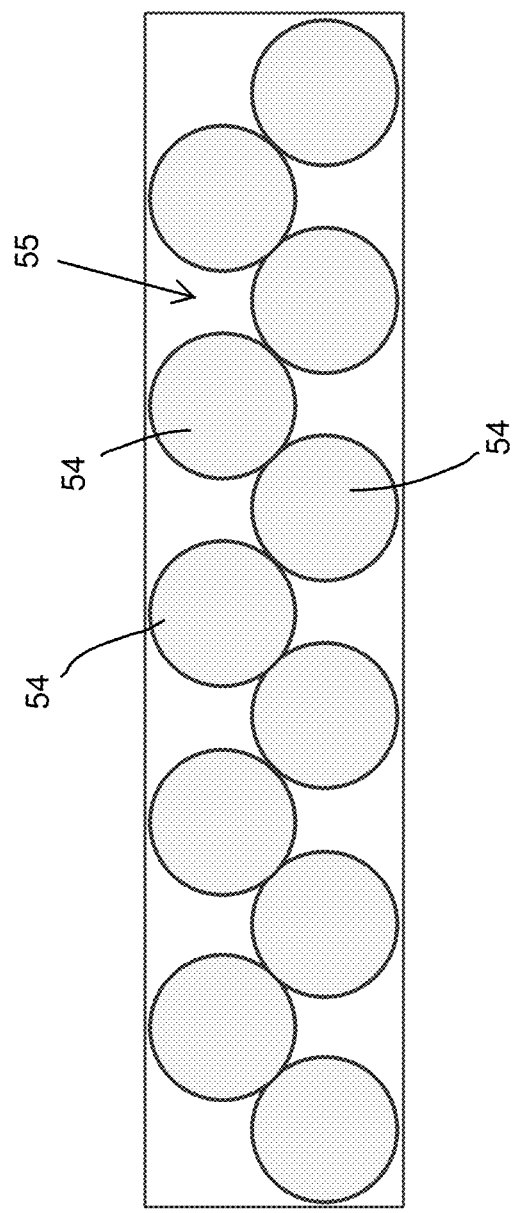
FIG. 14 is a plan schematic view of one embodiment of an exposure device for use in connection with an apparatus for producing a three-dimensional object in operation, according to aspects of the disclosure.
Figure 17:
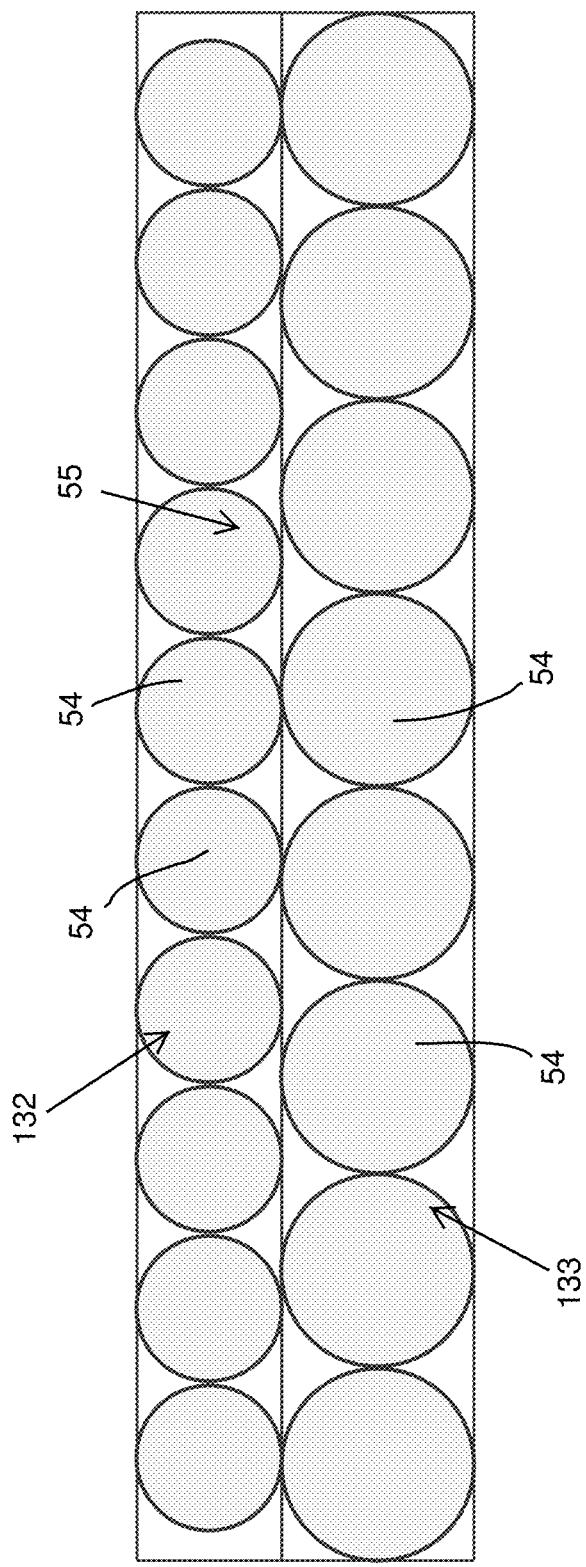
FIG. 17 is a plan schematic view of another embodiment of an exposure device for use in connection with an apparatus for producing a three-dimensional object in operation, according to aspects of the disclosure.

In general, the exposure device 50 is configured such that waves generated by the exposure device exit through outlets 54 and are directed toward specific areas of the exposure site 51 to permit selective solidification of the material 36 at the selected areas of the exposure site 51 as the deposition mechanism 30 passes. In one embodiment, the exposure device 50 is part of an exposure assembly 60 that includes components designed to direct and/or focus the waves 53 toward the exposure site 51. The outlets 54 may be arranged in an array 55, and specific outlets 54 along the array 55 may be selectively activated to selectively solidify portions of the material 36, as shown in FIGS. 2A and 2B. FIGS. 2A and 2B illustrate the active outlets 56 as being darkened, and the inactive outlets 57 as being light. As seen in FIGS. 2A and 2B, the active outlets 56 and inactive outlets 57 are changed when the roller 42 reaches a point where the shape or contour of the object 11 changes. The selective activation and deactivation of the outlets 54 may be controlled by the controller 100, as described herein. The array 55 in FIGS. 2A and 2B is illustrated as a single horizontal row of outlets 54. In other embodiments, the array 55 may be arranged differently, such as in multiple, offset horizontal rows. The use of multiple rows in the array 55 can permit closer lateral spacing between the outlets 54 than the use of a single row. FIGS. 14 and 17 illustrate additional configurations for arranging an array 55 of outlets 54, as described in greater detail herein.

As described above, the waves 53 may penetrate the roller 42 on their path to the exposure site 51. In the embodiment of FIG. 1, the outlets 54 are located inside the roller 42 and the emitted waves 53 penetrate the surface of the roller 42 once on their paths to the exposure site 51. In the embodiment of FIG. 1, the exposure device 50 itself may be located within the roller 42, or the exposure device 50 may be located outside the roller 42, with the outlets 54 positioned within the roller. Additional structures such as squeegees, gaskets, or other sealing structures may be used to resist resin ingress between the roller 42 and the window 44.

In one embodiment, the exposure device 50 may be a projector, such as a Digital Light Processing (DLP) projector, as the source of the waves 53, and the exposure assembly 60 may also use optical fibers to direct the waves 53 to the exposure site 51. The outlets 54 in such an embodiment are formed by the exit ends 63 of the optical fibers, and may be located inside the roller 42 and arranged as an array 55 inside the roller, as shown in FIGS. 1, 2A-4, 6-13, and 18-27. In such an embodiment, the optical fibers may extend into the roller 42 from one or both ends of the cylinder, and appropriate sealing and bracing components may be used around the optical fibers in this case. For example, the exit ends 63 of the optical fibers may be gathered and held in place by a casing or similar holding structure 67 (see FIGS. 2A-2B). The exposure assembly 60 may further use a focusing mechanism 66 to focus the light waves 53 after they exit the exit ends 63 of the optical fibers 61, as described in greater detail herein. In one embodiment, the focusing mechanism 66 may include a micro-lens array between the exit ends 63 of the optical fibers and the object 11, such as a Selfoc Lens Array (SLA) lens, that focuses the waves 53 and avoids diffraction on the path to the exposure site 51. In other embodiments, various other lenses, mirrors, and other focusing equipment may be used.

This exposure device 50 may be configured to selectively activate and deactivate the outlets 54 by use of pixel mapping. The pixel mapping also incorporates mapping of the specific area of the exposure site 51 toward which the outlet 54 of each optical fiber is directed. This mapping may be stored in computer memory and executed by a computer processor, such as by the controller 100.

In another embodiment, the exposure device 50 is in the form of an array 55 of LEDs 59 that function as the sources of the waves 53, as shown in FIGS. 29-44. The LEDs 59 may be designed to emit waves 53 of the proper wavelength and intensity for solidifying the material 36. The arrays 55 of LEDs 59 are positioned within the roller 42 as in the embodiments of FIGS. 29-44, and may use a focusing mechanism 66 as also described herein. The embodiments of FIGS. 29-44 use an array of ball lenses 180 as described in greater detail herein as a focusing mechanism 66. In another embodiment, a micro-lens array at the outlets 54 as described above may assist in focusing the waves 53. Each of the LEDs 59 in this embodiment is connected to an individual optical fiber 61 that has an exit end 63 forming a separate outlet 54 that emits waves 63 that are focused by the focusing mechanism 66 to be directed at a specific area of the exposure site 51. The LEDs 59 can be selectively activated and deactivated to expose that specific area of the exposure site 51 to the waves 53. Each activated LED 59 corresponds to an active outlet 54, and each inactive LED 59 corresponds to an inactive outlet 54. The LEDs 59 may be mapped to the specific areas of the exposure site 51 toward which their corresponding outlets 54 are directed, and this mapping may be stored in computer memory and executed by a computer processor, such as by the controller 100. The entrance ends of the optical fibers 61 may be fixed in position relative to the LEDs 59 using various fixing and bundling structures as appropriate for the size and arrangement of the LED array 55, and it is understood that the LED array 55 may not be linearly arranged in some configurations. In one embodiment, no lens or other focusing structure may be necessary between the LEDs 59 and the entrance ends 62 of the optical fibers 61. It is understood that multiple optical fibers 61 may be mapped to each LED 59 in one embodiment.

In another embodiment, the LEDs 59 may be positioned outside the roller 42, and a plurality of optical fibers 61 may extend from the LEDs 59 into the roller 42 such that their exit ends 61 are within the roller and form the outlets 54. The outlets 56 may be configured in the same manner as shown and described herein with respect to the embodiments of FIGS. 29-44 and other embodiments, including the use of a focusing mechanism 66 and mechanisms for adjusting the direction of the waves 53 forward or rearward in the direction of travel of the deposition mechanism 30. This configuration permits the use of an array of LEDs that is larger than can be incorporated inside the applicator 40. In further embodiments, a different type of exposure device 50 may be used, and the deposition mechanism 60 may include components configured to direct the waves 53 from the exposure device to the proper areas of the exposure site 51. For example, the exposure device 50 may be in the form of a laser with a focusing mechanism 66 including lenses and/or mirrors, or in the form of an LCD source or a high-speed positionable mechanical shutter system.

During operation of the apparatus 12, the spacing between the applicator 40 and the deposition surface must be changed for each new layer 38 of the object 11 that is deposited. The applicator 40 in the embodiments of FIGS. 1, 3A-4, 6-13, and 19-24 is oriented so that the roller 42 is positioned vertically below the deposition surface and forms the layer 38 vertically above the roller 42. In this embodiment, relative vertical translation (i.e., parallel to the layer-by-layer build direction) occurs between the applicator 40 and the deposition surface during manufacturing of successive layers 38. This vertical translation is illustrated, e.g., in FIGS. 3A and 3B, which illustrate the deposition mechanism 30 making a first pass (FIG. 3A) from left to right to deposit a first layer 38 and a second pass (FIG. 3B) from right to left to deposit a second layer 38, where the vertical translation between the first and second passes is shown in phantom lines. This relative change in positioning can be accomplished using one or more different methods and mechanisms or combinations thereof. In one embodiment, this vertical translation can be accomplished by changing the elevation of the build platform 22, using a vertical positioning mechanism as described herein. In another embodiment, this vertical translation can instead be accomplished by changing the elevation of the track 14, which may be accomplished using similar vertical positioning mechanisms. In a further embodiment, such as in FIGS. 6-13 described in greater detail herein, the deposition mechanism 30 may include a mechanism for changing the vertical position of the applicator 40 relative to the build platform 22, such as by raising or lowering the applicator 40 and/or the entire chassis 32. It is understood that the apparatus 12 may include a combination of such mechanisms for achieving vertical translation, such as using a vertically moveable build platform 22 in combination with a vertically moveable applicator 40.

The deposition mechanism 30 may include further additional components to provide additional functionality in producing a high-quality object 11. It is understood that any of the example embodiments herein may include any combination of these additional components, even if not specifically illustrated herein. For example, the deposition mechanism 30 may include one or more secondary exposure devices 80, configured to trail the applicator 40 in the direction of movement, as shown in FIG. 4. The secondary exposure device 80 emits additional electromagnetic waves 53 to further solidify the material, which waves 53 may have the same or different wavelength and intensity as the waves 53 from the exposure device 50. In one embodiment, the secondary exposure device 80 does not need to be precisely focused, as it is acceptable for the entire surface of the object 11 to be irradiated. In this configuration, the waves 53 from the exposure device 50 may be configured to only solidify the material 36 enough to form a stable layer 38 (known as a "green state"), and the secondary exposure device 80 then further solidifies the layer 38 to the desired final degree of solidification. This presents a significant efficiency advantage over existing processes, where objects 11 are typically produced in the green state and require a subsequent separate irradiation step for full curing. In one embodiment, the power levels of the exposure device 50 and the secondary exposure device 80 may be set so that each exposure device 50, 80 partially solidifies the material 36 and the combined exposure is sufficient to completely solidify the material 36. This setting avoids overexposure of the material 36, which could cause aesthetic and/or mechanical damage. The deposition mechanism 30 may include two secondary exposure devices 80, to permit secondary exposure of the layer 38 while the carriage 32 is traveling in two opposite directions without making a 180° turn. The controller 100 may control activation of the secondary exposure device(s) 80.

As another example, the deposition mechanism 30 may include one or more material removal and/or relocation mechanisms configured to remove or relocate excess and/or unsolidified material, such as one or more squeegees or one or more contactless vacuum squeegees. The material removal and/or relocation mechanisms may be configured for removing excess and/or unsolidified material 36 from the roller 42 and/or from the surface of the layer 38. Further additional components may be included in other embodiments. For example, the apparatus 12 may include a material buildup sensor configured to sense buildup of material (e.g., cured resin) on the applicator 40 and/or a leveling device (e.g., a leveling roller) to provide greater control over the thickness of the material 36 applied by the applicator 40. In one embodiment, one or more additional components may be modularly connectable to the carriage 32 and/or to each other to provide the desired functionality. Removable connections such as fasteners, clamps, interlocking structures (e.g., tabs/slots), or other structures may be used to effect these modular connections. Such additional components may also include other functional components, such as a solvent or liquid washing apparatus, mechanical wipers/ cleaners, a color applicator, or an apparatus for additional material deposition. A color applicator used in this configuration can allow coloring to be applied on a layer-by-layer basis, giving the final object 11 a coloring that penetrates internally through the thickness of the object 11, instead of simply a surface coating. An apparatus for additional material deposition may include an apparatus for deposition of conductive materials or traces within the body of the object 11, providing conductivity and/or circuit functionality to the object 11.

Figure 13:
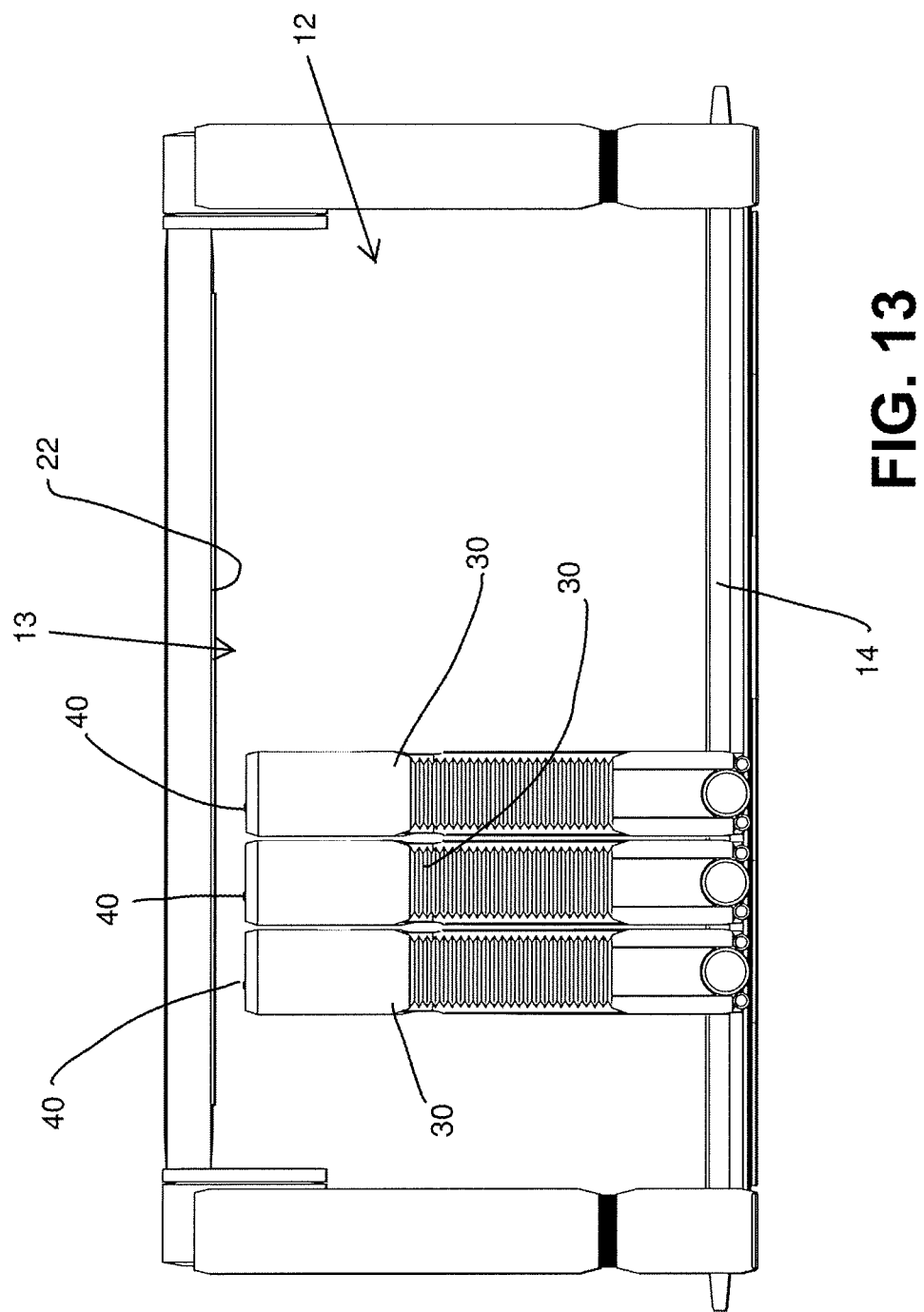
FIG. 13 is a side view of the apparatus of FIG. 31 with multiple deposition mechanisms operating simultaneously.

The apparatus 12 may be configured to use multiple deposition mechanisms 30 and/or multiple applicators 40 to pass through the build area 13 in sequence, such as illustrated in FIG. 13. The multiple deposition mechanisms 30 in FIG. 13 are illustrated as being connected to the same track 14, but multiple tracks 14 may be used in another embodiment. In one embodiment, multiple deposition mechanisms 30 may be configured to pass through the build area 13 sequentially, with each deposition mechanism 30 having the applicator 40 at different vertical positions. This configuration may be accomplished using vertical positioning structures described elsewhere herein. It is understood that the difference in vertical positioning among the multiple deposition mechanisms 30 may be substantially the same as the desired thickness of each applied layer 38. When multiple deposition mechanisms 30 are used, all deposition mechanisms 30 may use the same material 36, or different deposition mechanism 30 may be configured to apply different materials 36. Due to differences in properties of different materials 36, the deposition mechanisms 30 may need to pass at different speeds. A self-propelled carriage 32 as described herein permits this operation. In another embodiment, multiple deposition mechanisms 30 may be configured to pass through the build area 13 sequentially, with the deposition mechanisms 30 having the applicators 40 at the same vertical positions. This can be used to build different portions of the same layer of an object 11, and in particular, the deposition mechanisms 30 can be configured to deposit different materials 36 in the layer.

Figure 28:
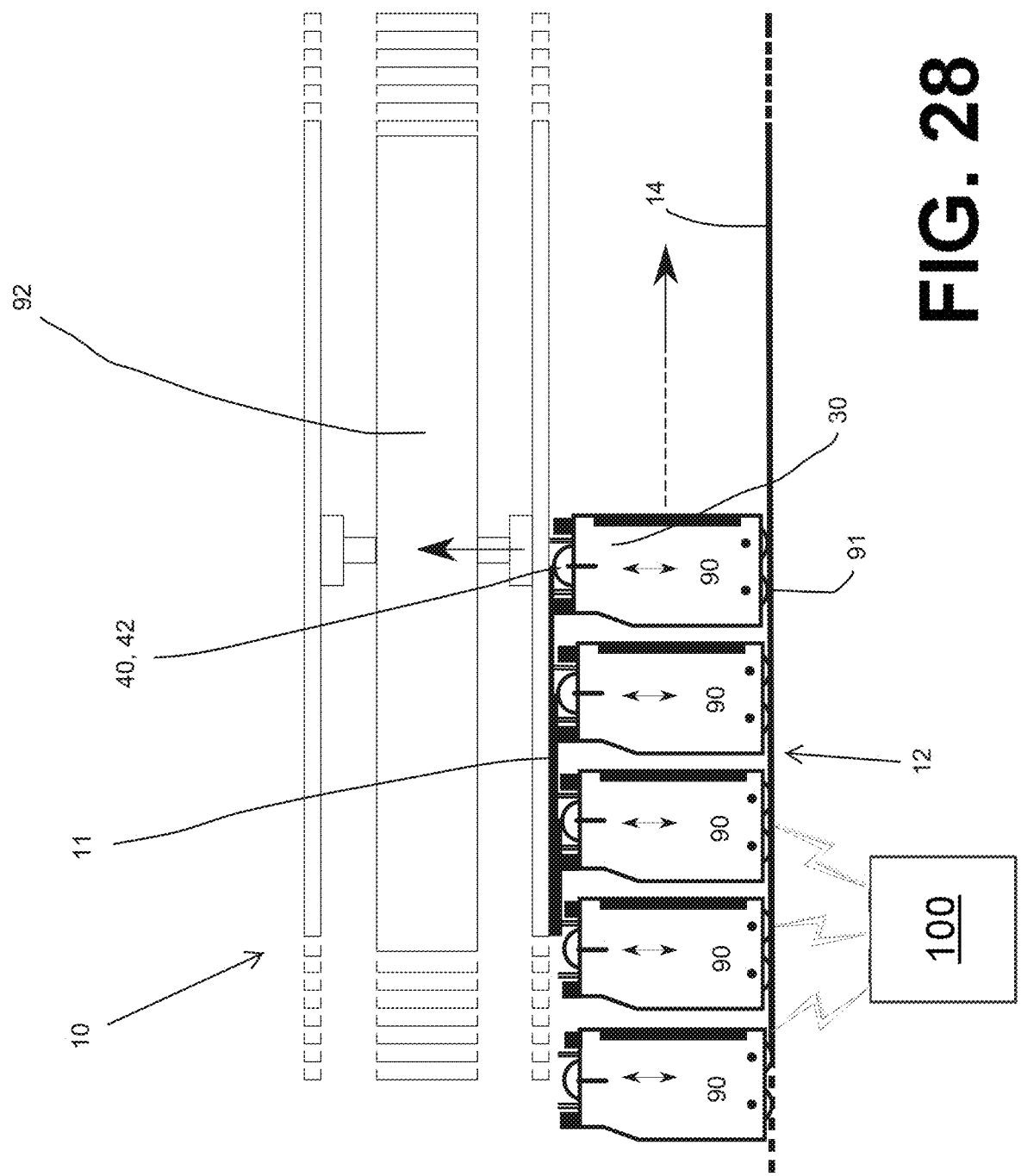
FIG. 28 is a side schematic view of another embodiment of a system and apparatus for producing a three-dimensional object in operation, according to aspects of the disclosure.

FIG. 28 illustrates an additional embodiment of a system 10 for manufacturing one or more objects 11 utilizing an apparatus 12 and deposition mechanisms 30 according to embodiments described herein. In particular, the embodiment of FIG. 28 may be configured for producing a number of objects 11 in sequence. Each deposition mechanism 30 in the embodiment of FIG. 28 may be configured as an autonomous unit 90 with an individual sub-controller, where all of the sub-controllers for all of the units 90 are integrated with the controller 100, such that the controller 100 controls the sub-controllers and thereby controls all of the units 90. Each unit 90 may further include one or more positioning systems, including a local positioning system and/or a global positioning system (GPS). Each unit 90 may further include a deposition mechanism 30 and a drive mechanism 91 configured for moving the unit 90 around during manufacturing. As shown in FIG. 28, the units 90 are all connected to a carousel 92 that moves the units 90 around to a plurality of stations. The stations may each be configured for a specialized purpose. For example, some stations may be manufacturing stations where the unit 90 makes a pass through one or more build areas 13 for manufacturing one or more objects 11 on one or more build platforms 22. Such stations may also include robotic components, such as robotic arms that hold a build platform 22 in the proper location for building by the units 90. Other stations may be maintenance stations, such as stations configured for refilling the supply 34 the unit 90. The carousel 92 may have one or more tracks 14 as described herein for guiding movement of the units 90 during building. The drive mechanism 91 may be multi-functional, such that the units 90 are autonomously powered and capable of engaging and disengaging from the track 14 and moving separately from the track 14 when not in the building process, such as for visiting refilling or maintenance stations. In the configuration illustrated in FIG. 28, each unit 90 may be loaded with a different material 36 for manufacturing different parts of a single object 11 or different objects. This configuration therefore provides the ability for rapid manufacturing of a series of objects 11, either identical objects 11 or different objects 11.

FIGS. 6-13 illustrate another embodiment of a system 10 that includes a manufacturing apparatus 12 that may be connected to a computer controller 100 in communication with one or more components of the apparatus 12 and configured for controlling operation of the apparatus 12 and/or the components thereof to manufacture an object 11. The apparatus 12 of FIGS. 6-13 includes a support assembly 20 for supporting the object 11 within a build area 13 during manufacturing, a track 14 extending through the build area 13, and a material deposition mechanism 30 mounted on the track 14 and configured for producing the object 11 within the build area 13 through layer-by-layer application of a material. Many components of the system 10 and apparatus 12 of FIGS. 6-13 are similar in structure and operation to other components described herein with respect to other embodiments, and such components may not be described again in detail with respect to the embodiment of FIGS. 6-13. It is understood that similar reference numbers may be used to indicate such similar components. The deposition mechanisms 30 in FIGS. 6-13 are configured for operation as autonomous units 90 as described herein, and each autonomous unit 90 may have onboard a processor 2604, a memory 2612, and/or other computer components necessary for executing computer-executable instructions to automate the autonomous unit 90 and/or communicate with the computer controller 100.

The support assembly 20 in FIGS. 6-13 includes a base frame 19 for supporting some or all of the track 14, the build platform 22, and other components of the apparatus 12. In the embodiment of FIGS. 6-13, the track 14 is not supported by the base frame 19 and is fixed separately to the floor, but the track 14 may be connected to and supported by the base frame 19 in another embodiment. The track 14 includes two parallel beams or rails 15 and at least one bus bar 101 configured for supplying power to the deposition mechanism 30. The bus bar(s) 101 may be part of one or both of the rails 15 in one embodiment. Additionally, the substantial entirety of one or both rails 15 may act as the bus bar(s) 101 in one embodiment. One or more bus bars 101 may be provided separate from the rails 15 in another embodiment. The track 14 may not contain any bus bar 101 in another embodiment, and the deposition mechanism 30 (i.e., the autonomous unit 90) may be self-powered for movement and operation, such as by an internal battery. It is understood that the track 14, the build platform 22, the support assembly 20, and other components may be constructed in any desired size, including lengths and widths that are significantly larger than those illustrated in FIGS. 6-13.

Figure 7:
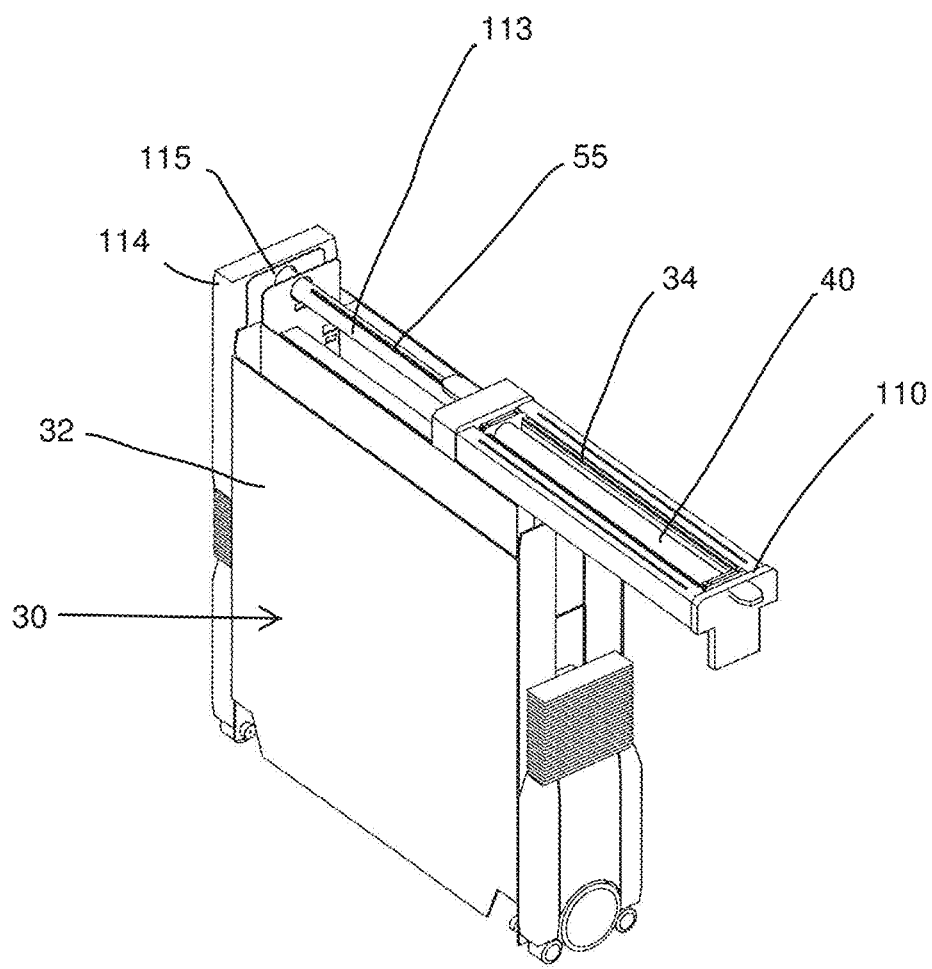
FIG. 7 is a perspective view illustrating removal of a resin application module from the apparatus of FIG. 6.
Figure 8:
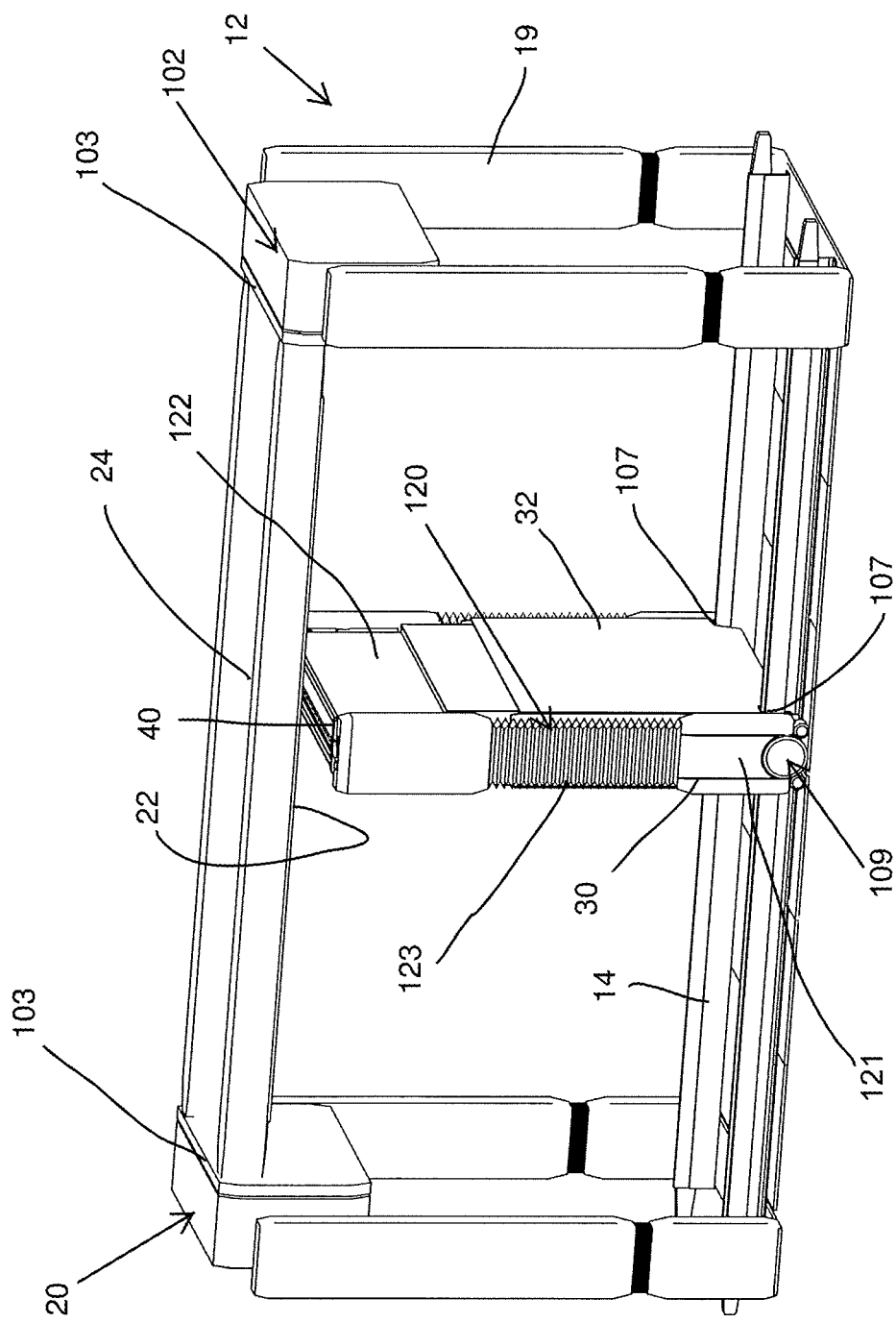
FIG. 8 is a perspective view of the apparatus of FIG. 31, showing vertical adjustment of a deposition mechanism of the apparatus to a new vertical application location.

The deposition mechanism 30 in the embodiment of FIGS. 6-13 includes a carriage 32 engaged with the track 14 and configured for movement along the track 14 and through the build area 13, a supply 34 of a flowable material 36 mounted on or otherwise operably connected to the carriage 32, an applicator 40 in communication with the supply 34 of the flowable material 36 and configured to apply the flowable material 36 to an application site 41 within the build area 13, and an exposure device 50 configured for emitting electromagnetic waves to solidify the applied material 36 to form the object 11. The supply 34 of the flowable material 36, the applicator 40, and the exposure assembly 60 in the embodiment of FIGS. 6-13 are similar or identical in function and structure to the same components in the embodiment of FIGS. 1-4 and need not be re-described herein in detail. The supply 34 of the flowable material 36 and the applicator 40 in the embodiment of FIGS. 6-13 are connected so as to form an integrated application module 110, also referred to as a resin application module 110, which is removable from the carriage 32 and replaceable with a second application module 110. FIG. 7 illustrates an example of such an application module 110 and the process of removing and replacing the application module 110. In this embodiment, the supply 34 is provided in the form of a vat or reservoir with the roller 42 at least partially disposed within the reservoir to be in communication with the flowable resin 36, and the supply 34 can be removed without draining the resin 36 if so desired. The applicator 40 in this embodiment is in the form of an elongated roller 42, and one or both of the ends of the roller 42 is connected to the side walls of the vat 34. The optical fibers 61 pass through an opening extending through one of the side walls and the end of the roller 42 to pass into the interior of the roller 42 to form the array 55 of outlets 54 within the roller 42. The supporting structure 113 holding the fibers 61, the lens array 64 and other components of the exposure device 50 remain in place when the application module 110 is removed. It is understood that a side panel 114 of the carriage 32 is removed in this embodiment in order for the application module 110 to be removed, as shown in FIG. 7. The removable side panel 114 in the embodiment of FIGS. 6-13 is on the opposite side of the carriage as the drive assembly 115 that drives rotation of the roller 42. In one embodiment, either or both side panels 114 of the deposition mechanism 30 may include a resin tank connected to the supply 34 to replace used material 36 and/or keep the level of the material 36 constant. The deposition mechanisms in FIGS. 29-44 may also include a removable application module 110 as described herein.

Figure 9:
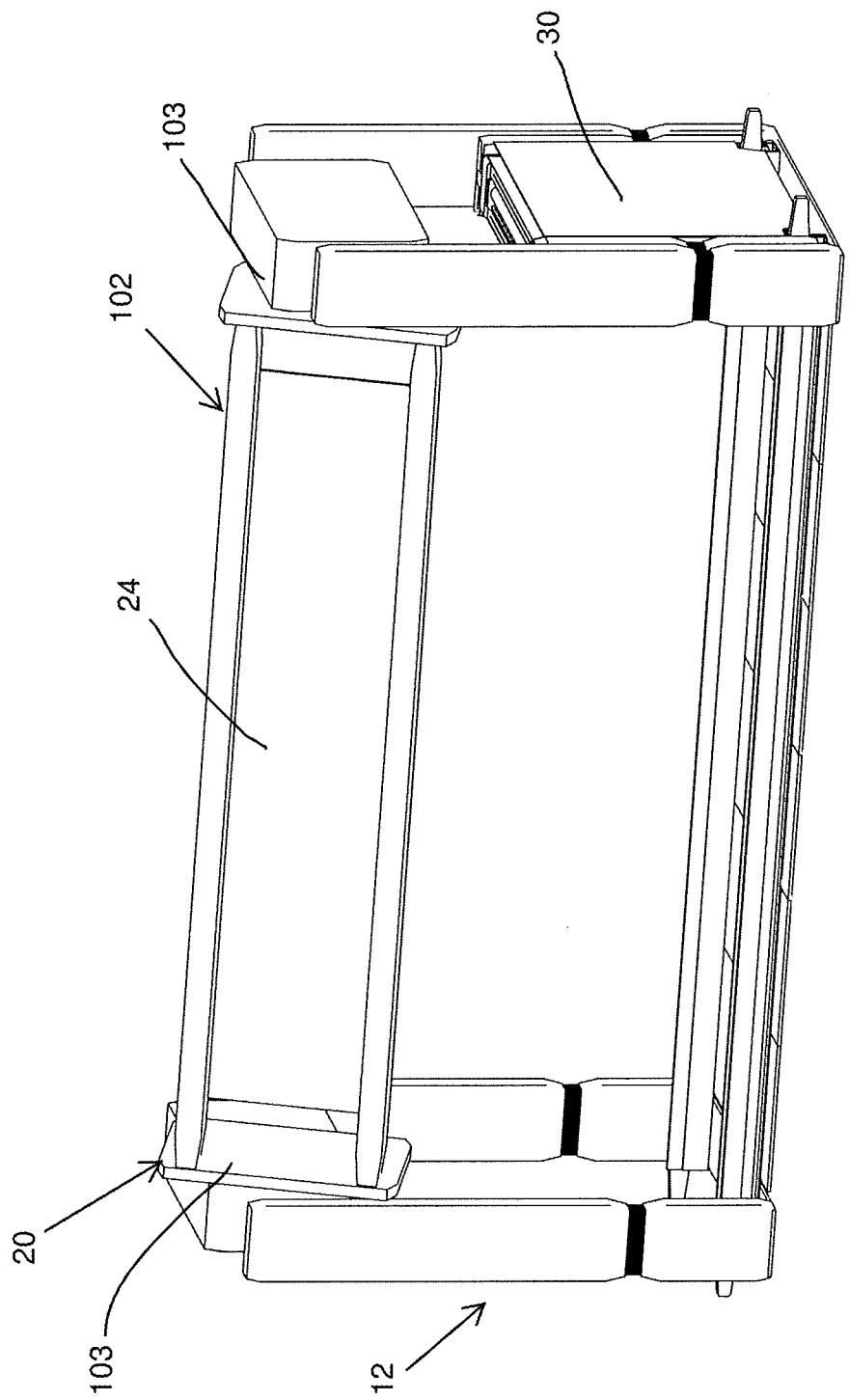
FIG. 9 is a perspective view of a support assembly of the apparatus of FIG. 31, showing movement of a build platform from a build position to a tending position.
Figure 10:
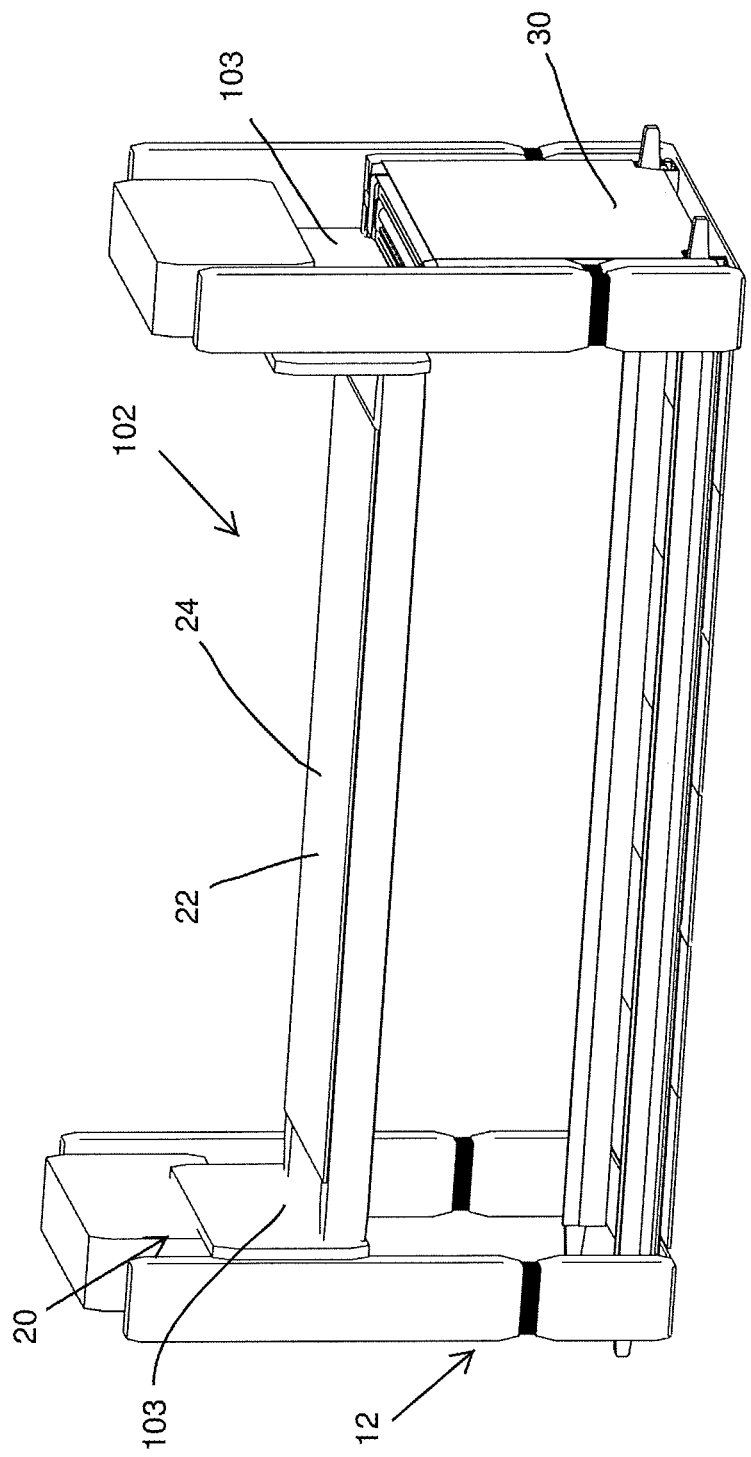
FIG. 10 is a perspective view of a support assembly of the apparatus of FIG. 31, showing the build platform in the tending position.
Figure 11:
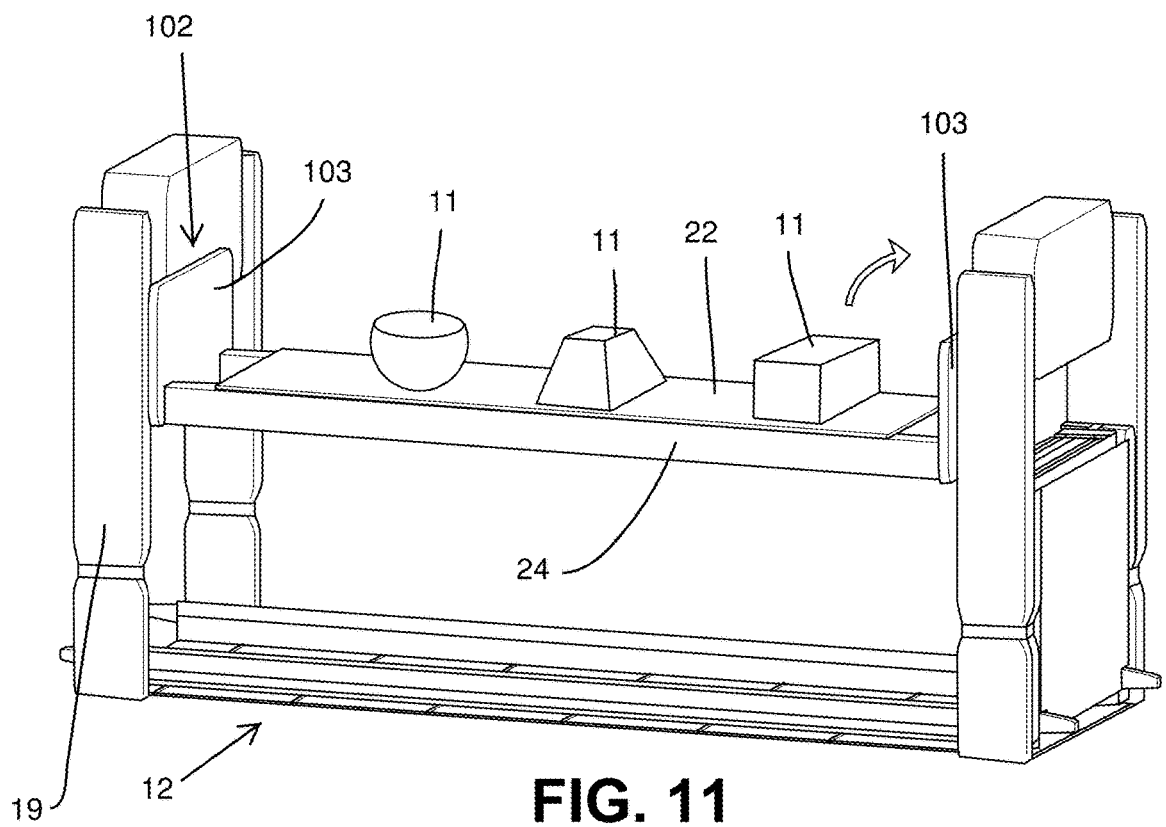
FIG. 11 is a perspective view of the apparatus of FIG. 31 illustrating performance of a tending operation when the build platform is in the tending position.

The support assembly 20 in FIGS. 6-13 further includes a mechanism 102 for moving the build platform 22 between a build position and a tending position, where the build platform 22 faces toward the track 14 for production of an object 11 in the build position, and the build platform 22 faces away from the track 14 in the tending position, to permit a tending operation to be performed on the object 11. Examples of tending operations include modifying the object 11, such as by material removal, including removal of support structure (e.g., by cutting, machining, etc.), painting, cleaning, or removing the object 11 from the build platform 22, such as if production of the object 11 is completed, or inserting or attaching functional or non-functional components previously manufactured by the same or different process (also referred to as secondary objects), such as RFID chips, magnets, added weights or structural supports, printed circuit boards, liquid tanks, etc. Such a secondary object may be connected in a configuration such that it is not exposed to the waves 53 during continuing production of the object 11 when the build platform 22 is returned to the build position. For example, the secondary object may be inserted within an internal cavity of the partially-built object 11 and/or provided with a protective casing. In one embodiment, the secondary object(s) may be other objects 11 manufactured simultaneously on the same or other build platforms 22 as described herein. In the embodiment of FIGS. 6-13, the mechanism 102 moves the build platform 22 between the build position and the tending position by rotation. FIGS. 6-8 and 12 illustrate the build platform 22 in the build position, FIG. 9 illustrates the build platform 22 being moved from the build position to the tending position, and FIGS. 10 and 11 illustrate the build platform 22 in the tending position in this embodiment.

The mechanism 102 for moving the build platform 22 in the embodiment of FIGS. 6-13 includes a support platform 24 that defines and/or supports the build platform 22 as described herein, with one or more rotating bases 103 connected to the support platform 24 and configured for rotating to move the support platform 24. As shown in FIGS. 6-12, the mechanism 102 includes two rotating bases 103 at opposed ends of the support platform 24 that are configured for rotating in unison about an axis, and the support platform 24 is fixed with respect to the rotating bases 103. In other embodiments, a different type of movement mechanism 102 may be used. FIGS. 9-12 illustrate the build platform 22 and the support platform 24 being rotated 180° between the build position and the tending position, such that the build platform 22 faces downward in the build position and upward in the tending position. In other embodiments, the build platform 22 and the support platform 24 may be oriented differently in the tending position and/or may include multiple tending positions.

Figure 12:
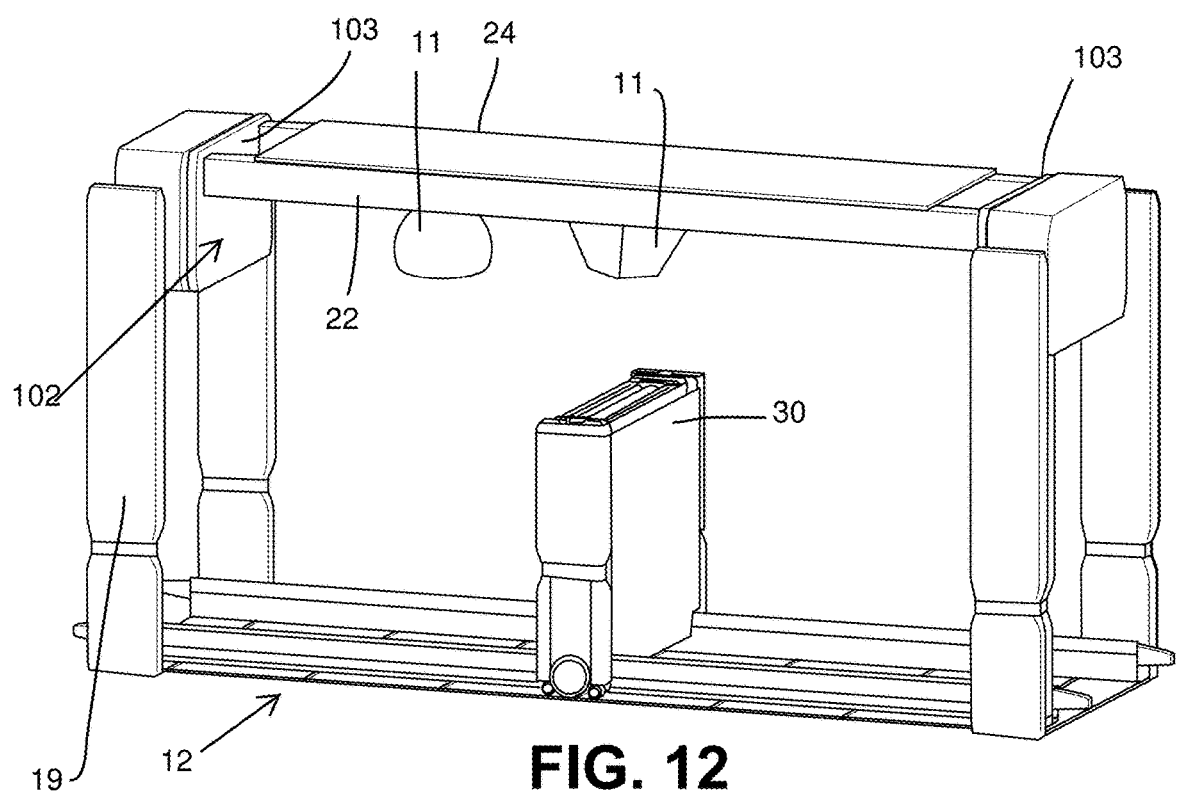
FIG. 12 is a perspective view of the apparatus of FIG. 31 illustrating further production of objects when the build platform is in the build position, after performance of the tending operation in FIG. 36.

In other embodiments a single or multiple deposition mechanisms 30 may be configured to build multiple objects 11 simultaneously, such as by using multiple build platforms 22 or multiple objects 11 built on the same build platform 22, with each separate object 11 having a separate build area 13 through which the deposition mechanism 30 passes. FIGS. 11 and 12 illustrate the system 10 and apparatus 12 being used to produce multiple objects 11 simultaneously, including multiple objects that are different from each other and have different build times, build requirements, and/or build heights. As described herein, the apparatus 12 and the deposition mechanism 30 according to various embodiments is capable of producing multiple objects 11 simultaneously, including multiple objects 11 on the same build platform 22 or multiple objects 11 on different build platforms 22 supported by the same support assembly 20. In the apparatus 12 of FIGS. 6-13, the multiple objects 11 can be built with the build platform 22 in the build position, as shown in FIG. 12. When a tending operation is necessary on one or more of the objects 11, the build platform 22 can be moved to the tending position, as shown in FIG. 11, and the tending operation may be performed. FIG. 11 illustrates a tending operation in the form of removal of one of the objects 11 for which building is complete, and it is understood that additional tending operations may be performed on any of the objects 11, including the objects 11 not removed at this stage. When the tending operation is complete, the build platform 22 can be returned to the build position, as shown in FIG. 12, which illustrates the apparatus 12 continuing to build the two remaining incomplete objects 11. This permits different objects to be simultaneously manufactured.

The track 14 in the embodiment of FIGS. 6-13 is configured to be "open" to allow a deposition mechanism 30 (such as the autonomous unit 90) to engage and disengage with the track 14 as desired. The track 14 may be considered to have an open end at one or both ends, where the deposition mechanism 30 can be engaged and disengaged with the track 14. In this configuration, the base frame 19 provides an opening at one or both ends of the track 14 to permit the deposition mechanism 30 to engage with the track through the base frame 19. The opening is also present between the rails 15 of the track 14. The rails 15 of the track 14 shown in FIGS. 6-13 extend outwardly beyond the opening 104 and/or beyond the adjacent portion of the base frame 19 and have ends 106 that are tapered on one or more surfaces to ease engagement of the carriage 32 with the track 14. The carriage 32 has a track engagement mechanism 109 that is configured to engage the track 14 to permit movement of the deposition mechanism 30 along the track 14. The track engagement mechanism 109 in the embodiment of FIGS. 6-13 includes slots 107 that are configured to receive the ends of the rails 15 during engagement and to further receive a portion of the respective rail 15 when the carriage 32 is engaged with the track 14. The track engagement mechanism 109 has wheels, rollers, sliders, gears, sprockets or other engagement structures positioned within the slots 107 and engaging the rails 15 on multiple surfaces, including the bottom and/or inner sides thereof. The locomotion of the carriage 32 along the track 14 is provided by the track engagement mechanism 109, which includes a locomotion mechanism that engages the track 14, such as wheels, gears, sprockets, etc. In one embodiment, the deposition mechanism 30 includes a circular gear that engages a linear gear on the or each rail 15 to drive motion of the carriage 32 along the track 14. In other embodiments, the locomotion of the carriage 32 along the track 14 may be provided by powered wheels 117 or by linear induction motors, among other mechanisms. The track engagement mechanism 109 in one embodiment further may have one or more electrical contacts (not shown) for engaging and drawing power from the bus bar(s) 101. The deposition mechanism 30 may be powered by other mechanisms, including an internal power source, a temporary umbilical power connection, and/or a contactless inductive power supply. Other track engagement mechanisms 109 may be used in other embodiments, including different locomotion mechanisms, and it is understood that the track 14 and the track engagement mechanism 109 may be designed in a complementary manner.

The deposition mechanism 30 in FIGS. 6-13 is configured to be an autonomous unit 90 that may be moveable independently of the track 14 in some circumstances, as described herein with respect to FIG. 28. As illustrated in FIG. 13, multiple deposition mechanisms 30 can be used on the track 14 simultaneously. Such multiple deposition mechanisms 30 may be configured for making multiple passes in opposite directions or for making a single pass. For example, a deposition mechanism 30 may engage with one end of the track 14, make a single pass of the build area 13, and then exit the track 14 at the opposite end to either move along to a different task (e.g., another apparatus) or to re-engage the track 14 again at the first end. It is contemplated that a continuous train of deposition mechanisms 30 could sequentially pass the build area 13, with each deposition mechanism 30 making a single pass and returning to re-engage the track 14 in order to make another pass. In a further embodiment, the apparatus 12 may use a mix of deposition mechanisms including autonomous units 90 that can be disengaged from the track 14 and non-autonomous and/or permanent deposition mechanisms 30 that cannot be readily disconnected from the track 14.

As described above, the deposition mechanism 30 may be moveable separately and independently from the track 14 in the embodiment of FIGS. 6-13, where the deposition mechanism 30 is provided as an autonomous unit 90. In this embodiment, the deposition mechanism 30 uses a ground engagement mechanism for support and locomotion independently of the track 14. The ground engagement mechanism in the embodiment of FIGS. 6-13 uses the wheels 117 for locomotion independently from the track 14, e.g., on the surface on which the apparatus 12 sits. The ground engagement mechanism in FIGS. 6-13 also includes extendible stabilizers 118 on the front and rear sides of the wheels 117 to stabilize the deposition mechanism 30 and resist tipping during movement by the wheels 117 apart from the track 14. In this embodiment, the stabilizers 118 are retractable when not needed, i.e., the stabilizers 118 are moveable between an extended position, for use in movement apart from the track 14 and a retracted position, shown in FIGS. 6-13, when the deposition mechanism 30 is engaged with the track 14. The stabilizers 118 may include additional wheels, casters, sliders, or other structures to enable ground engagement while in motion. In other embodiments, the deposition mechanism 30 may include different ground engagement mechanism(s), including tracks, moveable legs, or other such structures.

The deposition mechanism 30 in the embodiment of FIGS. 6-13 has a vertical adjustment mechanism 120 that is configured for adjusting the position of the applicator 40 and/or other components of the deposition mechanism 30 in the vertical direction, i.e., parallel to the build direction in the embodiment illustrated. This configuration differs from the configurations illustrated in FIGS. 1-4, where vertical adjustment is performed by adjusting the position of the build platform 22. The deposition mechanism 30 in FIGS. 6-13 has a bottom portion 121 that is engaged with the track 14 and/or the ground and a top portion 122 that is supported by the bottom portion 121 and is moveable in the vertical direction with respect to the bottom portion 121. The top portion 122 includes at least the applicator 40, the supply 34 of flowable material 36, and the outlets 54 in the embodiment of FIGS. 6-13, such that at least these components move in the vertical direction with the top portion 122. The vertical adjustment mechanism 120 moves the top portion 122 with respect to the bottom portion 121. In the embodiment of FIGS. 6-13, the vertical adjustment mechanism 120 includes two lifts 123 on opposite sides of the deposition mechanism 30. These lifts 123 may include telescoping structure and may be powered by a variety of different mechanisms, including hydraulic or pneumatic cylinders, jack screws, sprocket/chain drive, gears, etc. In other embodiments, the build platform 22 of FIGS. 6-13 may additionally or alternately be configured for vertical adjustment as described elsewhere herein.

The exposure device 50 and associated structures for transmission and direction of the electromagnetic waves 53 may be configured for adjustability to provide improved performance and/or versatility to the deposition mechanism 30. Such adjustability may include adjustability in the selection, arrangement, power output, aiming direction, and/or other aspects and properties of the exposure device 50 and associated structures (including the outlets 54). FIGS. 14-20 illustrate various embodiments providing such adjustability, and it is understood that aspects of the embodiments of FIGS. 14-20 may be used in combination with each other and with other embodiments described herein, including other adjustable configurations (and applications thereof) already described herein.

FIG. 14 illustrates one embodiment an arrangement of the array 55 of the outlets 54 of the exposure assembly 60 that can provide improved resolution in part production. The outlets 54 in the embodiment of FIG. 14 are staggered with respect to each other, such that each outlet 54 of the array 55 is overlapped laterally (i.e., in the y-direction) by at least one other outlet 54. As shown in FIG. 14, all outlets 54 other than the outlets 54 on opposite ends of the array 55 are overlapped on both edges by other outlets 54. This arrangement permits the lateral (y-direction) extremities of the exposure area to be more precisely selected, improving the resolution of the exposure assembly 60. The staggering of the outlets 54 also permits a greater number of outlets 54 to be placed into a given lateral width as compared to a single row, thus improving the total power output of the array 55.

Figure 15:
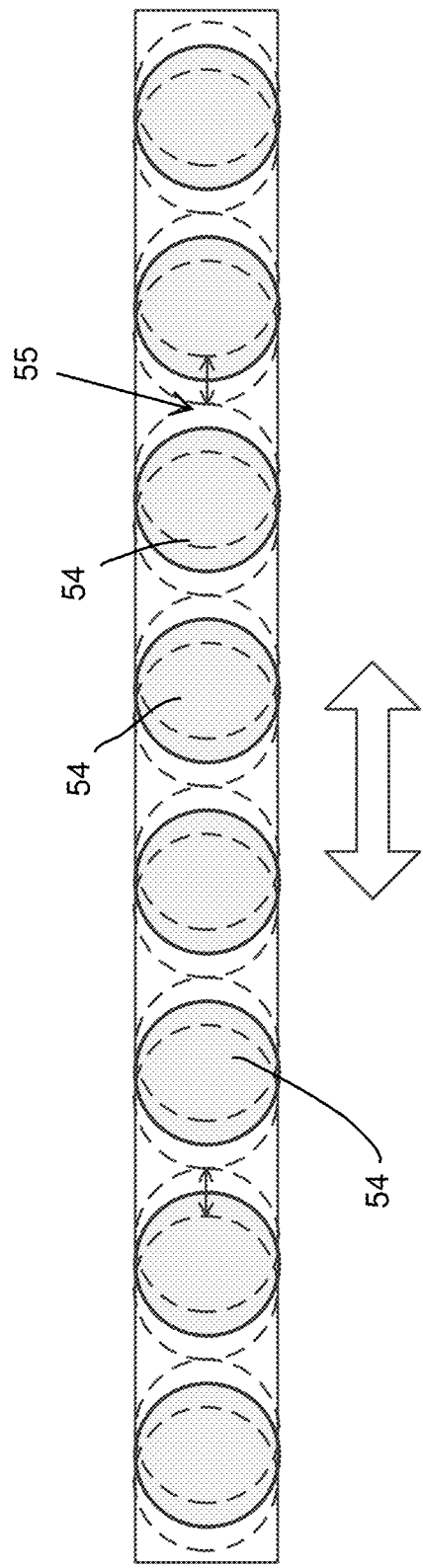
FIG. 15 is a plan schematic view of another embodiment of an exposure device for use in connection with an apparatus for producing a three-dimensional object in operation, according to aspects of the disclosure.

FIG. 15 illustrates an embodiment of an array 55 of the outlets 54 of the exposure assembly 60 that are configured for positional adjustment in the y-direction. In one embodiment, this positional adjustment may be accomplished by mounting the array 55 on a structure that is configured for translational/sliding movement in one embodiment, which sliding movement may be actuated by a piston, jack screw, or other structure configured for one-dimensional movement. In another embodiment, this positional adjustment may be accomplished by mounting the array 55 on a structure that is configured for angular/tilting movement, which may be actuated by a piston, jack screw, or other structure configured to raise and lower one or both lateral ends of the array 55. In a further embodiment, the outlets 54 may be adjustable individually or in discrete groups or clusters. The outlets 54 may further be configured for rapid reciprocation in the y-direction, permitting a single outlet 54 to direct waves 53 at an area that is enlarged in the y-direction. This y-direction adjustment and/or reciprocation permits the lateral (y-direction) extremities of the exposure area to be more precisely selected, improving the resolution of the exposure assembly 60. It is understood that the array 55 may include a larger number of rows and/or different offset arrangements in other embodiments.

Figure 16:
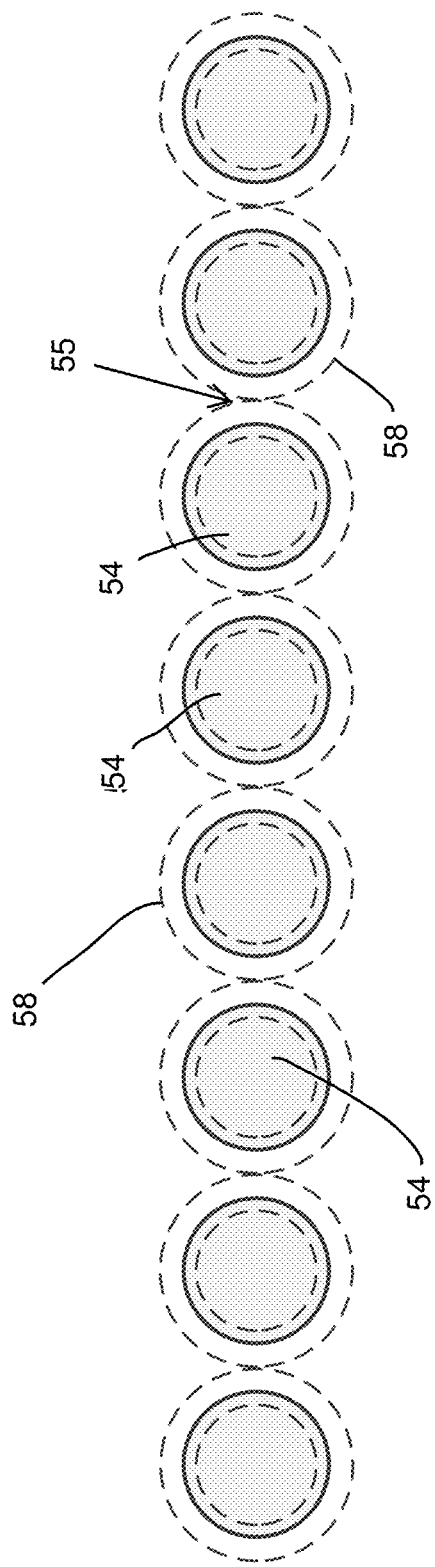
FIG. 16 is a plan schematic view of another embodiment of an exposure device for use in connection with an apparatus for producing a three-dimensional object in operation, according to aspects of the disclosure.

FIG. 16 illustrates an embodiment of an array 55 of the outlets 54 of the exposure assembly 60 that are configured for adjustment in output power. This adjustment in output power may be accomplished by varying the output power of the exposure device 50. In one embodiment, the adjustment in output power may be configured to adjust the size of the exposure area 58 of each outlet 54, thereby permitting the lateral (y-direction) extremities of the exposure area to be more precisely selected, improving the resolution of the exposure assembly 60. As seen in FIG. 16, the size of the exposure area 58 may be increased or decreased (indicated by broken lines) by increasing or decreasing the output power, respectively. In another embodiment, the adjustment in output power may be customized to the properties of the flowable material 36, as some materials 36 may require larger or smaller amounts of power for solidification. It is understood that other factors, such as travel speed of the deposition mechanism 30, may influence the desired output power.

FIG. 17 illustrates an embodiment of an array 55 of the outlets 54 of the exposure assembly 60 that are configured such that a first subset 132 of the array 55 is configured for emitting waves 53 having a first property and a second subset 133 of the array is configured for emitting waves 53 having a second property. In one embodiment, the first and second subsets 132, 133 may be configured for emitting waves having different power output levels, permitting significantly greater versatility in production. For example, the first subset 132 may include smaller outlets 54 (e.g., smaller diameter optical fibers 61) with relatively smaller power output levels that are more tightly packed together, to permit greater y-direction resolution for critical dimensions, and the second subset 132 may include larger outlets 54 (e.g., larger diameter optical fibers 61) with relatively larger power output levels to permit more rapid solidification for filling the body of an object. The different power outputs may be achieved by connecting the outlets 54 of the different subsets 132, 133 to different exposure devices 50, connecting the outlets 54 of the different subsets 132, 133 to a single exposure device 50 that is capable of power variation, or by the entrance ends 62 of the second subset 133 receiving waves 53 emitted by a larger number of pixels (if a DLP projector is used) due to their larger size. A combination of outlets 54 from different subsets 132, 133 (including laterally overlapping outlets 54) may be activated to permit further process variability, such as further increased exposure power and/or a combination of high power for the middle portions of the object 11 and finer resolution at the edges of the object 11. In an alternate embodiment, some of these benefits may be achieved using subsets 132, 133 of smaller and larger diameter optical fibers 61 without having any difference in power output between the two subsets 132, 133. In another embodiment, the outlets 54 of the first and second subsets 132, 133 may be connected to different exposure devices that emit different wavelengths of waves 53 that may cure different types of materials 36 or to cure one material 36 at different rates. It is understood that a larger number of subsets 132, 133 with further different properties may be used in other embodiments, and that the waves 53 emitted by each subset may have multiple properties differing from each other.

Figure 18:
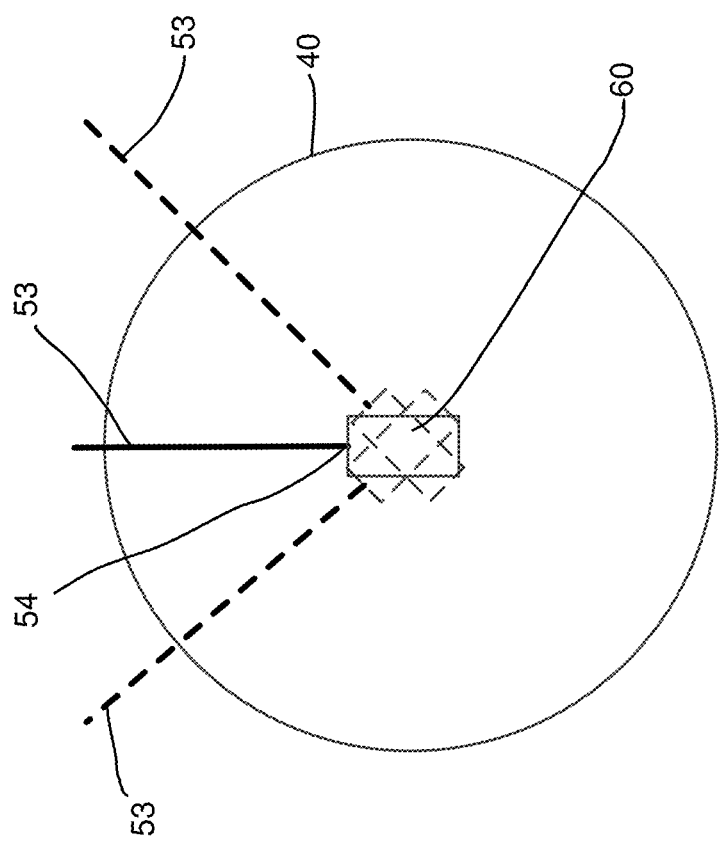
FIG. 18 is a side schematic view of another embodiment of an exposure device and an applicator for use in connection with an apparatus for producing a three-dimensional object in operation, according to aspects of the disclosure.

FIG. 18 illustrates one embodiment of a structure for directing the waves 53 so that the exposure site 51 is located approximately at the application site 41 in one embodiment, or so that the exposure site 51 is offset from the application site 41 (ahead or behind the application site 41 in the direction of travel) in another embodiment, as described herein and illustrated with respect to FIG. 1. In this embodiment, the aim of the outlets 54 is adjustable forwardly and rearwardly in the x-direction. As illustrated in FIG. 18, the outlets 54 of the exposure assembly 60 may be configured to be tiltable in one embodiment, such as by mounting the outlets 54 using a structure (e.g., braces 65) that is rotatable or pivotable over a range of movement to advance or retard the exposure site 51. For example, the deposition mechanism 30 may include a mounting structure for the outlets 54 that is mounted on a gimbal to permit single-axis rotation. It is understood that the degree of tilting shown in FIG. 18 may be exaggerated compared to the actual degree of tilting necessary to achieve this purpose in many embodiments. In another embodiment, the exposure device 50 may include multiple arrays of outlets 54 that are directed at different angles, where selective activation of the outlets 54 allows the exposure site 51 to be advanced or retarded. In a further embodiment, the outlets 54 may be aimed differently by translational movement in the x-direction. It is understood that the degree of offset of the exposure site 51 may depend on the properties of the flowable material 36 and the speed of the deposition mechanism 30, among other factors. Offsetting the exposure site 51 may improve bonding of the flowable material 36 to the surface and/or separation of the flowable material 36 from the roller 42. On rollers 42 having greater lengths, contraction of the material 36 as it solidifies can pull on the surface of the roller 42 if the material 36 is not properly separated from the roller 42, causing dimensional distortion (e.g., bowing outward) of the surface of the roller 42. Offsetting the exposure site 51 can therefore be particularly advantageous for such configurations.

Figure 19:
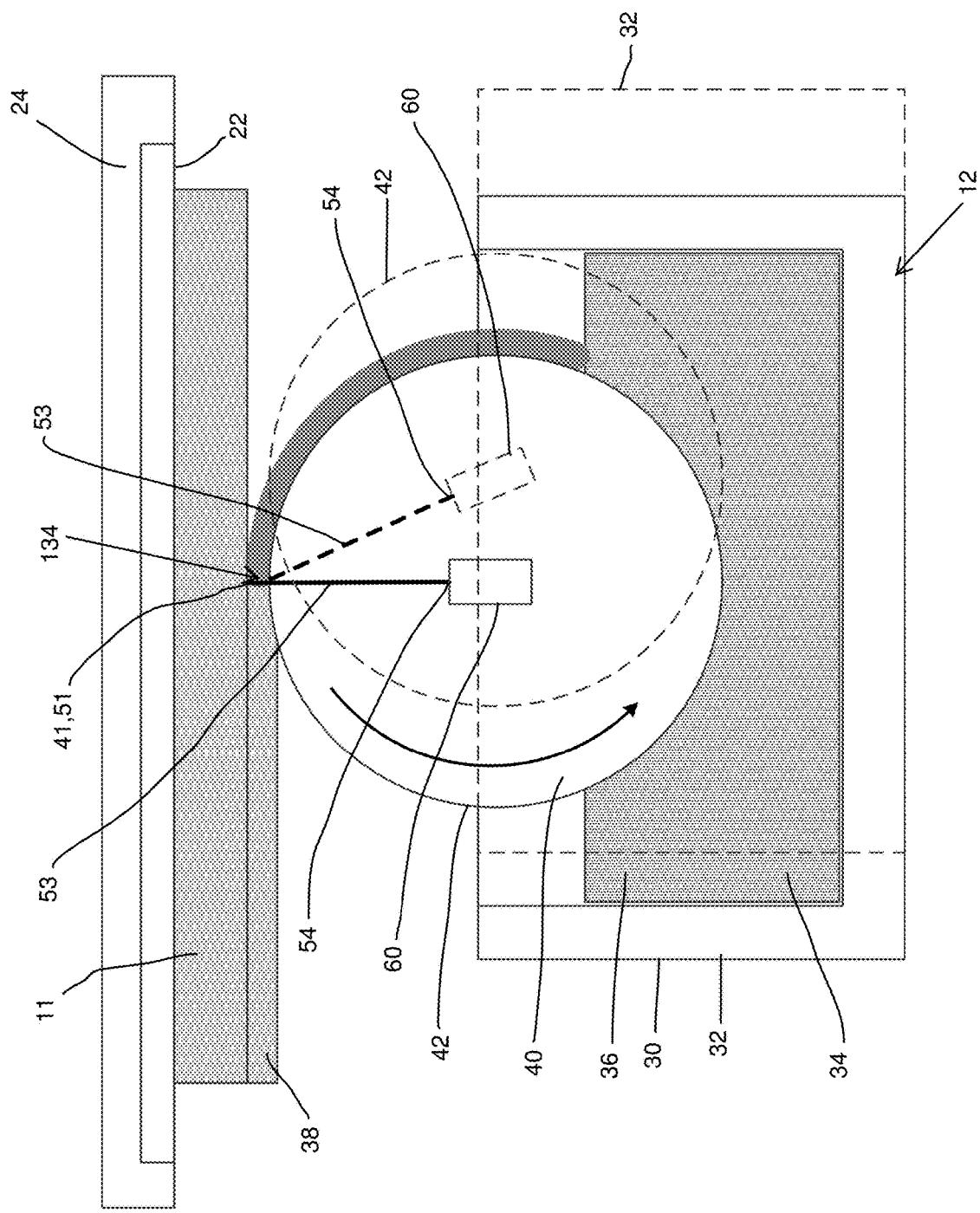
FIG. 19 is a side schematic view illustrating one embodiment of operation of the exposure device and applicator of FIG. 18 in connection with an apparatus for producing a three-dimensional object in operation, according to aspects of the disclosure.
Figure 20:
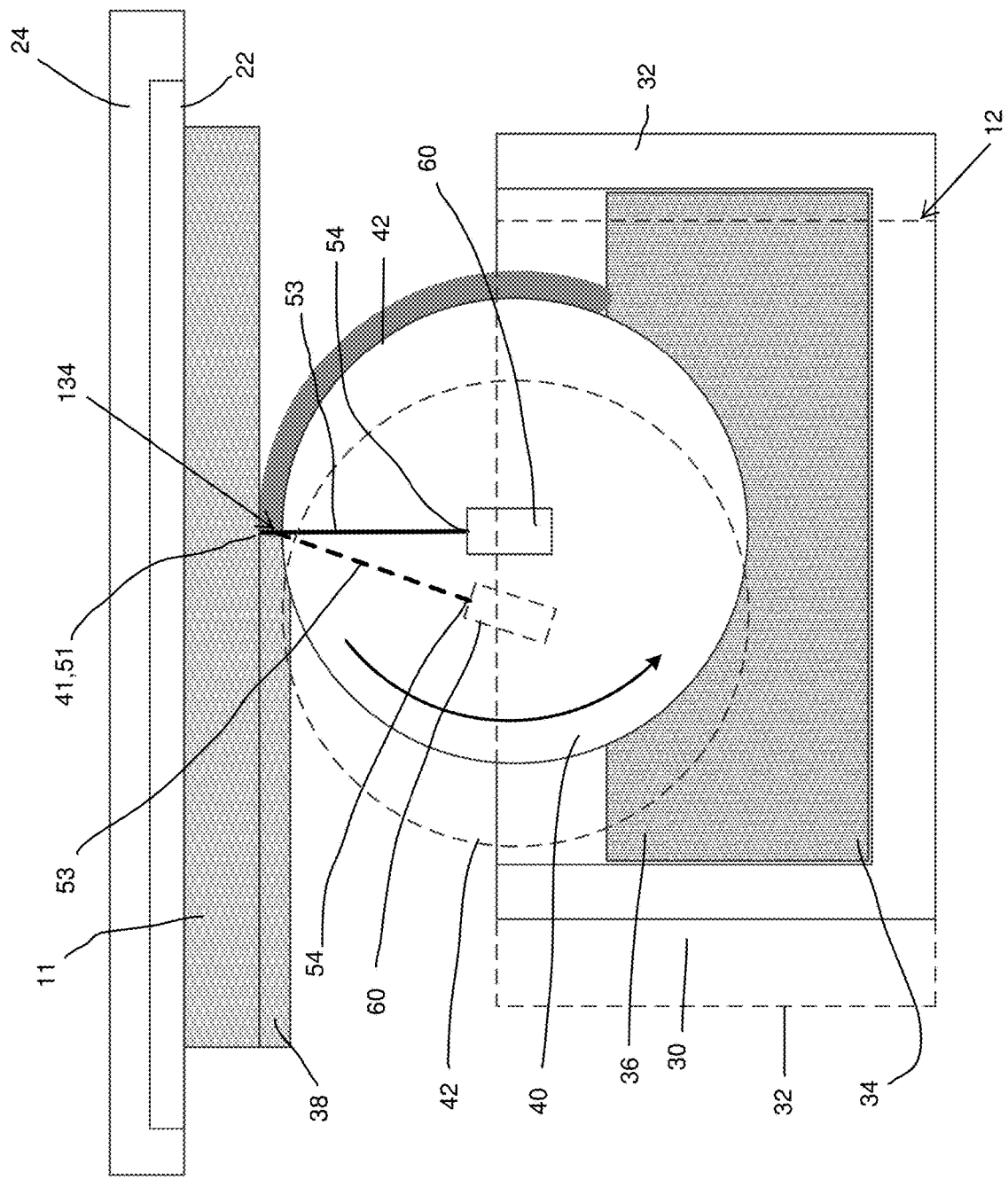
FIG. 20 is a side schematic view illustrating another embodiment of operation of the exposure device and applicator of FIG. 18 in connection with an apparatus for producing a three-dimensional object in operation, according to aspects of the disclosure.

FIGS. 19 and 20 illustrate an embodiment of a deposition mechanism 30 with an exposure assembly 60 capable of directing the waves 53 offset from the application site 41. In the embodiment of FIGS. 19 and 20, the aim of the outlets 54 is adjusted along the direction of travel of the deposition mechanism as the applicator 40 passes the application site 41 to focus the waves 53 on a defined point 134 within the build area 22 as the applicator 40 passes the defined point 134, to increase the exposure time of the defined point 134. As illustrated in FIG. 19, the exposure assembly 60 is configured for continuously adjusting the aim of the outlets 54 rearwardly in the travel direction so that the aim of the outlets 54 tracks the defined point 134 and continue to focus on the defined point 134 after the applicator 40 (i.e., the apex of the roller 42 in this embodiment) passes the defined point 134. As illustrated in FIG. 20, the exposure assembly 60 is configured for continuously adjusting and re-adjusting the aim of the outlets 54 forwardly in the travel direction so that the aim of the outlets 54 tracks the defined point 134 in advance of the applicator 40 and continue to focus on the defined point until the applicator 40 (i.e., the apex of the roller 42 in this embodiment) arrives at the defined point 134. This creates moments of stationary exposure at the defined point 134, and it is understood that the start/stop aim angles may be based on factors such as build speed and the properties of the material 36. It is understood that the embodiments in FIGS. 19 and 20 may be combined so that the aim of the outlets 54 tracks the defined point 134 both in advance of and behind the arrival of the applicator 40 at the defined point 134.

In a further embodiment, an apparatus 12 as described herein may be enclosed within a sealed chamber that may be temperature controlled, pressure-controlled, humidity-controlled, and/or filled with a specific gas (including mixtures of gases). Temperature, pressure, and humidity control may be able to influence build speed and thereby improve efficiency. Additionally, the apparatus 12 has the ability to build hollow, sealed objects 11, and thus, selection of the environmental gas may permit production of a hollow, sealed object 11 filled with a specified gas. For example, such an object 11 filled with an inert gas may be useful, e.g., for aerospace applications.

FIGS. 21-26 illustrate additional embodiments of a manufacturing apparatus 12 that is usable with a system 10 and method as described herein, and which may include any components of the system 10 and method according to any embodiments herein. For example, the apparatus 12 of the embodiments of FIGS. 21-26 may be connected to a computer controller 100 in communication with one or more components of the apparatus 12 and configured for controlling operation of the apparatus 12 and/or the components thereof to manufacture an object 11. The embodiments of FIGS. 21-26 have deposition mechanisms 30 that differ from the embodiments of FIGS. 1-20, including a supply 34 of flowable material 36, an applicator 40, an exposure assembly 60, and other components that are configured differently from other embodiments described herein. The supply 34, the applicator 40, the exposure assembly 60, and other components of the deposition mechanisms 30 illustrated in FIGS. 21-26 may be used in connection with other components and features of other embodiments described herein. The supply 34, the applicator 40, the exposure assembly 60, and other associated structures in the embodiments of FIGS. 21-26 may be incorporated into a deposition mechanism 30 and apparatus 12 as shown in FIGS. 1-4 and 6-13. For example, the supply 34, the applicator 40, and other associated structures in the embodiments of FIGS. 21-26 may be mounted on a carriage 32 and/or connected to other components of an exposure assembly 60 according to one or more of the embodiments shown and described herein to form a deposition mechanism 30, and that such a deposition mechanism 30 may be used in connection with a track 14 and/or a support assembly 20 according to one or more of the embodiments shown and described herein. It is understood that the apparatuses 12 in FIGS. 21-26 may be provided with any of the components, features, and functionality described herein with respect to other embodiments, including in particular, but without limitation, components, features, and configurations of the exposure assembly 60 and the exposure device 50, the carriage 32, various modular components, etc. Components that have already been described with respect to one or more embodiments herein may not be described again with respect to FIGS. 21-26 for the sake of brevity, and identical reference numbers may be used to reference components previously described.

The deposition mechanisms 30 shown in FIGS. 21-26 may further be configured as part of an autonomous unit 90 according to one or more of the embodiments shown and described herein, and may have onboard a processor 2604, a memory 2612, and/or other computer components necessary for executing computer-executable instructions to automate the autonomous unit 90 and/or communicate with the computer controller 100. The deposition mechanisms 30 in FIGS. 21-26 may be incorporated into an autonomous unit 90 as shown FIGS. 6-13 with some modifications, and FIG. 27 illustrates an example of an autonomous unit 90 and associated system 10 configured to use the deposition mechanism 30 of FIG. 25, as described below.

Figure 21:
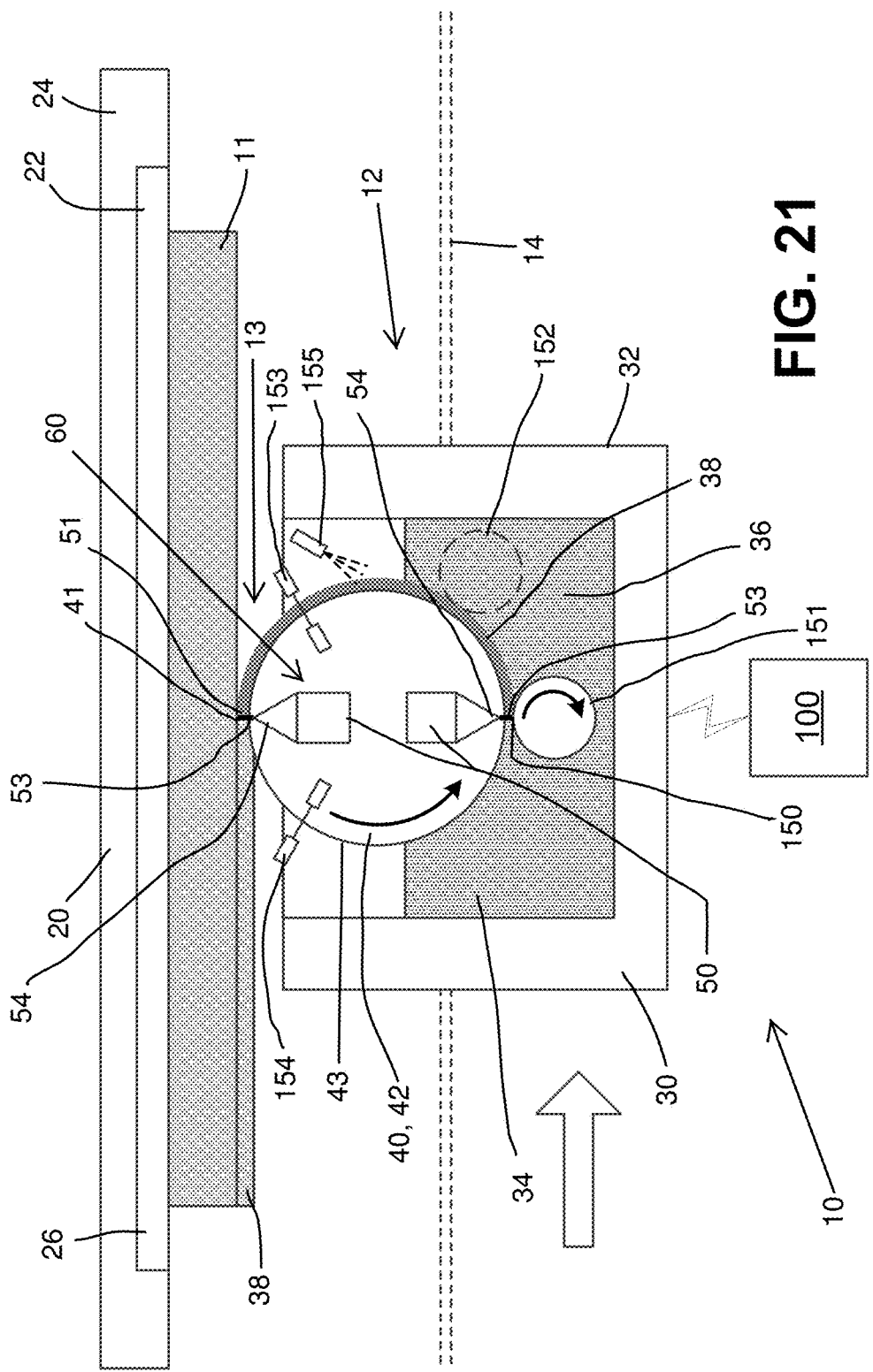
FIG. 21 is a side schematic view of another embodiment of a system and apparatus for producing a three-dimensional object in operation, according to aspects of the disclosure.

The deposition mechanism 30 in FIG. 21 utilizes an initial exposure site 150 that at least partially forms the layer 38 prior to the material 36 reaching the application site 41, such that the exposure site 51 located at or near the application site 41 becomes a secondary exposure site 51 to bond the layer 38 to the object 11. In the embodiment of FIGS. 21-26, the initial exposure site 150 is located within the flowable material 36 (i.e., submerged). The deposition mechanism 30 in FIG. 21 includes a thickness limiter in the form of a secondary roller 151 spaced from the roller 42, such that the space between the roller 42 and the secondary roller 151 defines the thickness of the layer 38 formed at the initial exposure site 150. The apparatus 12 may include a mechanism for adjusting the spacing between the rollers 42, 151 in order to change the thickness of the layer 38, which may be a manual or automated mechanism as described herein. The secondary roller 151 in one embodiment may be made from a silicone rubber material, which generally has weak adhesion to most photo-curable resins. Other materials with weak adhesion properties to the solidified layer 38 may be used as well. In one embodiment, the material for the secondary roller 151 may be selected so as not to adhere to the layer 38 upon solidification. The secondary roller 151 may be opaque in the embodiment of FIG. 21, because the waves 53 need not penetrate the surface of the secondary roller 151. In fact, it may be desirable for the waves 53 not to penetrate the secondary roller 151 in order to avoid inadvertent solidification of the material 36. The secondary roller 151 may be configured to rotate such that the surface of the secondary roller 151 is moving in the same general direction and speed as the adjacent surface of the roller 42. The secondary roller 151 may be powered for such rotation in one embodiment or may be freely rotating in another embodiment. One or more additional secondary rollers 152 may be used in other embodiments (shown in broken lines in FIG. 21), and the additional secondary roller(s) 152 may be used to hold the layer 38 in place and/or provide an additional exposure site. The secondary roller 151 and the initial exposure site 150 are shown in FIG. 21 as being positioned at the bottom of the roller 42, opposite the application site 41, but this position may be changed in other embodiments. For example, placing the secondary roller 151 to the side of the roller 42 may reduce the necessary depth of the supply vat 34. In another embodiment, the deposition mechanism 30 in FIG. 21 may use a different type of thickness-limiting structure at the initial exposure site 150, such as a flat surface or other moving or non-moving surface. In a further embodiment, the deposition mechanism in FIG. 21 may not use any thickness-limiting structure at the initial exposure site 150, and layer thickness (depth of cure) at the initial exposure site 150 can be regulated without a thickness limiter, such as by adjusting the exposure intensity and or by using certain additives in the resin. A mechanism for adjusting the spacing between the roller 42 and the secondary roller 151 as discussed herein may also be used to move the secondary roller 151 away from the roller 42 and out of position for use at the initial exposure site 150, permitting the secondary roller 151 to be used selectively for initial exposure as desired.

Figure 22:
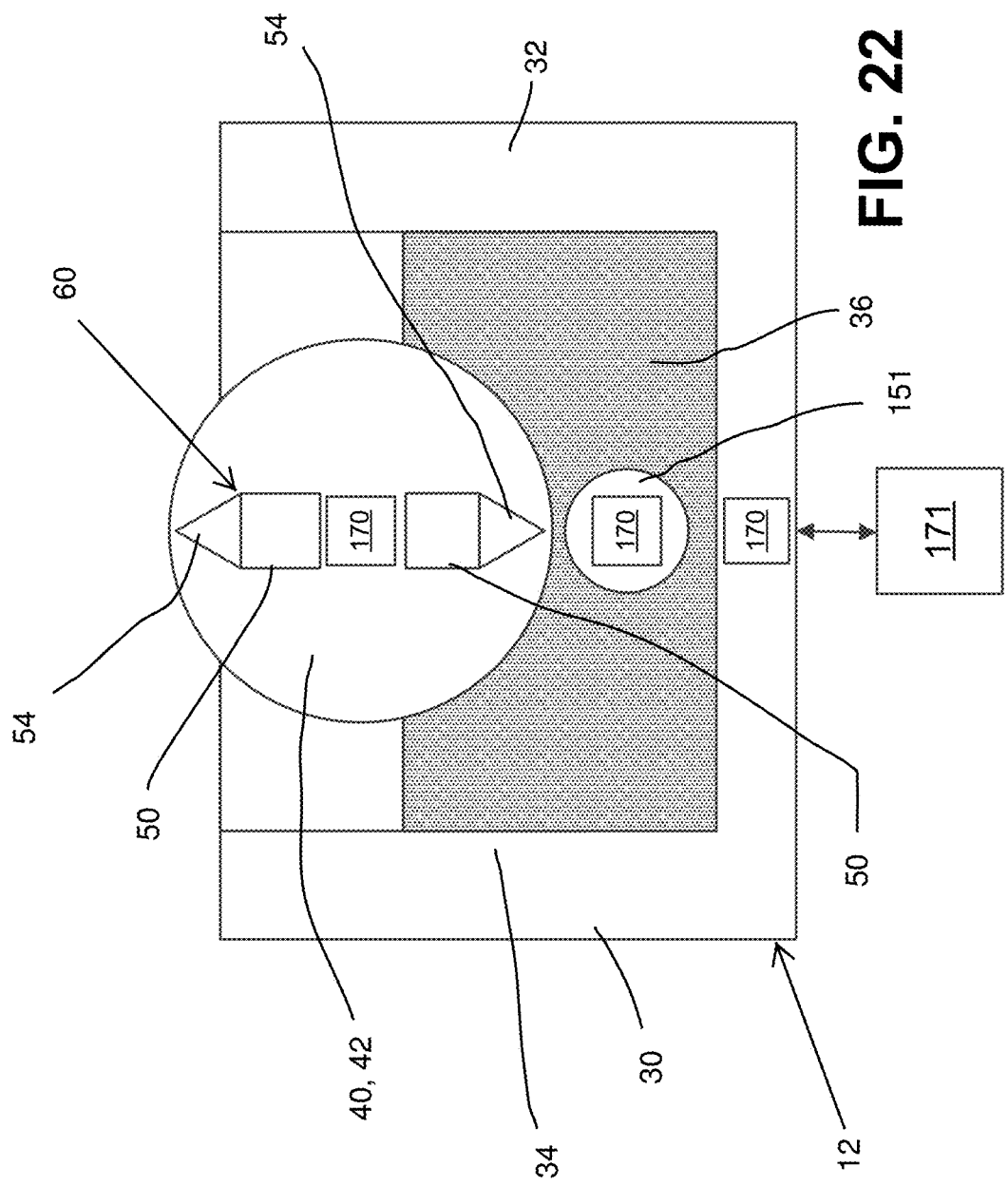
FIG. 22 is a side schematic view of a portion of the system and apparatus of FIG. 21, including temperature regulation elements, according to aspects of the disclosure.

In the embodiments of FIGS. 22 and 26, the deposition mechanism 30 may include one or more temperature regulation elements 170 configured to control the temperature of the flowable material 36 in the supply vat 34. For example, some resins may function better at temperatures above ambient temperature, and the deposition mechanism 30 may include one or more heating elements to increase the temperature of the flowable material 36 to a more optimal temperature. As another example, solidification of the flowable material 36, such as by curing, may generate heat that will raise the temperature of the flowable material 36 to an undesirable level, particularly when the initial exposure site 150 is submerged beneath the flowable material 36. In this example, the deposition mechanism 30 may include one or more cooling elements to limit the temperature increase of the flowable material 36 and/or to cool the flowable material 36 to a more optimal temperature. The temperature regulation element(s) 170 may be placed in various locations, including within the supply vat 34, within or adjacent the walls of the supply vat 34, or within the roller 42 and/or the secondary roller 151. An example of such a temperature regulation element 170 is a fluid conduit circulating a heating or cooling fluid which may be supplied from an external source 171 of heating and/or cooling fluid, but other temperature regulation elements 170 may be used in other embodiments. The same conduit(s) may be used to selectively circulate heating or cooling fluid as desired. The deposition mechanism 30 in one embodiment may further include separate temperature regulation elements 170 configured for heating and cooling. In one embodiment, the temperature regulation element(s) 170 may initially be used to raise the temperature of the flowable material 36 to a suitable or optimal temperature for production of the article 11, but after heat builds up from extended solidification/curing, the temperature regulation element(s) may be used to reduce the temperature of the flowable material 36 and/or limit temperature increase to maintain a suitable or optimal temperature.

The exposure assembly 60 in FIG. 21 includes two exposure devices 50 each having its own outlet 54, such that one exposure device 50 emits waves 53 toward the initial exposure site 150 and the other exposure device 50 emits waves 53 toward the secondary exposure site 51 at the application site 41. In one embodiment, the exposure assembly 60 includes two arrays 55 of outlets 54 as described herein, each of which may be provided by an exposure device 50 in the form of an array 55 of LEDs 59 directed toward the exposure site 51, 150 or an array 55 of optical fibers 61 connected to an exposure device 50 in the form of a DLP projector or an array of LEDs 59. The exposure assembly 60 may further include focusing mechanisms 66 to focus the waves 53 between the outlets 54 and the exposure site 51, 150, as also described herein. The exposure devices 50 may be configured to selectively solidify portions of the flowable material 36 as described herein in order to produce each layer 38, such as by selective activation of specific outlets 54 and other techniques. In one embodiment, the exposure device 50 for the initial exposure site 150 may be configured to selectively activate outlets 54 to solidify the same portions of the layer 38 as the exposure device 50 for the secondary exposure site 51. In a further embodiment (not shown), some or all of the outlet(s) 54 for the initial exposure site 150 may be located inside the secondary roller 151, such that the secondary roller 151 has a structure similar to the roller 42 shown and described herein, e.g., as shown in FIGS. 1, 3A-4, and 6-13. It is understood that the exposure assembly 60 may be configured to advance or retard the exposure sites 51, 150 as desired, as described herein.

Figure 23:
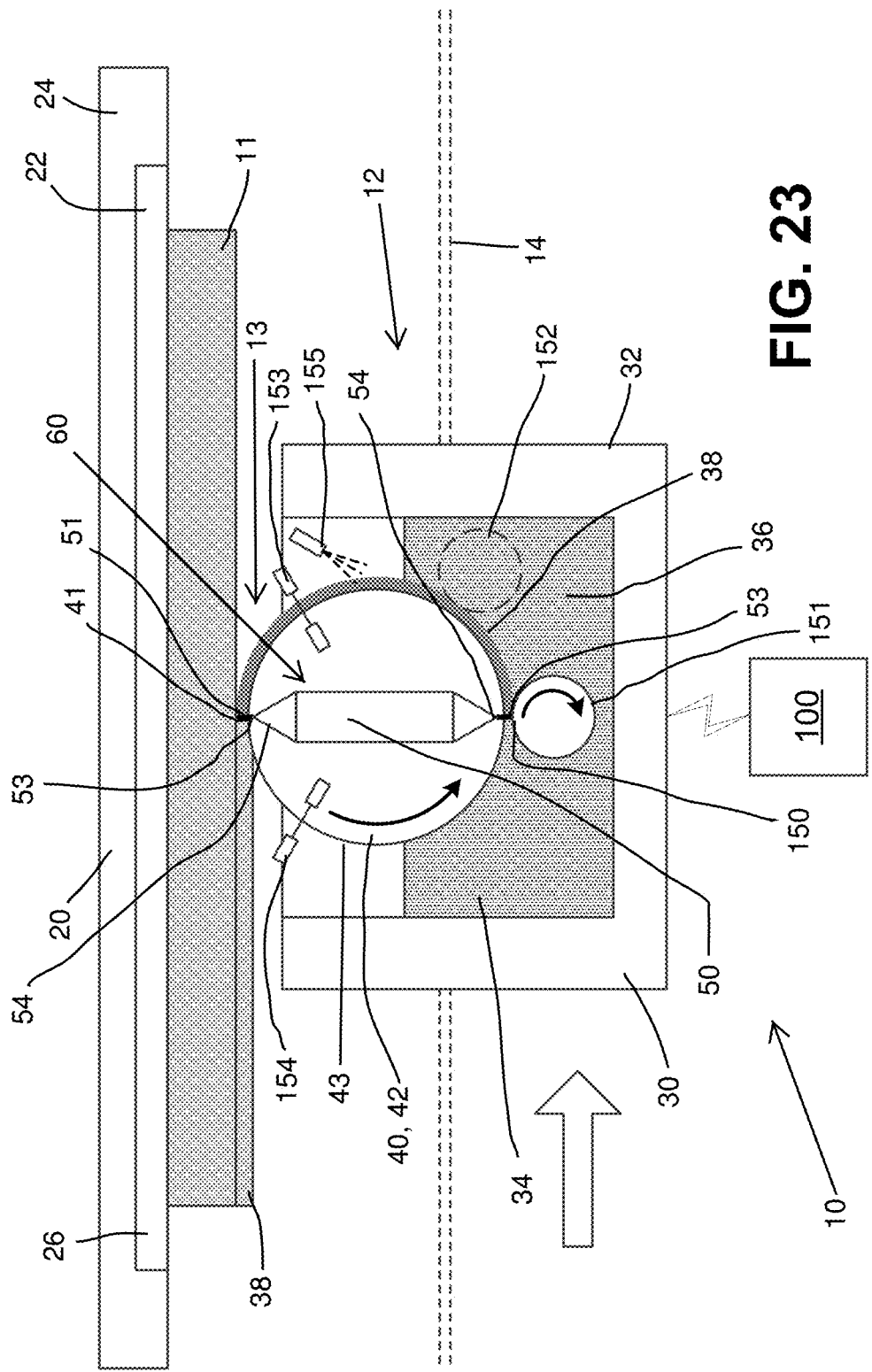
FIG. 23 is a side schematic view of another embodiment of a system and apparatus for producing a three-dimensional object in operation, according to aspects of the disclosure.

In other embodiments, the apparatus 12 and deposition mechanism 30 of FIG. 21 may be provided in a similar or identical configuration with an exposure assembly 60 having a different configuration. FIGS. 23-24 illustrate such similar or identical apparatuses 12 and deposition mechanisms 30 with different exposure assemblies 60, and it is understood that the embodiments of FIGS. 23-24 may include any of the components and features described herein with respect to FIG. 21. As with other embodiments described herein, the exposure device(s) 50 are schematically depicted as being located inside the roller 42 in FIGS. 21-24, but in many configurations, the exposure device(s) are located outside the roller 42 with the outlet(s) 54 located inside the roller 42. In the embodiment of FIG. 22, the exposure assembly 60 includes a single exposure device 50 that has two outlets 54 or arrays 55 of outlets 54 directed toward the two exposure sites 51, 150. For example, the exposure assembly 60 may include a single exposure device 50 in the form of an array of LEDs 59 or a DLP projector, with optical fibers 61 arranged and directed to form two arrays 55 of outlets 54 within the roller 42. In the embodiment of FIG. 24, the exposure assembly 60 includes a single exposure device 50 with a single outlet 54 or single array 55 of outlets 54, where the outlets 54 are moveable to direct the waves 53 at a desired exposure site 51, 150. For example, the outlets 54 (e.g., exit ends 63 of optical fibers 61 or LEDs 59) may be mounted on a gimbal or other rotatable structure and may use alternating strobing to achieve this functionality. In a further embodiment, the focusing mechanism 66 may include one or more moveable mirrors configured to reflect and/or direct the waves 53 toward the desired exposure site 51, 150, which may be moveable by mounting on a gimbal or other rotatable structure and may use alternating strobing to achieve this functionality. It is understood that other configurations of exposure assemblies 60 may be used in connection with the embodiments of FIGS. 21-24, including any configuration described herein with respect to another embodiment.

The deposition mechanism 30 in FIG. 21 operates by at least partially or completely solidifying the layer 38 at the initial exposure site 150, beneath the surface of the flowable material 36, at the desired thickness. The layer 38 is then carried upward to the application site 41 by the roller 42, and is then bonded to the object 11 and (if necessary) further solidified at the secondary exposure site 51. It is understood that the apparatus 12 may further include one or more additional secondary exposure devices 80, such as in FIG. 4, for further solidification of the layer 38. In one embodiment, the deposition mechanism 30 may be configured to encourage proper adhesion of the layer 38 at the proper time. For example, the secondary roller 151 may have an outer surface that has a lower adhesion property to the material forming the layer 38 than the outer surface 43 of the roller 42, to encourage the layer 38 to adhere to the roller 42 to be carried to the application site 41 rather than adhering to the secondary roller 151. Likewise, the outer surface 43 of the roller 42 may have a lower adhesion property to the material forming the layer 38 than the surface of the object 11 to encourage the layer 38 to adhere to the object 11 and/or the build platform 22, rather than adhering to the roller 42. The apparatus 12 in FIG. 21 also includes a removal device 155 for removal of excess uncured flowable material 36, which is in the form of an air wiper in FIG. 21 but may additionally or alternately include a squeegee or other mechanical removal device in other embodiments. The removal device 155 is configured to remove most, but not all, of the flowable material 36 from the layer 38, leaving a small amount of unsolidified material 36 on the layer 38 for bonding of the layer 38 to the object 11. The characteristics of the removal device 155, e.g., the angle and power of an air wiper, may be configured in order to ensure proper removal of the flowable material 36 without damaging or detaching the layer 38 from the surface(s) to which it is adhered. The removal device 155 may further be configured to direct removed material 36 back into the supply 34 to decrease waste. It is understood that additional removal devices 155 may be used, including at locations to remove flowable material 36 after the layer 38 is adhered to the object 11.

The apparatus 12 in the embodiment of FIG. 21 includes sensors to confirm proper operation of the deposition mechanism 30, such as build verification sensors 153 and transfer verification sensors 154. The build verification sensor 153 is positioned to scan the surface of the roller 42 between the initial exposure site 150 and the secondary exposure site 51 to confirm that the layer 38 was created and is adhered to the roller 42. The transfer verification sensor 154 is positioned to scan the surface of the roller 42 after passing the secondary exposure site 51 to confirm that the layer 38 separated from the roller 42 and adhered to the object 11. Both the build and transfer verification sensors 153, 154 may be an array of photosensors or other sensor(s) capable of detecting presence of the layer 38. If either of the sensors 153, 154 detects that the relevant actions were not completed properly, e.g., the build verification sensor 153 does not sense the layer 38 or the transfer verification sensor 154 does sense the layer 38 present, production can be stopped in order to address the problem and avoid a manufacturing defect that may not be discovered until much later. The use of the verification sensors 153, 154 helps to ensure reliable and accurate production of the object 11.

FIG. 25 illustrates another embodiment of an apparatus 12 and deposition mechanism 30 which is configured to build an object 11 on a build platform 22 located below the applicator 40. The embodiment of FIG. 25 includes many of the same components as the embodiments of FIGS. 21-24, including the secondary roller 151, the optional additional secondary roller(s) 152, the verification sensors 153, 154, and the removal device 155. These components share the same functions as in FIGS. 21-24, although some components are relocated in FIG. 25, and these components may not be described in detail with respect to FIG. 25. It is noted that the embodiment of FIG. 25 depicts the use of two exposure devices 50 each having an outlet 54 or array 55 of outlets 54, and that any configuration of an exposure assembly 60 described herein may be used in connection with the embodiment of FIG. 25, including any of the configurations in FIGS. 22-24. In the embodiment of FIG. 25, the supply 34 of the flowable material 36 holds the flowable material 36 above the application site 41 and in communication with only one side of the roller 42. The secondary roller 151 is positioned alongside of the roller 42 and immersed in the flowable material 36 to create an initial exposure site 150 between the roller 42 and the secondary roller 151. As described above, the spacing between the rollers 42, 151 determines the thickness of the layer 38. The layer 38 is then carried by the roller 42 over the top of the roller and down toward the application site 41 and the secondary exposure site 51 for bonding to the object 11 and/or the build platform 22. The deposition mechanism in FIG. 25 further includes a containment seal 163, such as a flexible lip or gasket, which resists leakage of the flowable material 36 downward out of the supply vat 34 at the junction between the supply vat 34 and the roller 42. In case some leakage may occur, a drip pan 164 is provided below the containment seal 163 to collect any flowable material 36 that passes through the seal 163. The drip pan 164 may be configured for returning the flowable material 36 to the supply vat 34, such as by using a pump mechanism or by being removable for dumping the flowable material 36 back into the supply vat 34. It is noted that the removal mechanism 155 in FIG. 25 is an air wiper configured to blow the excess material 36 back toward the supply 34.

The embodiments of FIGS. 21-26 using the additional solidification stage present advantages over existing additive manufacturing methods. For example, building the layer 38 before bonding to the object 11 permits improved shrink control during solidification. As another example, the additional solidification step avoids buildup of heat that may be involved in a curing process using fewer steps and produces a more fully cured/solidified layer 38. As a further example, at least the embodiments in FIG. 25 permits the production of an article 11 from the bottom upward, with the article 11 resting above the build platform 22, which can present advantages for production of many articles 11. The embodiments of FIGS. 21-26 are also capable of constructing an object 11 with only the minimum desired amount of flowable material 36 being incorporated into the object 11, because excess flowable material 36 can be removed from the layer 38 before bonding to the object 11. This minimizes the use of flowable material and increases cost-efficiency of the process. In one embodiment, up to 98% of excess resin is removed, allowing the part to be cleaned with detergent, rather than harsh chemicals. This also permits creation of an object with internal porosity, without unsolidified flowable material 36 being trapped in the internal interstices. The ability to produce such porous objects permits construction of objects with decreased weight and decreased material usage, increasing the versatility of the process and decreasing the cost of production. Such porous objects may also provide increased buoyancy, thermal insulation, and sound insulation properties, among other improved properties. The embodiments of FIGS. 21-26 may also be used to build a part with an internal honeycomb configuration, i.e., hexagonal cells (not shown). It is understood that objects 11 with internal porosity may include an external "shell" layer of solid (non-porous) material to form a smoother and more rigid exterior surface and resist ingress of moisture and other contaminants.

FIG. 27 illustrates an autonomous unit 90 and a build platform 22 configured to use a deposition mechanism 30 as shown in FIG. 25. The components of the autonomous unit 90 are the same as the unit 90 described herein and shown in FIGS. 6-13, and similar or identical components are not re-described with respect to this embodiment for the sake of brevity. The autonomous unit 90 in FIG. 27 is configured to hold a deposition mechanism 30 in which the application site 41 is at the bottom of the deposition mechanism 30. The unit 90 therefore has two legs 160 forming a space 161 between the legs 160, and the applicator 40 is configured to apply the layer 38 to build the object 11 in the space 161 between the legs 160 and below the applicator 40. FIG. 27 illustrates use of the autonomous unit 90 to build an object (not shown) on the build platform 22, such that the build platform 22 passes through the gap 161 during manufacturing. The height (z-position) of the deposition mechanism 30 is adjustable using the vertical adjustment mechanism 120 of the unit 90, and the height of the build platform 22 is also adjustable using a vertical adjustment mechanism 162 on the build platform 22. The combination of these adjustment mechanisms 120, 162 permit a great deal of relative movement between the deposition mechanism 30 and the build platform 22 for production of objects 11 having large heights.

Figure 29:
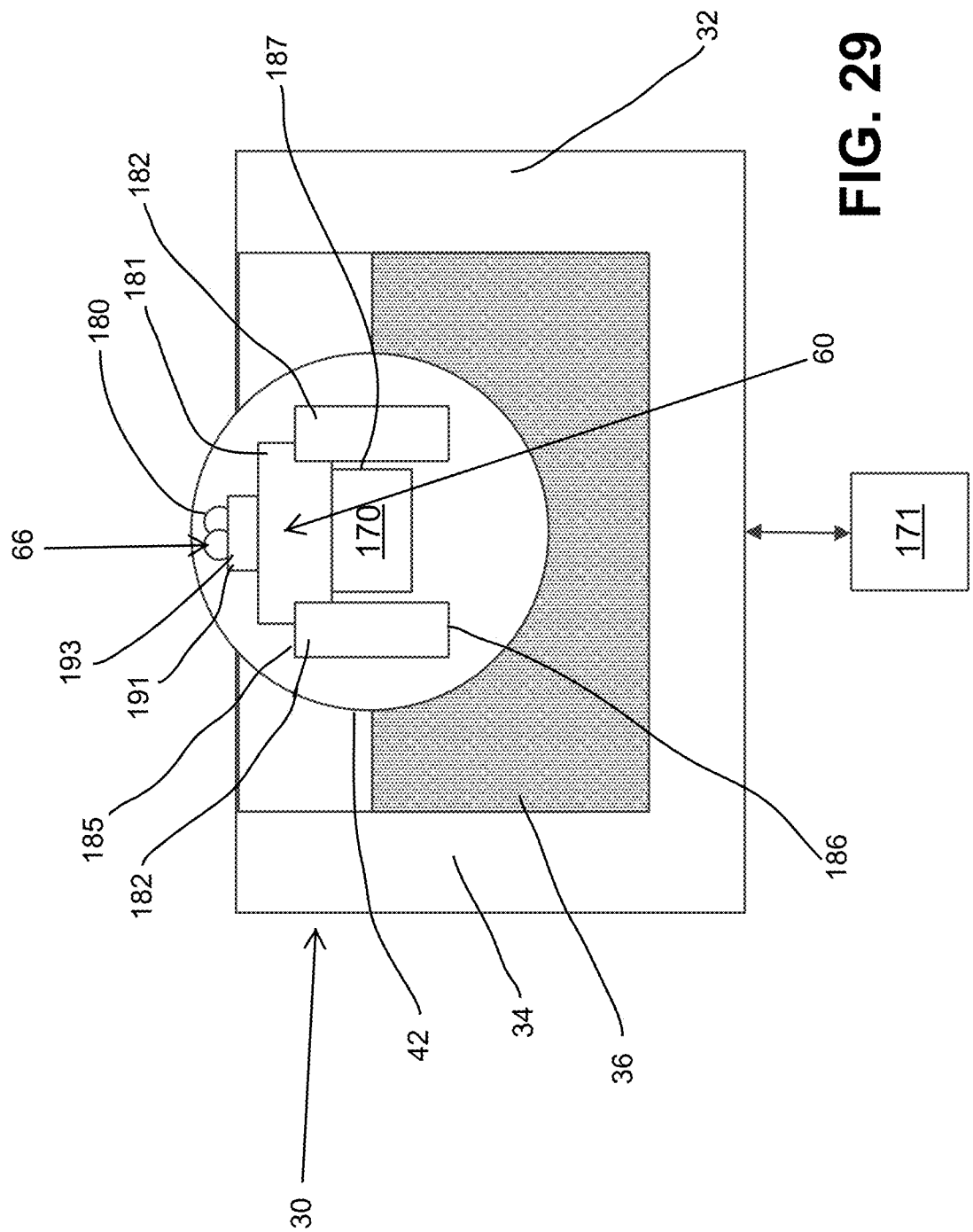
FIG. 29 is a side schematic view of another embodiment of an apparatus for producing a three-dimensional object, according to aspects of the disclosure.
Figure 30:
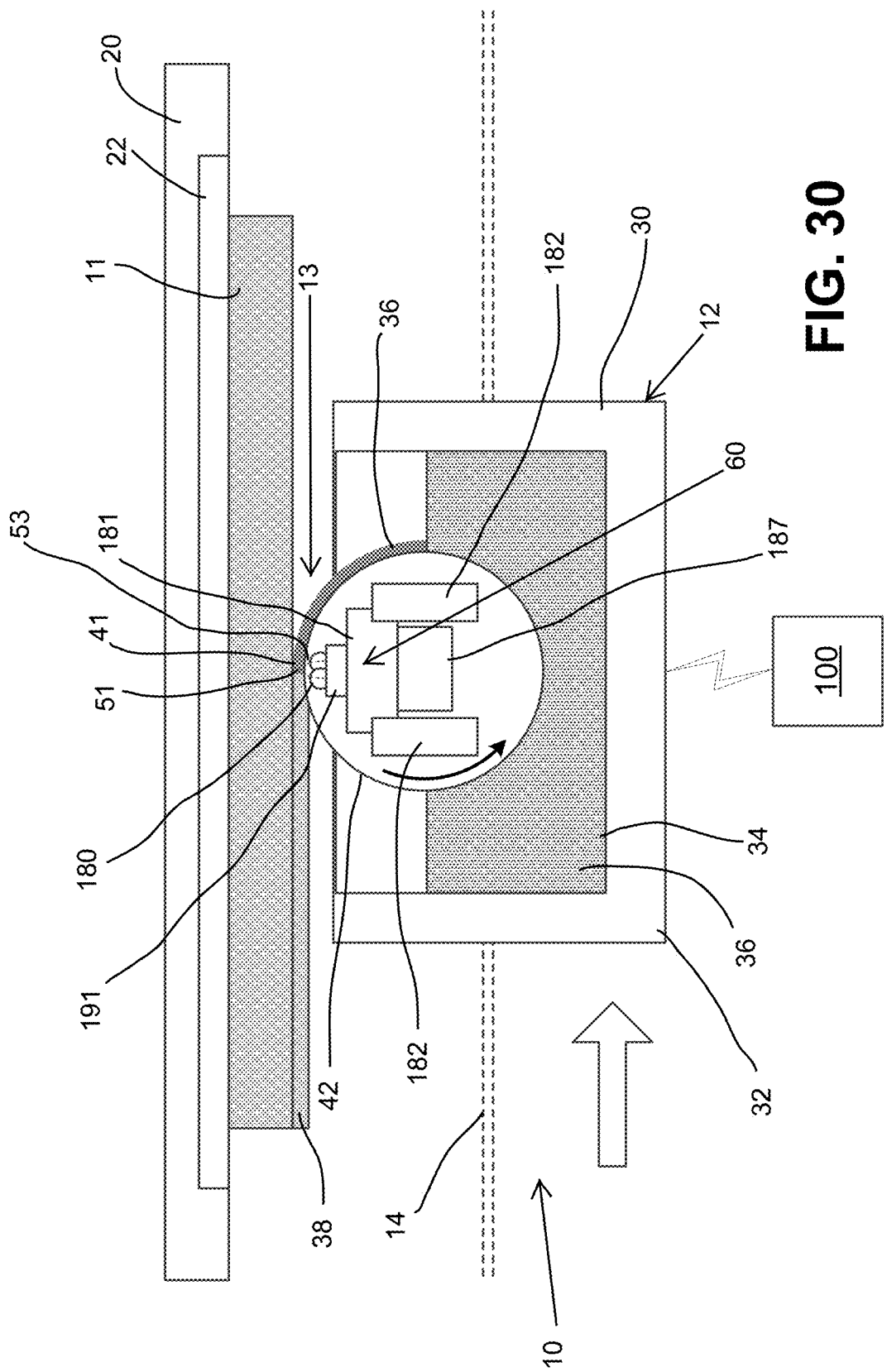
FIG. 30 is a side schematic view of the apparatus of FIG. 29 shown in operation.
Figure 31:
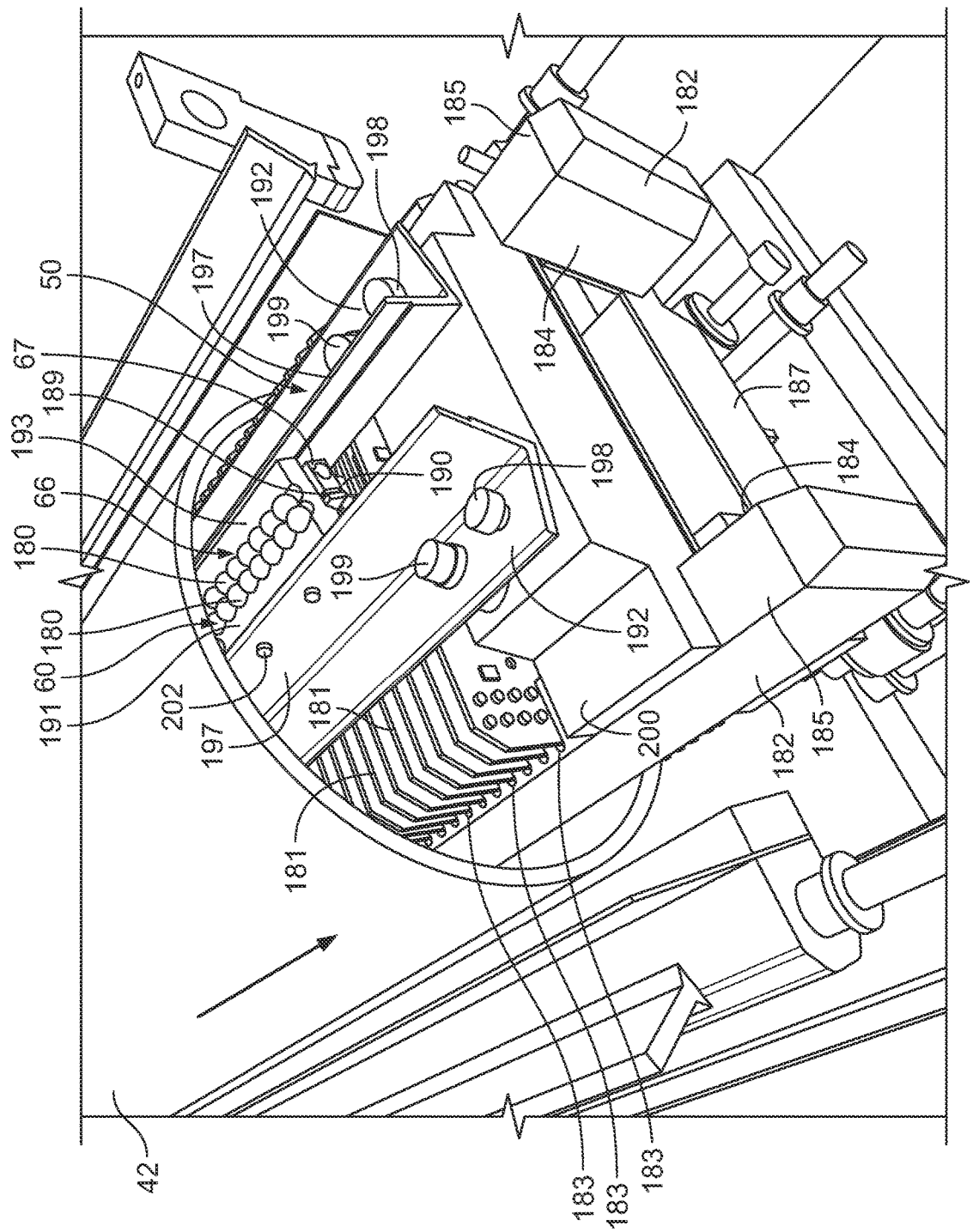
FIG. 31 is a partially broken away perspective view of a portion of one embodiment of the apparatus of FIGS. 29-30, according to aspects of the disclosure.
Figure 32:
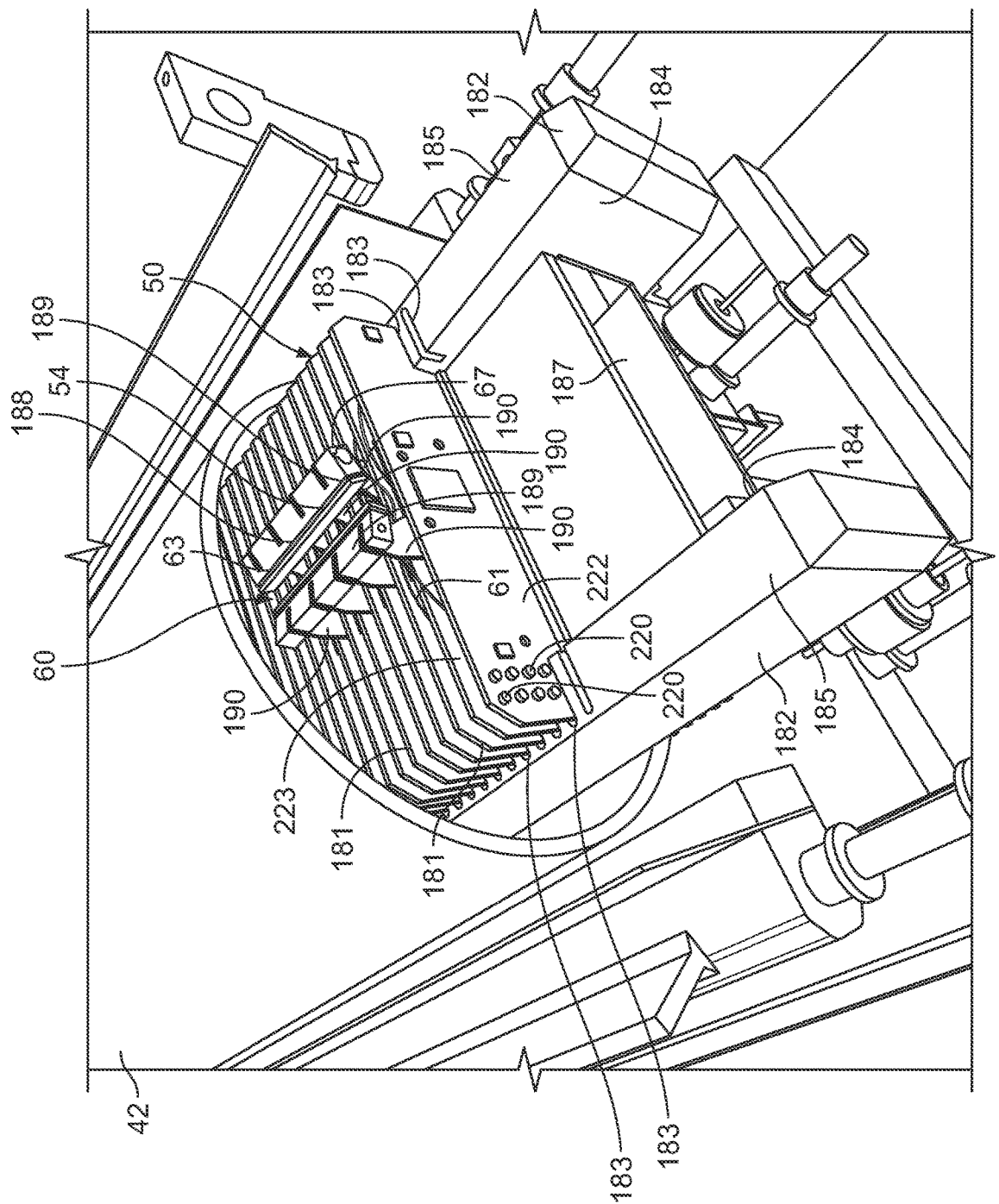
FIG. 32 is a partially broken away perspective view of a portion of the apparatus of FIG. 31.

FIGS. 29-37 illustrate another embodiment of a deposition mechanism 30 that uses an exposure device 50 in the form of an array 55 of LEDs 59 with a focusing mechanism 66 that includes an array of ball lenses 180. FIGS. 29-30 illustrate the embodiment schematically, FIGS. 31-32 illustrate the embodiment in more specific technical detail, and FIGS. 32A-37 illustrate the embodiment in a partially-schematic manner. Each of the LEDs 59 in this embodiment is connected to an individual optical fiber 61 that has an exit end 63 forming a separate outlet 54 that emits waves 63 that are focused by the focusing mechanism 66 to be directed at a specific area of the exposure site 51. The LEDs 59 may function as described herein. It is understood that the LEDs 59 are not visible on the circuit boards 181 in FIGS. 31 and 32, and the LEDs 59 are illustrated schematically in FIGS. 35-36. The LEDs 59 in FIGS. 29-37 are connected to and powered by a plurality of circuit boards 181 that are positioned within the roller 42 and are mounted within the roller by a supporting structure that includes one or more supporting beams 182 extending axially within the roller 42. Each of the circuit boards 181 in FIGS. 29-37 includes twelve LEDs 59 connected to the circuit board 181 that are controlled by and supplied with power through the circuit board 181, with twelve optical fibers 61 each connected individually to one of the LEDs 59. It is understood that some or all of the LEDs 59 may be positioned outside the roller 42 in another embodiment.

The supporting structure in FIGS. 29-37 includes a pair of spaced supporting beams 182 that each have a plurality of slots 183 on inwardly facing or confronting side surfaces thereof, such that the lateral edges of each circuit board 181 are received in opposed slots of the two beams 182. The circuit boards 181 in this configuration extend perpendicular to the direction of elongation of the beams 182, i.e., the axial direction of the roller 42. The slots 183 may also extend into the top and/or bottom surfaces of the beams 182, and may potentially extend through the beam 182 to the outward-facing side surface. In the embodiment of FIGS. 29-37, the slots 183 extend within the inward facing surfaces 184 and the top surfaces 185 of the beams 182, such that the beams 182 support a single row of circuit boards 181 between and above the beams 182. In another embodiment, illustrated in FIGS. 38-44 and described in greater detail elsewhere herein, the beams 182 may have additional slots 183 extending within the inward facing surfaces 184 and the bottom surfaces 186 of the beams 182 to support a second row of circuit boards 181 between and below the beams 182, forming upper and lower rows of circuit boards 181. It is understood that the upper and lower slots 183 may be continuous with each other, such that a single slot 183 may extend the entire height of the beam 182 and support an upper circuit board 181 and a lower circuit board 181. The beams 182 in FIGS. 29-37 are supported by the carriage 32 at their distal ends outside the axial ends of the roller 42 and extend at least the entire length of the roller 42. In the embodiment of FIGS. 29-37, the beams 182 also act as bus bars to provide power to all of the circuit boards 181. As such, each circuit board 181 includes electrical connecting structure for engaging the beams 182, and the beams 182 are electrically connected to a power source (not shown) at one or both ends. In an embodiment where the beams 182 act as bus bars, the carriage 32 may include electrically insulating supporting structure for supporting the beams 182 and/or electrical insulation structures between the beams 182 and any supporting structure. In other embodiments, the beams 182 may be used solely for support, with a different structure connected to provide power to the circuit boards 181, or a bus bar structure may be used for providing power to the circuit boards 181, with a different structure for structurally supporting the circuit boards 181. The supporting structure for the circuit boards 181 may also include internal supports positioned within the roller 42 for supporting the beams 182 at one or more points along their lengths. In other embodiments, the supporting structure may include additional or alternate structure for supporting the plurality of circuit boards 181 within the roller 42, including structures that support the circuit boards 181 in a different arrangement or orientation. In a further embodiment, the LEDs 59 may be arranged, powered, and/or controlled differently, and an arrangement of a plurality of circuit boards 181 may not be used.

The deposition mechanism 30 may further include a compartment 187 adjacent the circuit boards 181, such as below the arrangement of circuit boards 181 in FIGS. 29-37, or between the upper and lower sets 181A, 181B of circuit boards 181 in FIGS. 38-44. The compartment 187 may include a temperature control element 170, such as a cooling element including a conduit for circulating a cooling fluid as described herein. In one embodiment, such a cooling element may assist in absorbing the heat generated by the LEDs during operation. FIG. 44 illustrates a temperature control element 170 in the form of a plurality of tubes of cooling fluid, positioned within the compartment 187. The compartment 187 is defined by one or more walls that are located between the beams 182 and may be supported by the beams 182 or by the same supporting structure that supports the beams 182 in some embodiments. The circuit boards 181 may abut or rest on the walls of the compartment 187 in one embodiment. The heating/cooling fluid may be supplied from an external source 171 of heating and/or cooling fluid, as shown in FIG. 38.

The optical fibers 61 are arranged such that each optical fiber 61 has its entrance end 62 located at one of the LEDs 59 and is configured to collect waves generated by the LED 59 to direct the waves to a desired point, e.g., the application site 41. The exit ends 63 of the optical fibers 61 are arranged in at least one row 188, and in the embodiment of FIG. 29-37, the exit ends 63 of the optical fibers 61 are arranged in two parallel rows 188 that are directed at an angle to each other such that the waves 53 emitted by the fibers 61 of each row can be focused to a single exposure site 51. The exit ends 63 of the optical fibers 61 may be gathered and held in place by one or more holders 67. In the embodiment of FIGS. 29-37, the exposure assembly 60 includes a plurality of holders 67, with each circuit board 181 having an individual holder 67 that gathers and arranged into a row 188 the exit ends 63 of the optical fibers 61 connected to the LEDs 59 on that respective circuit board 181. Each holder 67 includes a linear receiving slot 189 receiving the row 188 of optical fibers 61 in a single-file line, and the holder 67 is configured for clamping tightly against the fibers 61 received in the slot 189, such as by one or more screws or bolts that can adjust the width of the slot 189 by threaded advancement or retreat. In another embodiment, each holder 67 may hold multiple rows of optical fibers 61 in a close-packed arrangement, such as two rows of staggered or offset optical fibers 61 packed together.

Each of the circuit boards 181 in FIGS. 29-37 has an arm 190 connected to the circuit board 181 and extending upward from the circuit board 181, with a holder 67 connected at the end of the arm 190. In this configuration, each circuit board 181 forms an integrated LED assembly, with a plurality of LEDs 59, a plurality of optical fibers 61 connected to the LEDs 59, and a holder 67 for holding all of the exit ends 63 of the optical fibers 61. Each such LED assembly may be individually connected to or removed from the exposure assembly 60 by inserting the circuit board 181 into the slots 183 or removing the circuit board 181. The holders 67 and the arms 190 are positioned off center with respect to the circuit boards 181, and the circuit boards 181 in FIGS. 29-37 are similar or identical to each other and arranged in an alternating arrangement, such that each circuit board 181 is flipped (i.e., rotated 180° about the z-axis) with respect to the adjacent circuit boards 181. In this configuration, the holders 67 are arranged in two parallel rows, and each holder 67 is positioned adjacent the holder(s) 67 of the second-to-next circuit board(s) 181 in each direction along the row 188, i.e., the closest circuit board(s) 181 having the same orientation. The adjacent holders 67 in FIGS. 29-37 contact each other such that the adjacent holders 67 form a continuous row 188 of optical fibers 61, and in one embodiment, the holders 67 that contact each other may be removably connected to each other. In the configuration of FIGS. 29-37, the exit ends 63 of the optical fibers 61 form a linear row of outlets 54 of the exposure device 50.

Figure 32A:
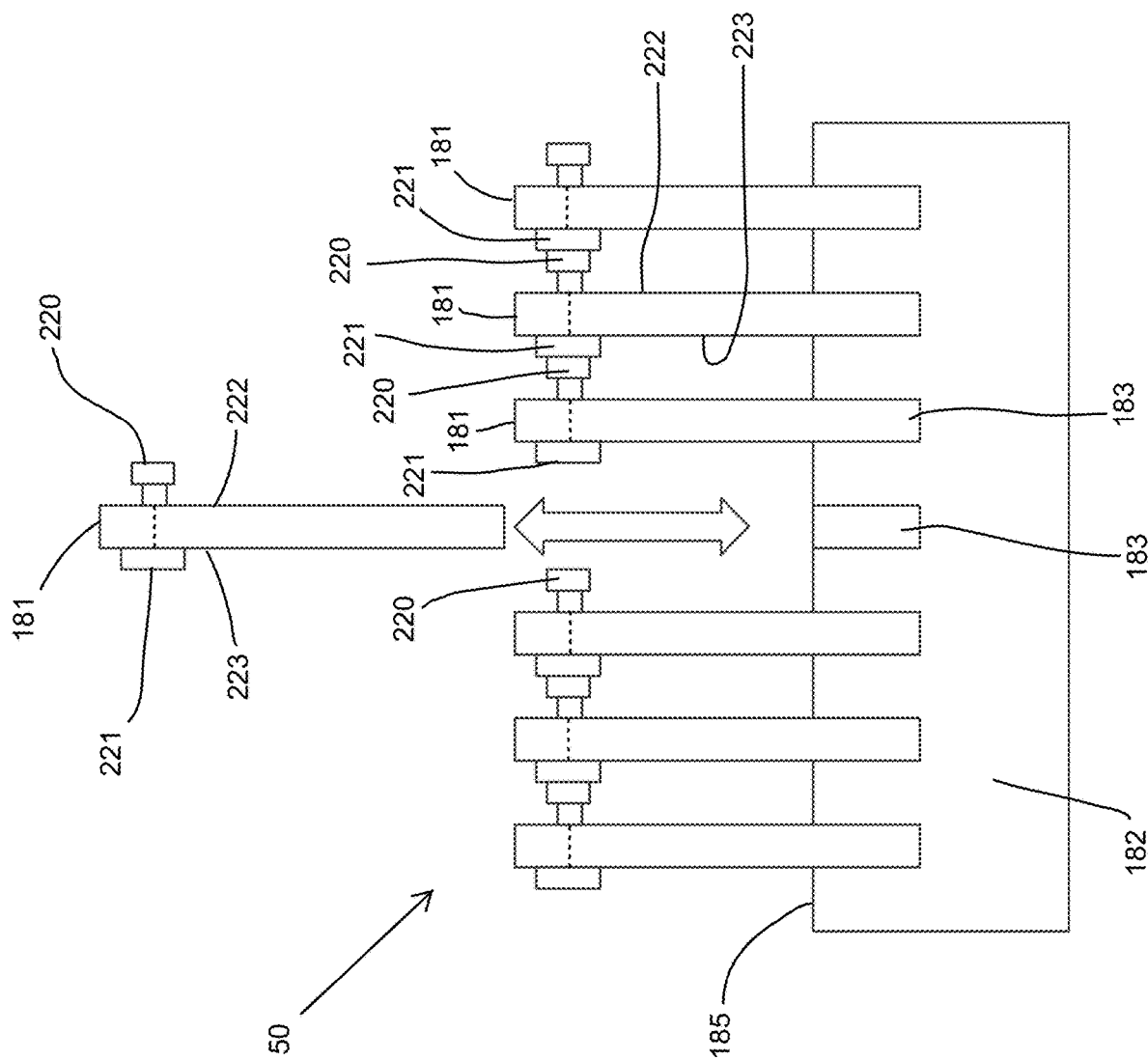
FIG. 32A is a schematic cross-section view of a portion of one embodiment of a plurality of circuit boards and a supporting structure for use in the apparatus of FIGS. 31-32, according to aspects of the disclosure.
Figure 32B:
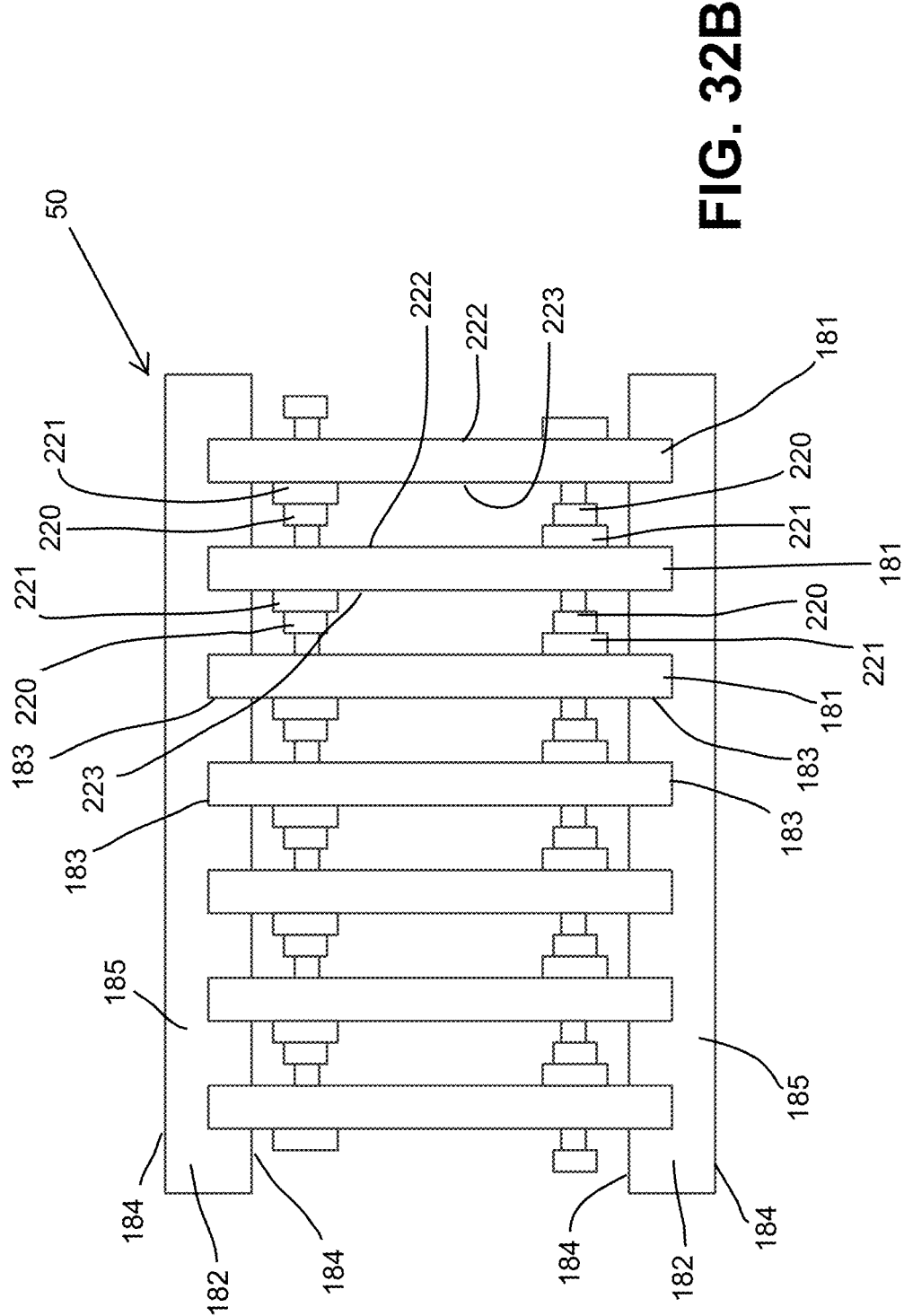
FIG. 32B is a schematic cross-section view of a portion of another embodiment of a plurality of circuit boards and a supporting structure for use in the apparatus of FIGS. 31-32, according to aspects of the disclosure.

The circuit boards 181 in FIGS. 29-37 are also electrically connected to each other in series, and the circuit boards 181 have a plurality of contact terminals for electrical connection to adjacent circuit boards 181 and/or main power connections of the deposition mechanism 30. In this embodiment, each circuit board 181 has terminals 220, 221 on opposing surfaces 222, 223, including one or more first terminals 220 on a first surface 222 and one or more second terminals 221 on a second surface 223 opposite the first surface 222. The first terminal(s) 220 of each circuit board 181 engages the second terminal(s) 221 of the adjacent circuit board 181 proximate the first surface 222, and second terminal(s) 221 of each circuit board 181 engages the first terminal(s) 220 of the adjacent circuit board 181 proximate the second surface 223. FIG. 32A illustrates this configuration schematically, with the terminals 220, 221 of adjacent circuit boards 181 contacting each other to allow transmission of power and/or data to and from each circuit board 181 in sequence. The terminals 220, 221 are in surface-to-surface abutment, so one or more circuit boards 181 may be removed and replaced easily, with the new circuit board 181 re-establishing the same connections, as shown in FIG. 32A. In one embodiment, each circuit board has a plurality of first terminals 220 in the form of spring pins arranged on the first surface 222 proximate one lateral edge, as shown in FIG. 32, and a single second terminal 221 in the form of a contact pad (not shown in FIG. 32) on the second surface 223 proximate the same lateral edge, which is configured to engage one or more of the first terminals 220. In another embodiment, each circuit board 181 may additionally have terminals 220, 221 along the opposite lateral edge, and the positioning of such terminals on the first and second surfaces 222, 223 may be the same or reversed on both lateral edges. FIG. 32B shows an embodiment where the positions of the terminals 220, 221 are reversed on the opposed lateral edges, with each circuit board 181 having one or more first terminals 220 and one or more second terminals 221 proximate opposite lateral edges of the first surface 222, and one or more second terminals 221 and one or more first terminals 220 proximate opposite lateral edges of the second surface 223. In the configurations described herein, a power source may be connected only to the front circuit board 181, or only to both the front and rear circuit boards 181, in order to power all of the circuit boards 181.

Figure 33:
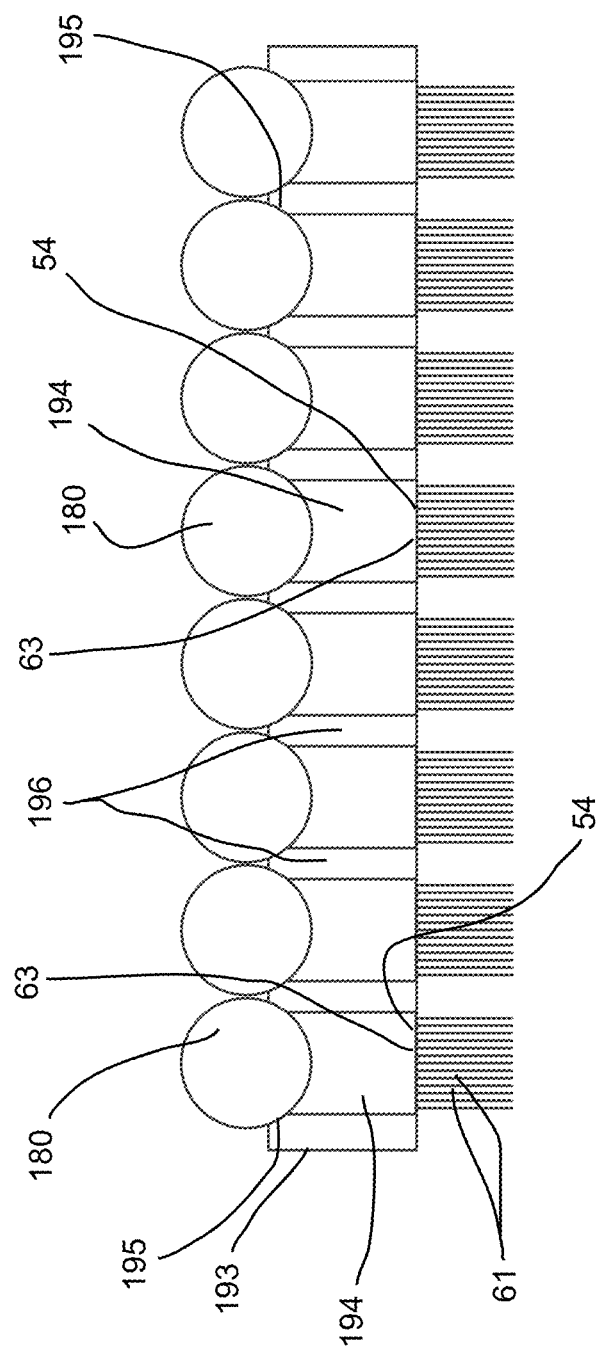
FIG. 33 is a schematic cross-section view of one embodiment of a body of a lens mounting structure, a plurality of ball lenses, and a plurality of optical fibers of the apparatus of FIGS. 31-32, according to aspects of the disclosure.
Figure 34:
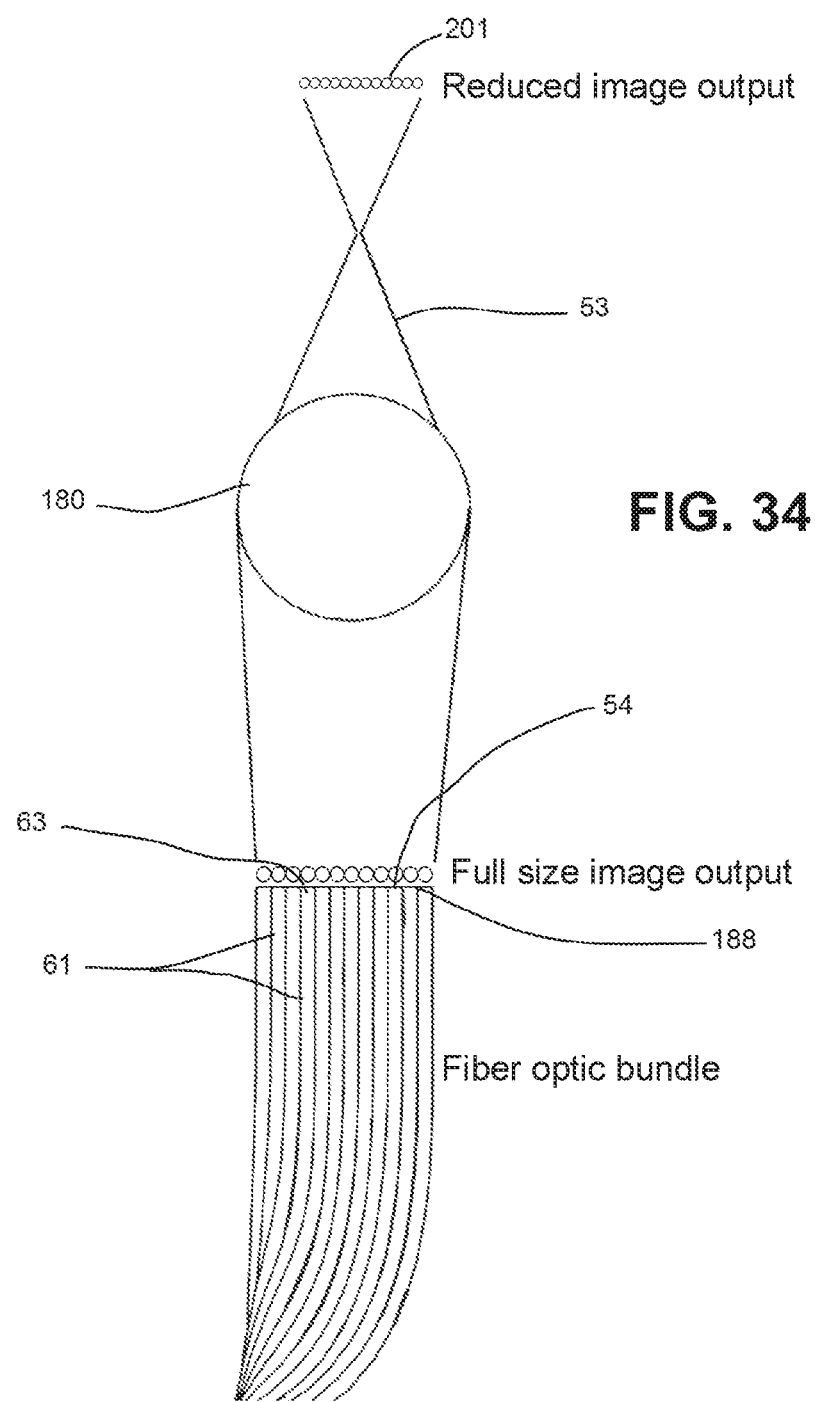
FIG. 34 is a schematic cross-section view of one embodiment of a ball lens and a plurality of optical fibers emitting waves that are focused by the ball lens of the apparatus of FIGS. 31-32, according to aspects of the disclosure.
Figure 35:
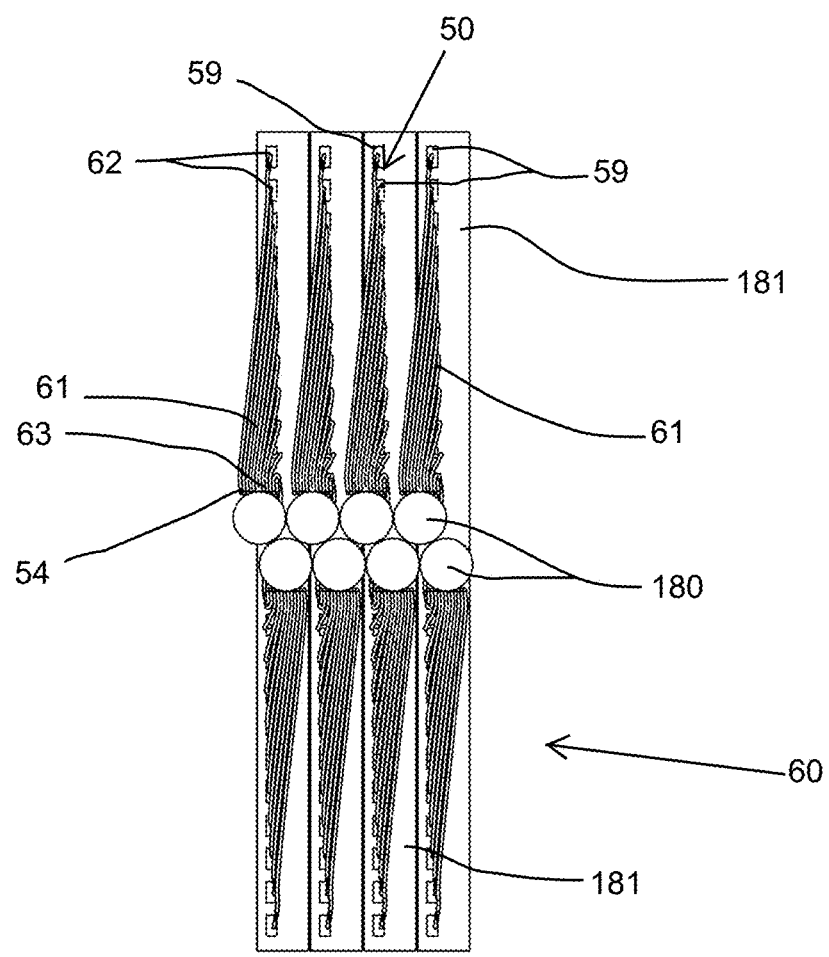
FIG. 35 is a plan view of a portion of another embodiment of a plurality ball lenses and optical fibers connected to arrays of LEDs, for use with the apparatus of FIGS. 29-30, according to aspects of the disclosure.
Figure 36:
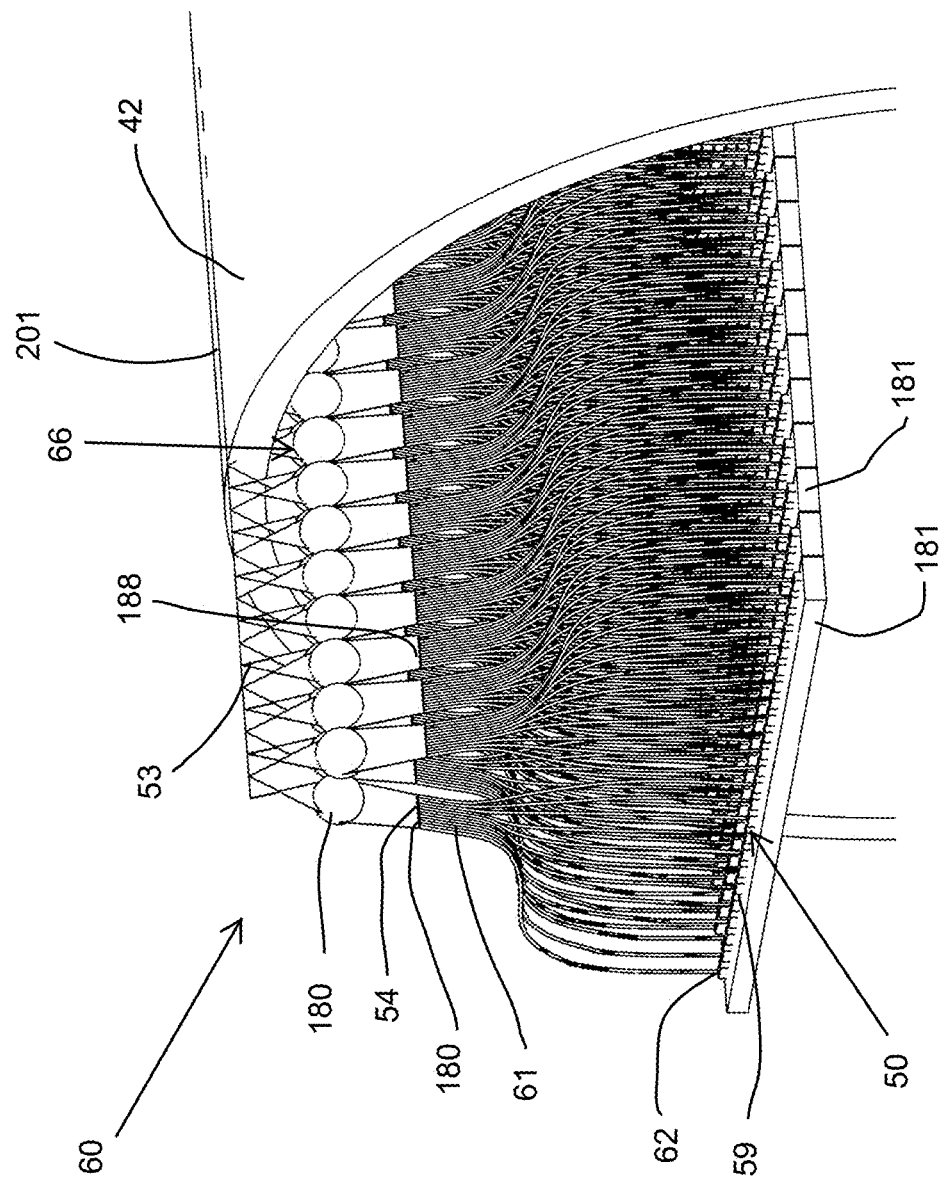
FIG. 36 is a partially schematic perspective view of the optical fibers, ball lenses, and LED arrays of FIG. 35, with the ball lenses focusing waves emitted by the LEDs via the optical fibers, positioned inside a roller of an apparatus for producing a three-dimensional object, according to aspects of the disclosure.
Figure 37:
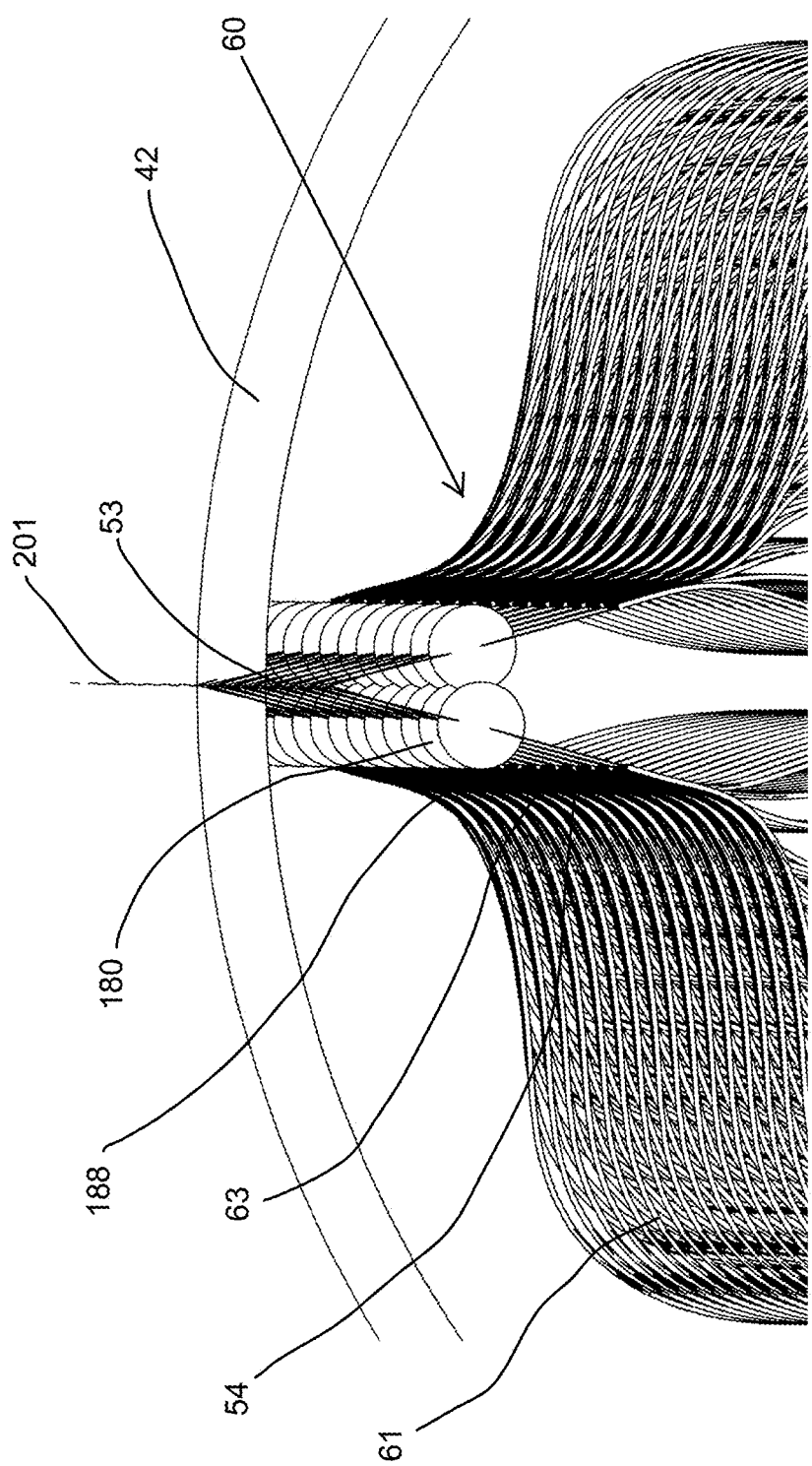
FIG. 37 is a partially schematic perspective view of the optical fibers, ball lenses, and roller of FIG. 36, with the ball lenses focusing waves emitted from the optical fibers.
Figure 38:
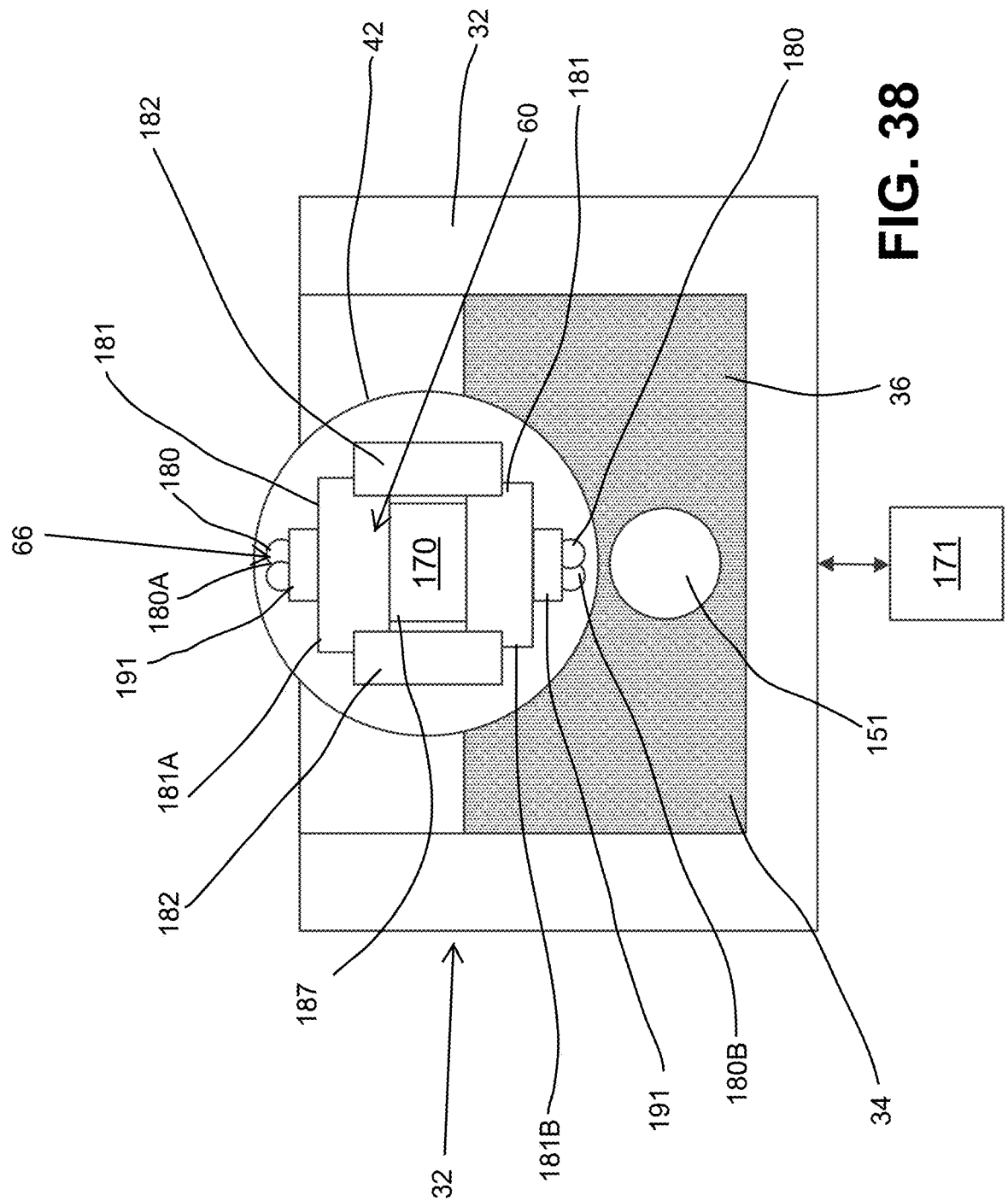
FIG. 38 is a side schematic view of another embodiment of an apparatus for producing a three-dimensional object, according to aspects of the disclosure.

The focusing mechanism 66 in the embodiment of FIGS. 29-37 includes a plurality of ball lenses 180 that are arranged in an array along each of the rows 188 of the optical fibers 61. The ball lenses 180 in the embodiment of FIGS. 29-37 are configured to reduce the image passing through the lens 180, and the ball lenses 180 may therefore be considered to represent an embodiment of a reducing lens. Other types of reducing lenses may be used in other embodiments, such as convex lenses. In further embodiments, other types of lenses may be used, such as a rod lens or a plurality of rod lenses (which may not reduce the image). In one embodiment, as shown in FIGS. 31-32, each ball lens 180 is associated with one of the circuit boards 181, and each ball lens 180 is configured to focus all of the outlets 54 associated with the respective circuit board 181. In the configuration of FIGS. 31-32, each ball lens 180 is positioned to receive and focus waves 53 emitted from twelve different outlets 54 connected to twelve different LEDs 59 on the circuit board 181. In another embodiment, as shown in FIGS. 35-37, each circuit board 181 is associated with two ball lenses 180, with half of the outlets 54 associated with each circuit board 181 being directed to and focused by each of the two ball lenses 180. For example, each circuit board 181 may supply waves 53 to a first ball lens 180 in the first row 188 and to a second, adjacent ball lens 180 in the second row 188. This configuration is illustrated in FIGS. 35-37. In this configuration, each circuit board 181 includes two holders 67 associated with two different ball lenses 180 in opposite rows 188, and half of the optical fibers 61 connected to the circuit board 181 extend to each of the holders 67. In one embodiment, as shown in FIGS. 35-37, each circuit board 181 includes twenty-four LEDs 59, with twelve optical fibers 61 extending to each ball lens 180. It is understood that FIGS. 35-37 do not illustrate the holders 67, but it is understood that the holders 67 are configured similar or identical to the holders 67 shown in FIGS. 31-32 and described herein, with each holder 67 being mounted on an arm 190 connected to the circuit board 181 and having a receiving slot 189 that holds the exit ends 63 of the optical fibers 61. It is also understood that each circuit board 181 in the embodiment of FIGS. 35-37 may have two arms 190 connected thereto, with each arm 190 extending toward one of the rows 188 and having one of the two holders 67 mounted on the respective arm 190. In a further embodiment, each circuit board 181 may supply waves 53 to two adjacent ball lenses 180 in the same row 188, or to more than two ball lenses 180 in one or both rows 188. In any of these configurations, the exit ends 63 of the optical fibers 61 associated with each ball lens 180 are positioned beneath the respective ball lens 180.

The focusing mechanism 66 includes a lens mounting structure 191 that engages and supports the ball lenses 180 and mounting beams 192 supporting the lens mounting structure 191 in an adjustable manner. The lens mounting structure 191 includes one or more bodies 193 that support the lenses 180 and guide or channel the waves 53 from the outlets 54 to the lenses 180. The lens mounting structure 191 of FIGS. 29-37 includes two parallel rows of bodies 193 positioned over the two rows 188 of optical fibers 61, with each body 193 having a plurality of receivers 195 that each receive a portion of one of the ball lenses 180 and a plurality of conduits or tunnels 194 each extending through the body 193 from the outlets 54 to one of the receivers 195. Each of the rows of bodies 193 includes a plurality of bodies 193 positioned end-to-end along the row adjacent to and/or in contact with each other, with each body 193 supporting a plurality of ball lenses 180 (e.g., 8 lenses in one embodiment). In this configuration, waves 53 exit the outlets 54 and travel through the conduit 194 aligned with the respective outlet 54 to the reach the ball lens 180 in the receiver 195, where the waves 53 are focused to the exposure site 51. FIG. 33 illustrates schematically an example of one of the bodies 193 of FIGS. 29-37, and in this configuration, the body 193 includes a plurality of internal walls 196 that separate the conduits 194. The walls 196 may have limited or no permeability to the waves 53, such that the conduits 194 are isolated from each other with regard to transmission of the waves 53. The conduits 194 are hollow in FIG. 33, but in other embodiments, the conduits 194 may be filled with a material that is permeable to the waves 53. In another embodiment, each of the two rows of bodies 193 in FIGS. 29-37 may be formed by a plurality of aligned bodies 193 that are arranged to have a single body 193 for each circuit board 181 and respective ball lens 180. In a further embodiment, the focusing mechanism 66 may include a single body 193 for each row, or a single body 193 for both rows together, that includes all of the receivers 195 and conduits 194.

The bodies 193 in FIGS. 29-37 are each mounted on one of the two mounting beams 192, which run parallel to the support beams 182 and the rows 188 of optical fibers 61 and are elevated above the tops of the circuit boards 181. The mounting beams 192 have inward-facing walls 197 that are angled with respect to the vertical (Z) direction, and the bodies 193 are mounted on the walls 197, such as by fasteners 202 that extend through the walls 197, as shown in FIG. 31. Each of the mounting beams 192 in this configuration has a plurality of bodies 193 mounted thereon and runs approximately the entire length of the supporting beams 182 that support the circuit boards 181. Each of the mounting beams 192 in FIGS. 29-37 is supported at the ends and includes an adjustment mechanism at one or both ends for adjusting the positioning of the mounting beams 192 and thereby the positions of the mounting bodies 193 and the ball lenses 180 for focusing and alignment purposes. The adjustment mechanisms shown in FIGS. 31-32 include a pair of screws, including an adjustment screw 198 that adjusts the position of the mounting beam 192 along the axis of the adjustment screw 198 and a locking screw 199 that locks the mounting beam 192 when in the proper position. The mounting beams 192 in FIGS. 31-32 are each illustrated with an adjustment screw 198 and a locking screw 199 at one end, but it is understood that a similar structure may be positioned at the other end as well. In an embodiment where the support beams 182 are used as bus bars, the mounting beams 192 may be mounted on a structure that provides electrical insulation from the support beams 182, such as the electrically insulated mounting block 200 illustrated in FIGS. 31-32.

The ball lenses 180 in the embodiment of FIGS. 29-37 are arranged in a staggered or offset array, with two rows of ball lenses 180 that are offset from each other in both the x-direction and the y-direction. Each of the lenses 180 is overlapped laterally (i.e., in the y-direction) by at least one other lens 180, and each lens 180 (other than the lenses 180 on the ends of the array) is centered in the y-direction between two adjacent lenses 180 on the opposite row of lenses 180. In other words, each of the lenses 180 as shown in FIGS. 29-37 overlaps approximately 50% of the width of the closest lenses 180 on the opposite row. The lenses 180 may overlap slightly in the x-direction as well, and in one embodiment, the lenses 180 are close-packed, such that each lens 180 contacts or is in close proximity to the lenses 180 in the same row on both lateral sides and also contacts or is in close proximity to the two overlapping lenses on the opposite row. Additionally, in one embodiment, the outlets 54 and the lenses 180 are positioned and oriented to focus the waves 53 from both of the rows 188 of outlets 54 along approximately a single exposure line 201 extending in the y-direction at the exposure site 51, as shown in FIGS. 36-37. The staggered arrangement of the ball lenses 180 enables the exposure line 201 to be created without gaps, even when the image is reduced by the ball lenses 180. The exposure line 201 in this embodiment is instantaneous, monolithic, and straight, despite the offset of the lenses 180 as described herein. It is understood that the outlets 54 and the ball lenses 180 may be configured such that the exposure line 201 is located at or outward from the outer surface of the roller 42, e.g., at the apex of the roller 42. It is also understood that the lenses 180 may be arranged and configured to create the exposure line 201 at a different location if a different type of applicator 40 is used.

The ball lenses 180 in the embodiment of FIGS. 29-37 focus waves 53 from a plurality of linearly-arranged outlets 54 (e.g., optical fibers 61 connected to LEDs 59) into a linear image at the exposure site 51. FIGS. 34 and 36-37 illustrate the focusing of the ball lenses 180 in greater detail. As shown in FIG. 34, the ball lens 180 inverts and reduces the image emitted by the outlets 54, e.g., reducing the image by 50% in one embodiment. Reducing the size of the image emitted by the outlets 54 provides multiple benefits, including increasing the intensity of the waves 53 at the exposure site 51 and improving the resolution of the exposure device 50. This combination of benefits creates an exposure assembly 60 with both high resolution and high power for rapidly curing the material 36, improving performance of the deposition mechanism 30 significantly. It is understood that an array of ball lenses 180 configured according to the embodiments described herein may also be used with a differently-configured exposure assembly 60 to provide similar benefits.

FIGS. 35-37 schematically illustrate the roller 42, the optical fibers 61 forming the outlets 54, and the ball lenses 180, showing the waves 53 emitted by the outlets 54 and the image produced at the exposure site 51 by this structure. As seen in FIGS. 36-37, the waves 53 form the image in the form of a straight line of exposure at or near the outer surface of the roller 42. The inversion of the image by the ball lenses 180 is also illustrated in FIG. 34.

Figure 39:
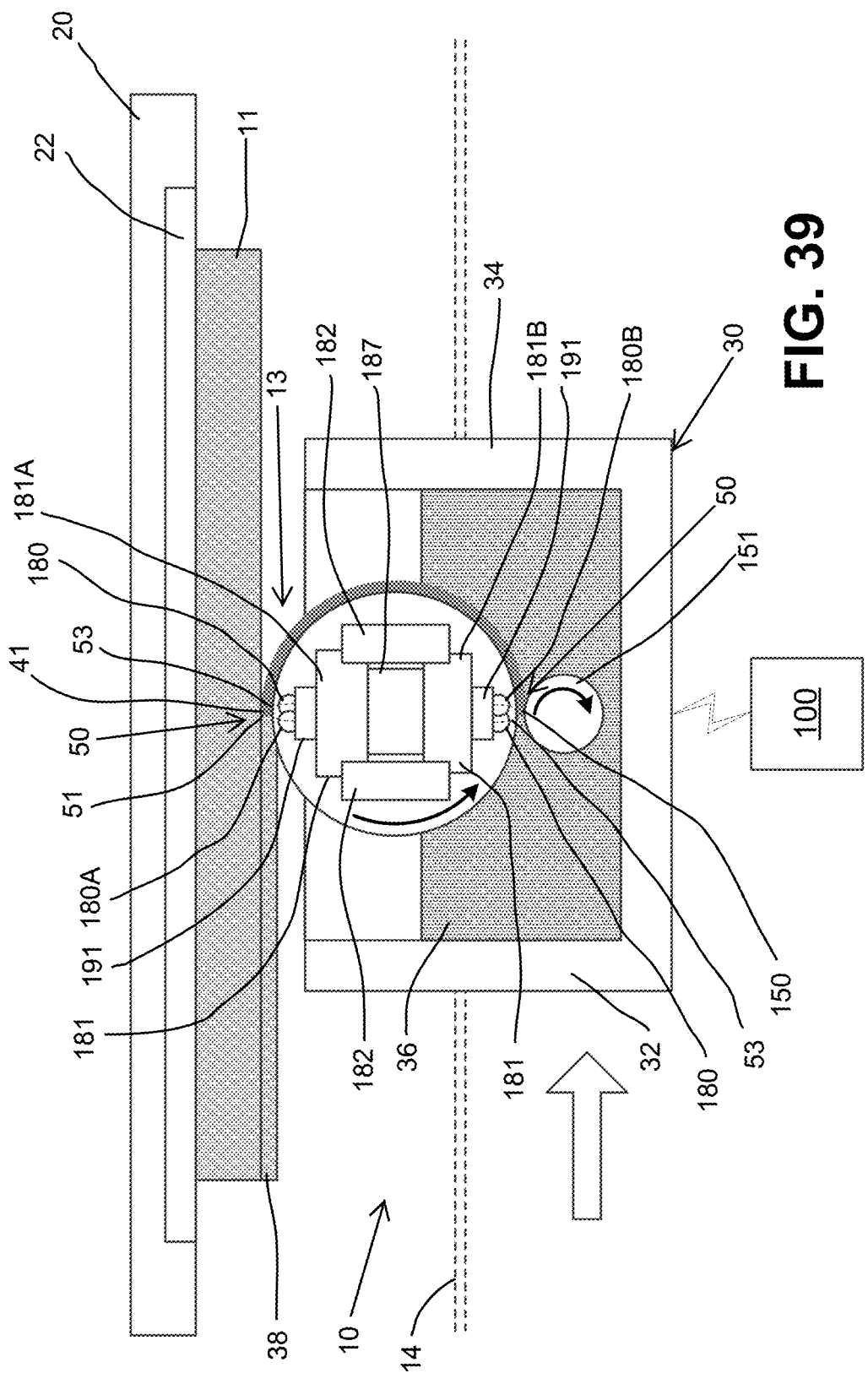
FIG. 39 is a side schematic view of the apparatus of FIG. 38 shown in operation.

FIGS. 38-44 illustrate another embodiment of a deposition mechanism 30 that includes components and features similar to the deposition mechanism 30 of FIGS. 29-37 and the deposition mechanisms 30 of FIGS. 21-24 and is described herein using the same reference numbers for similar or identical components. It is understood that the embodiment of FIGS. 38-44 may be described, in part, with reference to the disclosure of FIGS. 21-24 and 29-37, and that such similar or identical components may not be described again for the sake of brevity. FIGS. 38-39 illustrate a schematic embodiment of this configuration, and FIGS. 40-44 illustrate a technical embodiment of this configuration.

The deposition mechanism 30 in FIGS. 38-44 includes both a primary roller 42 and a secondary roller 151 as in the embodiments of FIGS. 21-24, and the exposure assembly 60 in FIGS. 38-44 includes two different exposure devices 50 with two different outlets 54 or sets of outlets 54, similar to the embodiment of FIG. 21. The exposure devices 50 and outlets 54 in the embodiment of FIGS. 38-44 are located within the roller 42 as similarly shown in FIG. 21. Each exposure device 50 in FIGS. 38-44 is in the form of an array 55 of LEDs 59 that are connected to, controlled by, and powered through a plurality of circuit boards 181, as similarly described above with respect to FIGS. 29-37. It is understood that the embodiment of FIGS. 38-44 is described as having two exposure devices 50, although the two arrays 55 of LEDs may more broadly be considered to be a single, larger array 55 and a single exposure device 50. In the embodiment of FIGS. 38-44, the circuit boards 181 are arranged in an upper set 181A of circuit boards 181 and a lower set 181B of circuit boards 181 that are each arranged in an axially extending row. The supporting structure for the circuit boards 181 includes support beams 182 that have slots 183 as described herein that extend on the inward facing surfaces 184 of the beams 182, as well as both the top and bottom surfaces 185, 186 of the support beams 182. The slots 183 on the top surface 185 in this embodiment receive the upper set 181A of circuit boards 181, and the slots 183 on the bottom surface 186 receive the lower set 181B of circuit boards 181. The compartment 187 in this embodiment is located between the upper and lower sets 181A,B of circuit boards 181. The upper set 181A of circuit boards 181 is configured as a first exposure device 50 that is configured to emit waves 53 toward the exposure site 51, and the lower set 181B of circuit boards 181 is configured as a second exposure device 50 that is configured to emit waves 53 toward the initial exposure site 150 as described herein. In another embodiment, a single set of circuit boards 181 may control and power an array 55 of LEDs 59 that are connected to both the upper and lower arrays of optical fibers 61.

The focusing mechanism 66 for the upper set 181A of circuit boards 181 in the embodiment of FIGS. 38-44 is configured the similar to the focusing mechanism 66 described herein with respect to FIGS. 29-37. Like the embodiment of FIGS. 29-37, the focusing mechanism 66 in this embodiment uses reducing lenses in the form of ball lenses 180. The exposure assembly 60 further includes a second focusing mechanism 66 for the lower set 181B of circuit boards 181 that is also configured the same as the focusing mechanism 66 described herein with respect to FIGS. 29-37. In other words, the second focusing mechanism 66 in this embodiment includes one or more holders 67 that have linear slots 189 that collect and arrange the ends 63 of the optical fibers 61 into two parallel rows 188. These additional holders 67 are mounted on arms 190 connected to and extending from the circuit boards 181 of the lower set 181B. The focusing mechanism 66 also includes a second or lower array 180B of reducing lenses in the form of ball lenses 180 that are mounted by a lens mounting structure 191 and mounting beams 192 supporting the lens mounting structure 191 in an adjustable manner, in addition to the upper array 180A of ball lenses 180 as described herein with respect to FIGS. 29-37. The lens mounting structure 191 for the second/lower array 180B of ball lenses 180 in FIGS. 38-44 includes one or more bodies 193 that support the ball lenses 180 and guide or channel the waves 53 from the outlets 54 to the lenses 180, as similarly described herein with respect to the embodiment of FIGS. 29-37. The structure and configuration of the lens mounting structure 191 and the mounting beams 192, including any adjustment mechanisms, for the lower array 180B of ball lenses 180 may be an inverted (but otherwise identical) version of the structure and configuration of the lens mounting structure and the mounting beams 192 for the upper array 180A of ball lenses 180. The lens mounting structure 191 and mounting beams 192 of this embodiment are shown in FIG. 44, and it is understood that certain structures, including the lens mounting structure 191 and mounting beams 192, are not shown in FIGS. 38-43.

Figure 40:
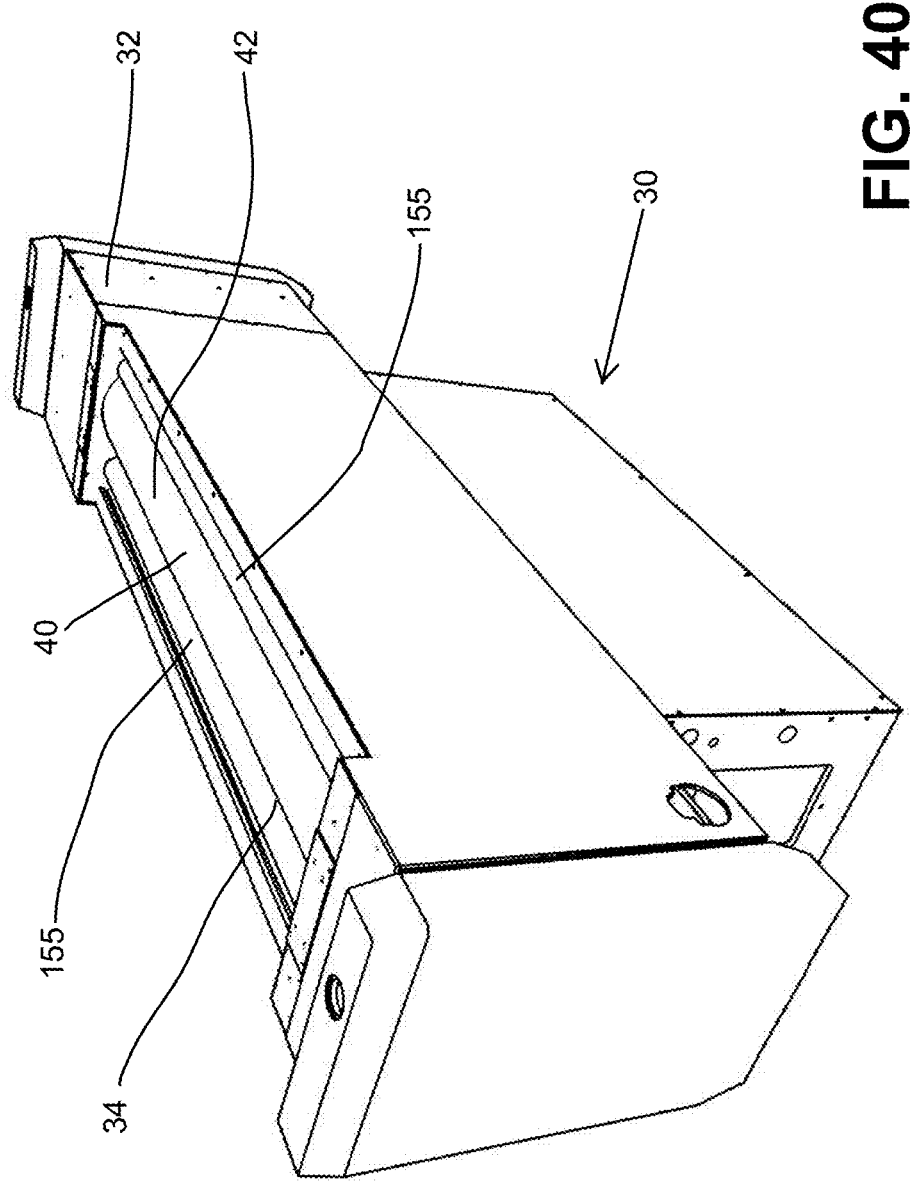
FIG. 40 is a perspective view of a portion of a deposition mechanism of one embodiment of the apparatus of FIGS. 38-39, according to aspects of the disclosure.
Figure 41:
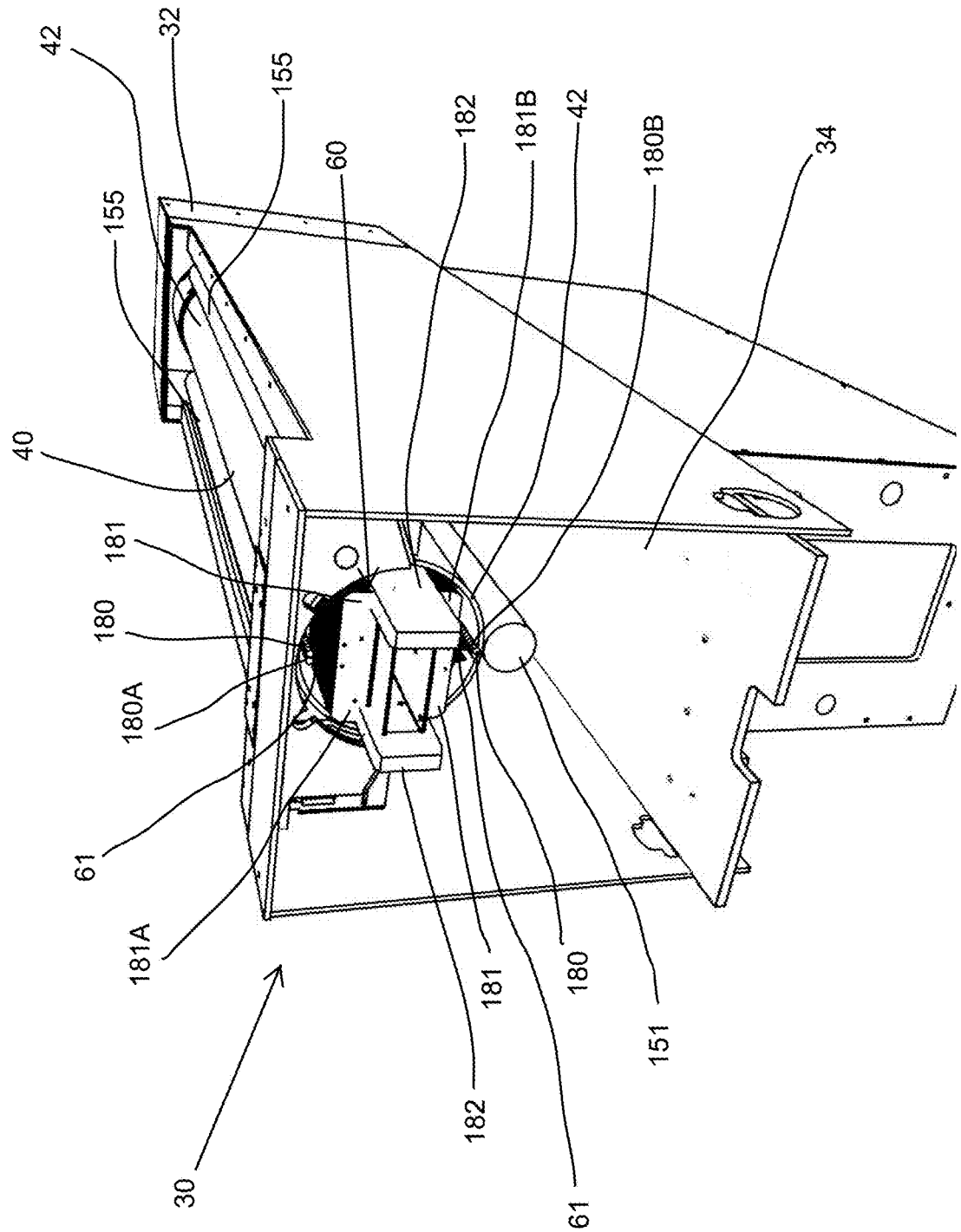
FIG. 41 is a perspective view of the deposition mechanism of FIG. 40, with a portion of the deposition mechanism removed to reveal internal detail.
Figure 42:
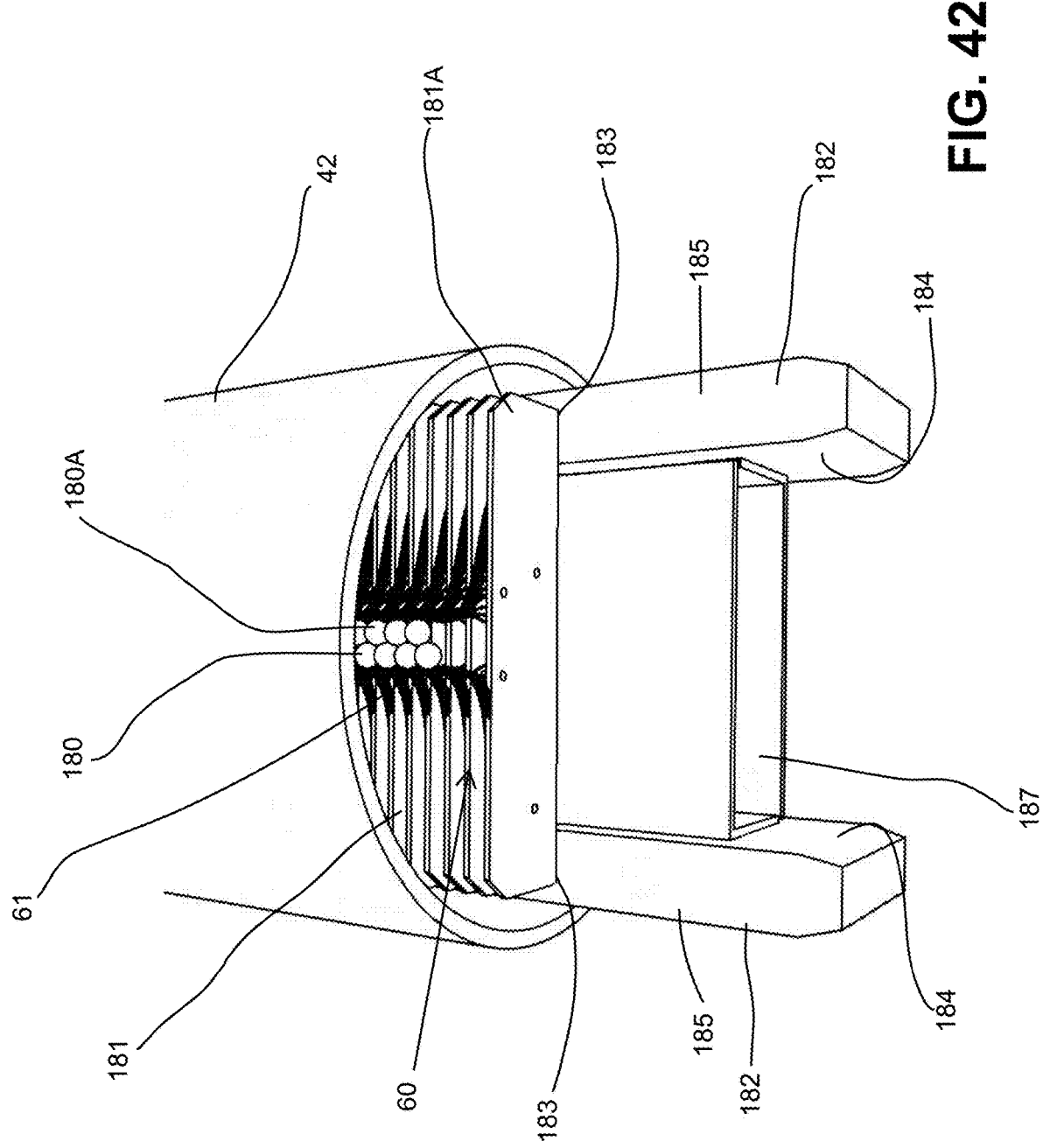
FIG. 42 is a partially broken away perspective view of an exposure assembly and a roller of the deposition mechanism of FIG. 40, with some internal components removed to reveal detail.
Figure 43:
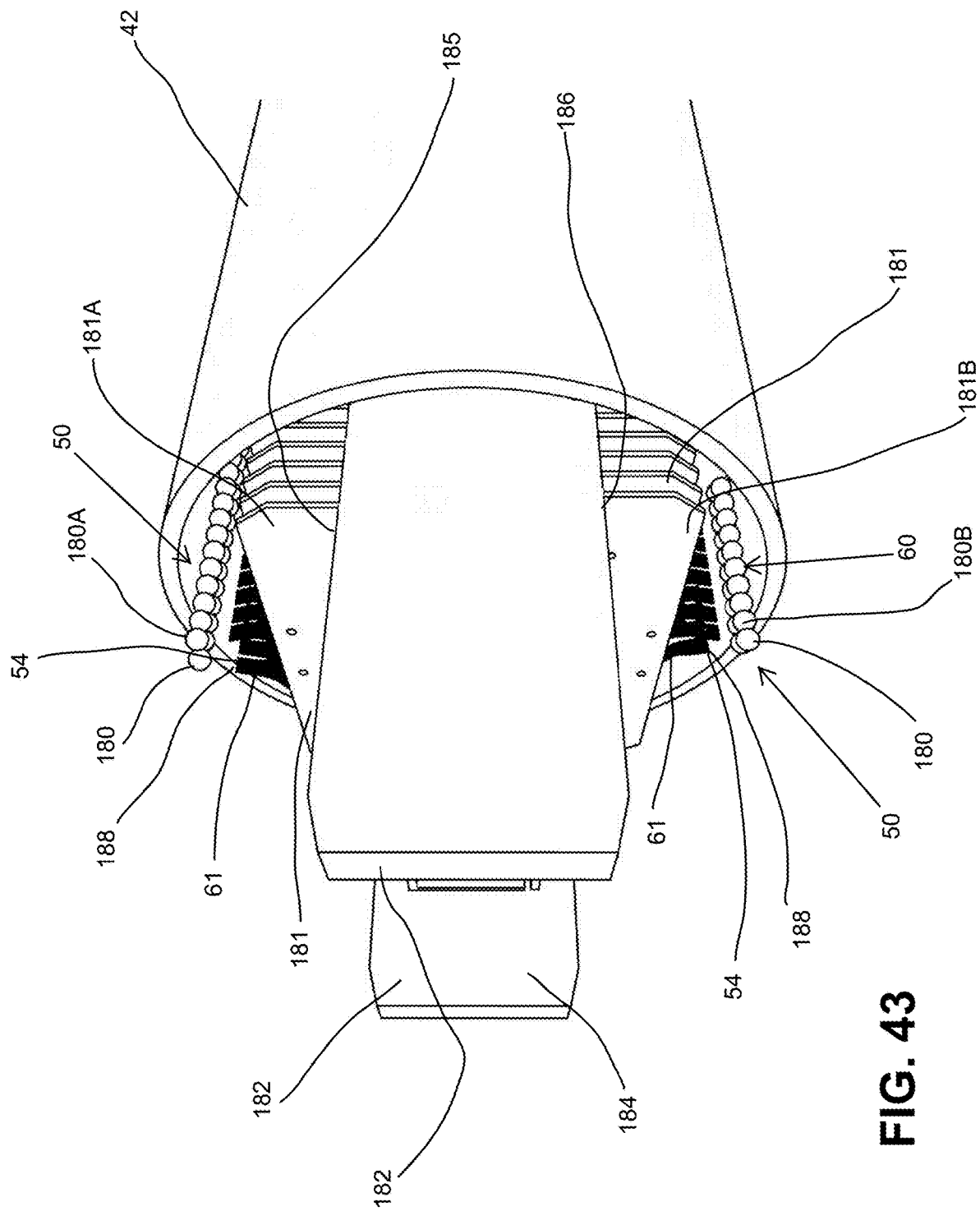
FIG. 43 is a partially broken away perspective view of the exposure assembly of FIG. 42.
Figure 44:
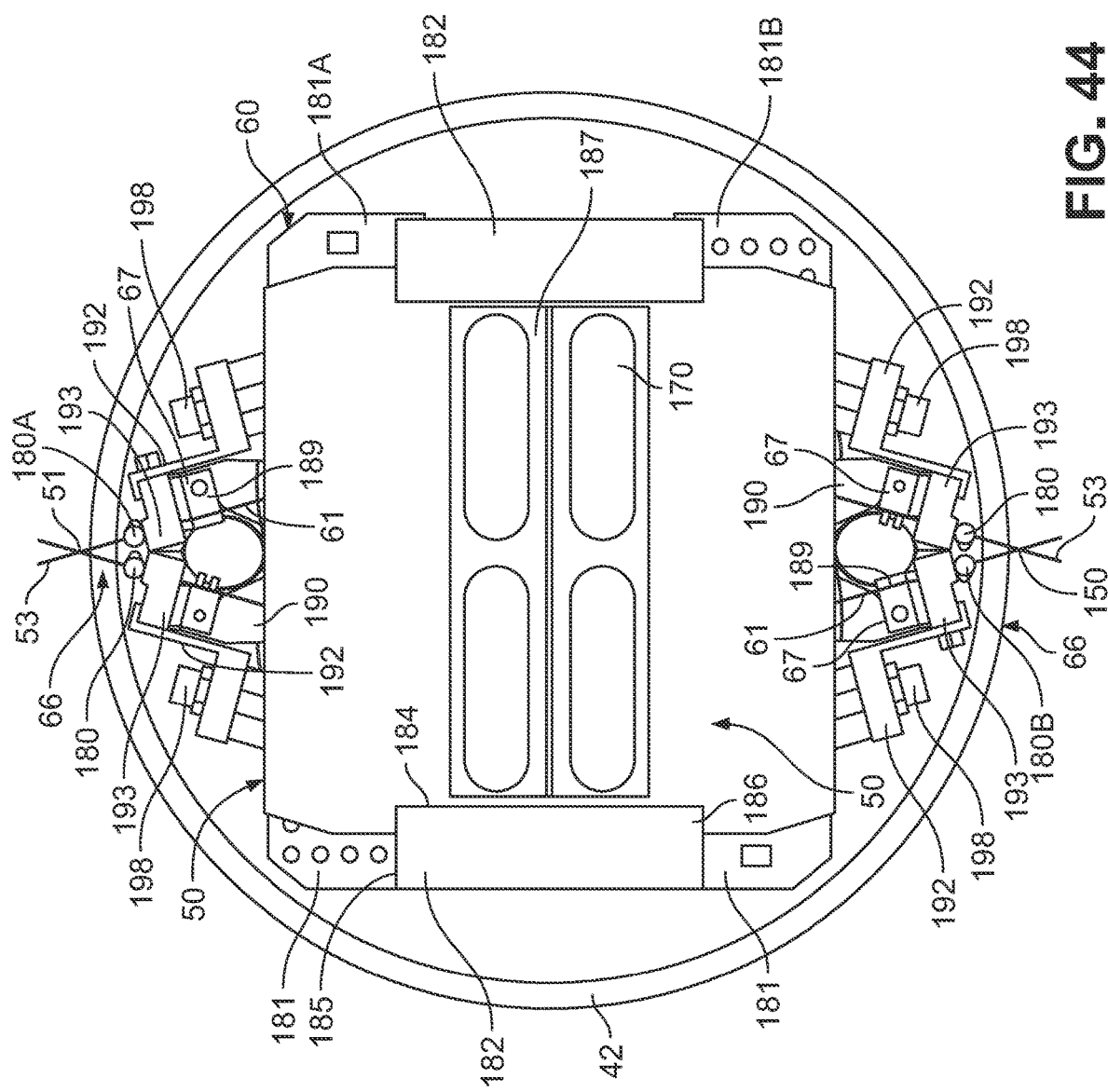
FIG. 44 is a cross-sectional view of the roller and the exposure assembly of the deposition mechanism of FIG. 40.

The ball lenses 180 in the embodiment of FIGS. 38-44 are arranged such that each circuit board 181 in both the upper and lower sets 181A, 181B is associated with two ball lenses 180, with half of the outlets 54 associated with each circuit board 181 being directed to and focused by each of the two ball lenses 180, as described herein with respect to FIGS. 35-37. In one embodiment, as shown in FIGS. 41-43, each circuit board 181 includes twenty four LEDs 59, with twelve optical fibers 61 extending to each ball lens 180. It is understood that FIGS. 41-43 do not illustrate the holders 67, but it is understood that the holders 67 are configured similar or identical to the holders 67 shown in FIGS. 31-32 and described herein, with each holder 67 being mounted on an arm 190 connected to the circuit board 181 and having a receiving slot 189 that holds the exit ends 63 of the optical fibers 61. It is also understood that each circuit board 181 in the embodiment of FIGS. 41-43 may have two arms 190 connected thereto, with each arm 190 extending toward one of the rows 188 and having one of the two holders 67 mounted on the respective arm 190. In another embodiment, each circuit board 181 may include a single holder 67 and be associated with a single ball lens 180, as described herein with respect to FIGS. 31-32. In a further embodiment, each circuit board 181 may supply waves 53 to two adjacent ball lenses 180 in the same row 188, or to more than two ball lenses 180 in one or both rows 188.

The circuit boards 181 in each set 181A, 181B in FIGS. 38-44 may be configured with electrically connected terminals 220, 221 as described herein with respect to the embodiment of FIGS. 29-37. Additionally, the configuration described herein with the outlets 54 of one circuit board 181 supplying waves 53 to two adjacent ball lenses 180 in opposite rows 188 may also be used in both sets 181A, 181B in the embodiment of FIGS. 38-44.

Figure 45:
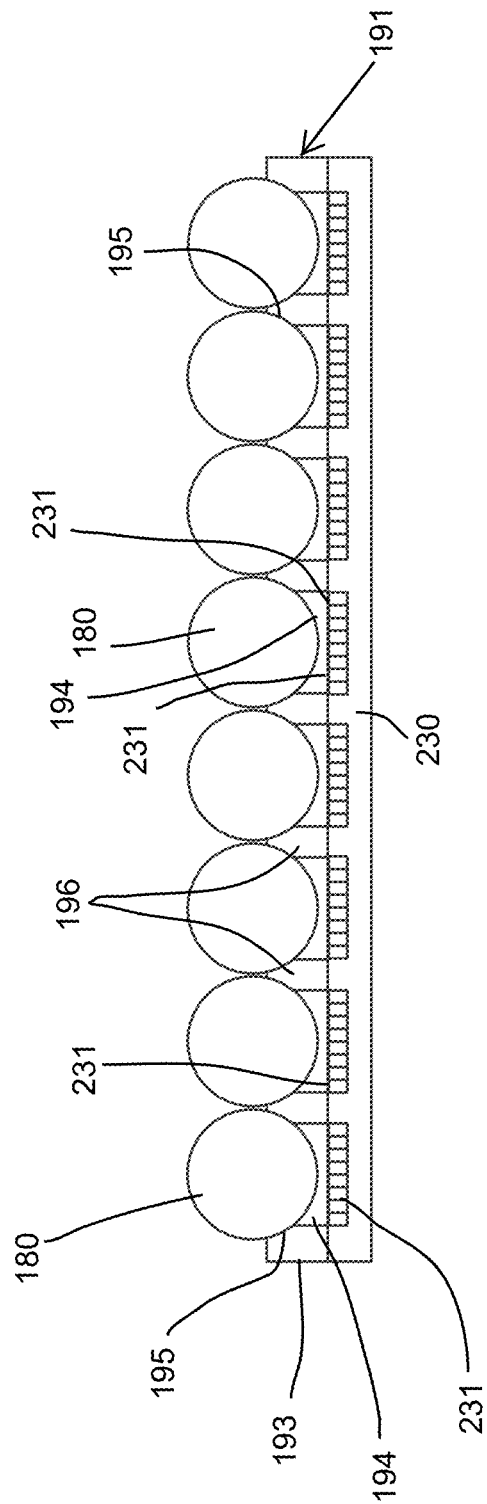
FIG. 45 is a schematic cross-section view of another embodiment of a body of a lens mounting structure, a plurality of ball lenses, and a mirror array, configured for use with an apparatus for producing a three-dimensional object, according to aspects of the disclosure.
Figure 46:
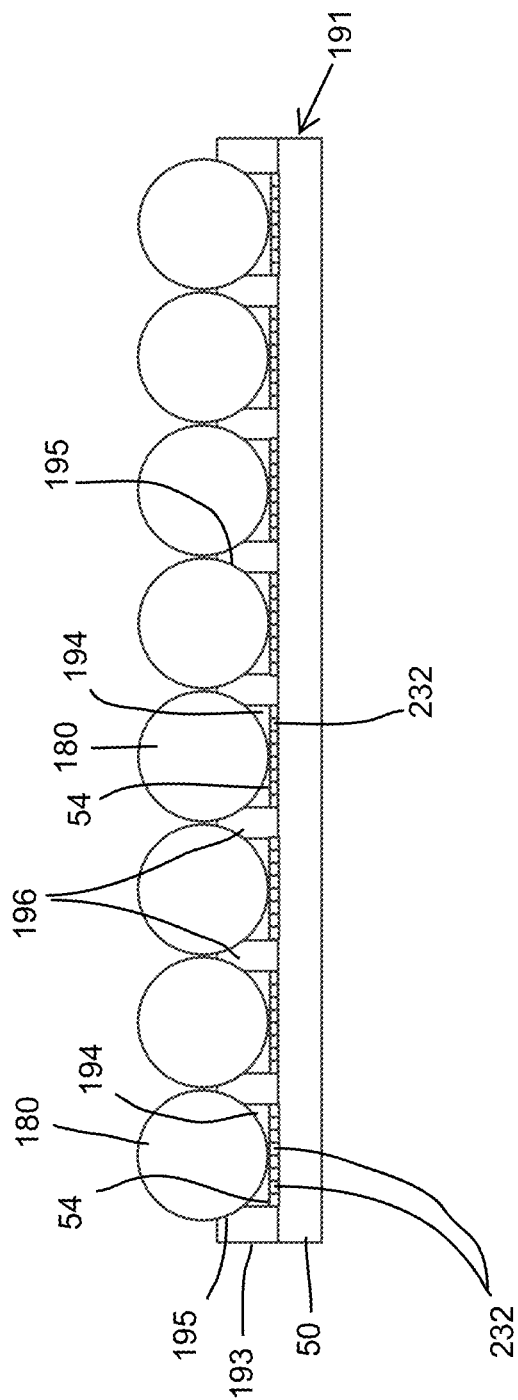
FIG. 46 is a schematic cross-section view of another embodiment of a body of a lens mounting structure, a plurality of ball lenses, and an exposure device, configured for use with an apparatus for producing a three-dimensional object, according to aspects of the disclosure.

In other embodiments, the focusing mechanism 66 may be configured for use with a different type of exposure assembly 60 with one or more different exposure devices 50. For example, as shown in FIGS. 45 and 46, the focusing mechanism 66 may be used with an exposure assembly 60 that does not include optical fibers 61 directing the waves 53 to the lenses 180. In one such embodiment, as shown in FIG. 45, the focusing mechanism 66 may further include a mirror array 230 that includes a plurality of mirrors 231 for directing the waves from the outlet or outlets (not shown) of the exposure device 50 to the lenses 180. For example, the mirrors 231 may be in the form of a plurality of micromirrors. This embodiment may be used with or without optical fibers 61, and the mirror array 230 may be used in connection with any exposure device 50 discussed herein, including lasers or LCD. In another such embodiment, as shown in FIG. 46, the exposure device 50 may have outlets 54 that are located proximate the lenses 180 and/or are supported by the lens mounting structure 191, due to the source of the waves 53 being positioned proximate the lenses 180. For example, as shown in FIG. 46, the exposure device 50 may include an array of micro-LEDs 232 configured to emit waves 53 toward the lenses 180. While only the micro-LEDs 232 emitting waves 53 into the ball lenses 180 are illustrated in FIG. 46, it is understood that the exposure device 50 may be in the form of a light wand or similar device that includes additional micro-LEDs 232 that are not activated during use. In another example, the exposure device 50 shown in FIG. 46 may be a micro LCD display (backlit), or any other device that is capable of creating an addressable array of points of emitted waves 53 at the focal plane of the lens 180.

The focusing mechanisms 66 in FIGS. 45 and 46 include many features in common with the embodiment of FIGS. 29-37, and some of such features of FIGS. 45 and 46 may not be described in detail again for the sake of brevity. As in the embodiment of FIGS. 29-37, the lens mounting structure 191 includes one or more bodies 193 that support the lenses 180 and guide or channel the waves 53 from the outlets 54 or the mirrors 231 to the lenses 180. It is understood that the lens mounting structure 191 in FIGS. 45 and 46 can be used similarly to the lens mounting structure 191 in FIGS. 29-37, such as by including two parallel rows of bodies 193 positioned over the two rows 188 of outlets 54 or mirrors 231, with each body 193 having a plurality of receivers 195 that each receive a portion of one of the ball lenses 180 and a plurality of conduits or tunnels 194 each extending through the body 193 from the outlets 54 or mirrors 231 to one of the receivers 195. Each of the rows of bodies 193 includes a plurality of bodies 193 positioned end-to-end along the row adjacent to and/or in contact with each other, with each body 193 supporting a plurality of ball lenses 180 (e.g., 8 lenses in one embodiment). In this configuration, waves 53 exit the outlets 54 or reflect from the mirrors 231 and travel through the conduit 194 aligned with the respective outlet 54 or mirror 231 to the reach the ball lens 180 in the receiver 195, where the waves 53 are focused to the exposure site 51. The body 193 may include a plurality of internal walls 196 that separate the conduits 194, as described herein. As also noted herein, the conduits 194 may be hollow or filled with a material that is permeable to the waves 53.

The secondary roller 151 may be configured and operated in accordance with any embodiment described herein. In another embodiment, the exposure assembly 60 of FIGS. 38-44 may be used in connection with a differently configured deposition mechanism 30 configured for both initial and final exposures, including an embodiment where a secondary roller 151 is not used for the initial exposure. For example, as discussed herein, a different type of thickness limiter may be used for the initial exposure, or the initial exposure may be conducted without a thickness limiter layer thickness (depth of cure) at the initial exposure site 150 can be regulated without a thickness limiter, such as by adjusting the exposure intensity and or by using certain additives in the resin. A mechanism for adjusting the spacing between the roller 42 and the secondary roller 151 as discussed herein may also be used to move the secondary roller 151 away from the roller 42 and out of position for use at the initial exposure site 150, permitting the secondary roller 151 to be used selectively for initial exposure as desired. Likewise, the secondary roller 151 may be moved into direct contact with the roller 42, to be used for stiffening and/or reinforcement of the roller 42 (e.g., when using high viscosity resins), rather than being used for an initial exposure. It is understood that the outlets 54 and focusing mechanisms 60 may not be configured for using exposure sites 51, 150 that are oriented 180° away from each other, such as the embodiments in FIGS. 25 and 26. In a further embodiment, the outlets 54 and the focusing mechanism 66 (including the ball lenses 180) as well as any supporting and adjusting structure therefor may be positioned within the secondary roller 151, and the circuit boards 181 and/or LEDs 59 may also be positioned within the secondary roller 151. The deposition mechanism 30 may further include a position sensor (not shown) for the secondary roller 151 that can sense any position changes, which may indicate debris on the secondary roller 151, such as resin that failed to transfer to the roller 42. This may indicate a build failure, and the operation of the deposition mechanism 30 can be stopped based on movement of the secondary roller 151 detected by the position sensor, until the situation can be addressed.

The deposition mechanism 30 in FIGS. 38-44 may also include a removal device 155 for removal of excess uncured flowable material 36, as described herein. In one embodiment, the removal device 155 may be in the form of additional rollers that rotate opposite to the rotation of roller 42 to move excess flowable material 36 off of the roller 42, as shown in FIGS. 40-41. Other types of removal devices 155 may be used in the embodiment of FIGS. 38-44, including any other configurations shown and/or described herein, e.g., a wiper or air knife. Multiple different types of such removal devices 155 may be used in combination in one embodiment. It is understood that other embodiments of deposition mechanisms, including the embodiment in FIGS. 29-37, may also use one or more removal devices 155 as shown and/or described herein.

The exposure assembly 60 in FIGS. 29-37 and the exposure assembly 60 in FIGS. 38-44, including the support beams 182, the circuit boards 181, the compartment 187, the temperature control element 170, the lens mounting structure(s) 191, the mounting beams 192, and the ball lenses 180, as well as potentially additional supporting structures, are each configured as a unitary assembly that can be inserted into the roller 42 and removed from the roller 42 as a unitary piece. In one embodiment, the unitary assembly may be connected to the carriage 32 and may be removable from the roller 42 by removing the roller 42, the vat 34, the secondary roller 151 (if present), and other components as part of a removable resin application module 110 as shown in FIG. 7 and described above. In another embodiment, the unitary assembly may be removably connected to the carriage 32 such that the unitary assembly is disconnected from the carriage and removed from within the roller 42.

In one embodiment, the deposition mechanism 30 may have an exposure assembly 60 with two (or more) different exposure devices 50 that are arranged on rotatable or other moveable mechanism to permit the direction of emission of the waves 53 for each exposure device to be changed. The exposure assembly 60 may be configured similar or identical to the exposure assembly 60 of FIGS. 38-44, such as including two (or more) sets 181A, 181B of circuit boards 181 and two (or more) arrays 180A, 180B of ball lenses 180 associated with the sets 181A, 181B of circuit boards 181. The aims of the exposure devices 50 may be oriented at 180° to each other in one embodiment, or may be arranged at different angles in another embodiment. In one configuration, substantially the entire exposure assembly 60, including at least the support beams 182, the sets 181A, 181B of circuit boards 181, the lens mounting structure(s) 191, the mounting beams 192, and the sets 180A, 180B of the ball lenses 180, as well as potentially additional supporting structures, is mounted on a rotating mechanism that rotates within the roller 42 to change the direction of emission of both the upper and lower exposure devices 50 simultaneously, as described above. This assembly may be mounted on a gimbal for such rotation/tilting, as similarly described herein and shown in FIG. 18. In another embodiment, each exposure device 50 may be individually moveable, including the circuit boards 181, the accompanying ball lenses 180, and other supporting structure. Changing the direction of emission in this manner can serve multiple functions. As one example, the position of the initial exposure site 150 may be changed, such as to move the initial exposure site 150 to a different thickness limiter or to direct the initial exposure site 150 to a location without a thickness limiter. As another example, the position(s) of the exposure site 51 and/or the initial exposure site 150 may be advanced or retarded as discussed herein with respect to FIG. 18. As a further example, the aim of the exposure devices 50 may be adjusted to focus the waves 53 on a defined point 134 within the build area 22 as the applicator 40 passes the defined point 134, to increase the exposure time of the defined point 134, as described herein with respect to FIGS. 19-20. As yet another example, the exposure devices 50 may be configured for emitting waves 53 having different characteristics, e.g., different wavelength, different power, different focus or image reduction/enlargement, etc., and the mechanism can direct the exposure devices 50 so the exposure device 50 emitting waves 53 with the desired characteristics is used for the exposure site 51 and/or the initial exposure site 150. In an embodiment such as shown in FIGS. 38-44, the two exposure devices 50 could be selectively and alternately directed at the exposure site 51 or the initial exposure site 150 as desired, through the use of such a mechanism. It is understood that further functionality can be achieved by this mechanism.

Figure 5:
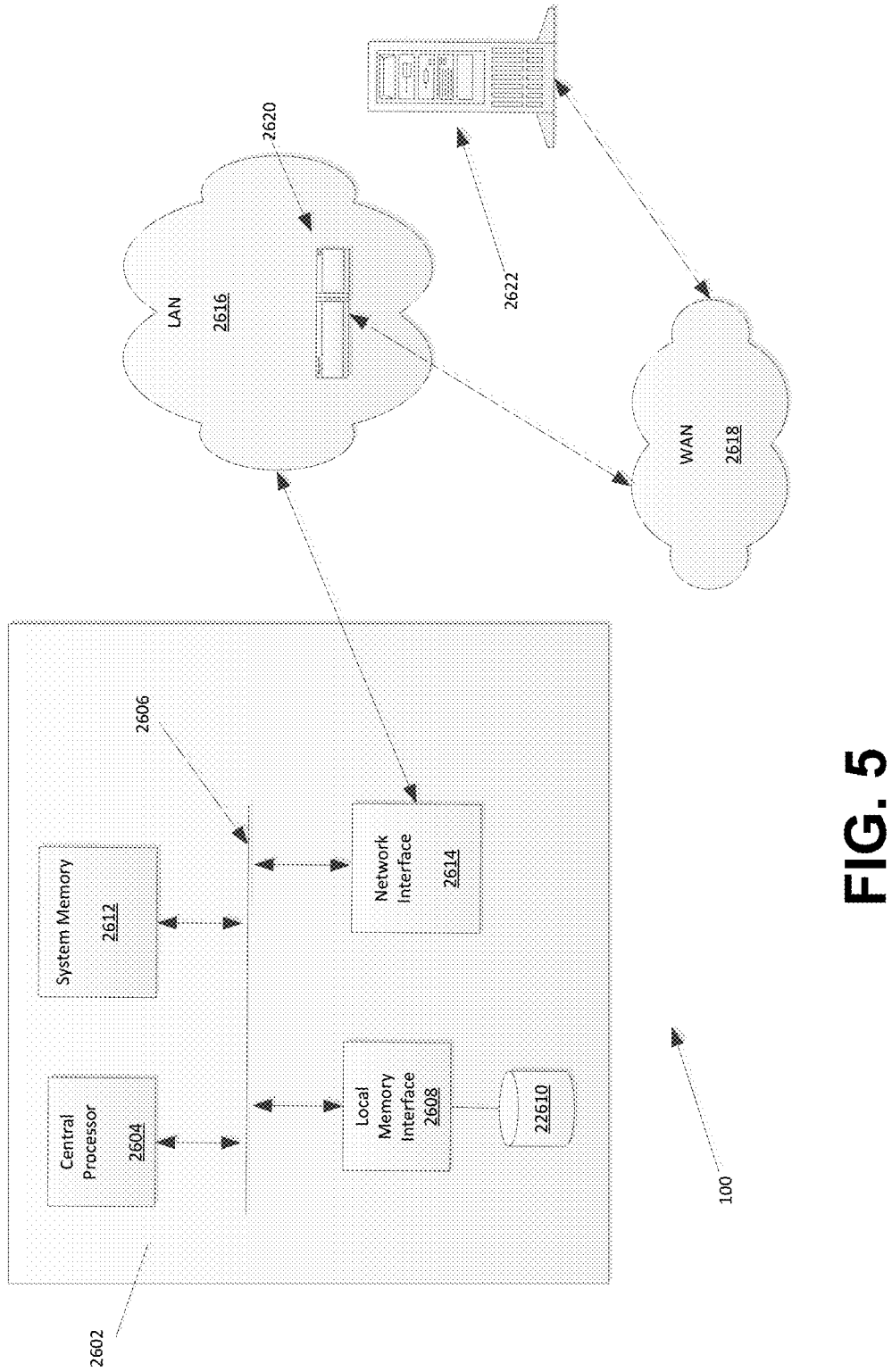
FIG. 5 is a schematic view of a controller according to aspects of the disclosure.
Figure 6:
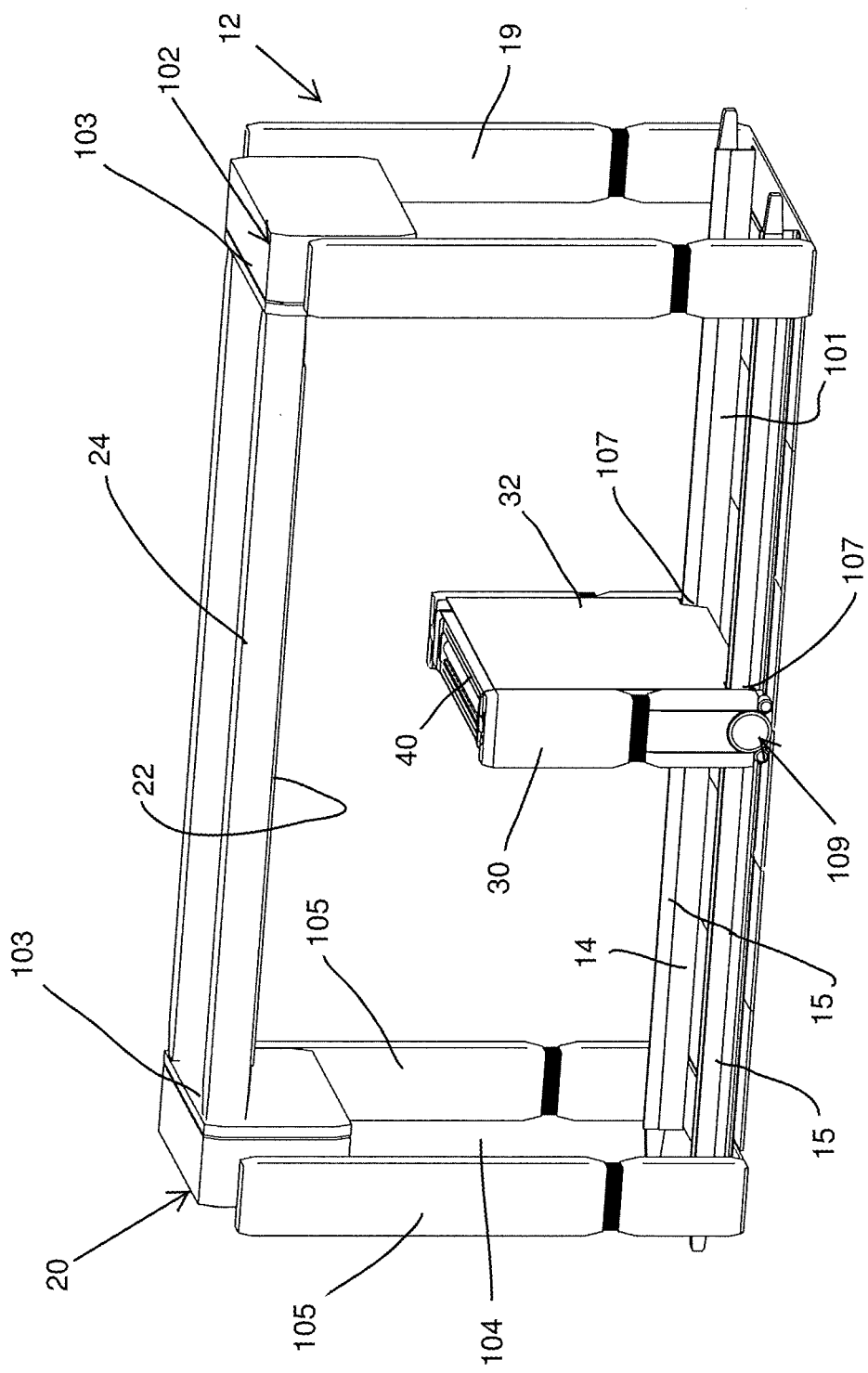
FIG. 6 is a perspective view of another embodiment of an apparatus for producing a three-dimensional object in operation, according to aspects of the disclosure.

The system 10 may also include a controller 100 that is configured to control and/or monitor the operation of one or more mechanisms of the apparatus 12, including numerous examples described herein. FIG. 5 illustrates one embodiment of a controller 100 that is implemented with a computer system, such as computer 2602. Computer 2602 includes a central processor 2604 that controls the overall operation of the computer and a system bus 2606 that connects central processor 210 to the components described below. System bus 2606 may be implemented with any one of a variety of conventional bus architectures.

Computer 2602 may include a variety of interface units and drives for reading and writing data or files. For example, computer 2602 may include a memory interface 2608 coupling a memory drive 2610 to system bus 2606. Memory drive 2610 may be implemented with physical memory device, magnetic memory device, optical memory device or other type of memory device. Memory drive 2610 may store data, CAD files, and other electronic files that are used to produce three-dimensional objects as described herein. A system memory 2612 may be included and implemented with a conventional computer readable medium memory having a read only memory section that stores a basic input/output system (BIOS) and a random access memory (RAM) that stores other data and files. Memory drive 2610 and system memory 2612 may both contain computer-executable instructions designed to be executed by processor 2604. In some embodiments, one or more control programs for operating one or more apparatuses 12 and/or multiple components (e.g., multiple deposition mechanisms 30) within each apparatus 12 may be stored in memory drive 2610 and/or system memory 2612.

Computer 2602 may include additional interfaces for connecting peripheral devices to system bus 2606. For example, computer 2602 may also include a network interface 2614 that couples system bus 2602 to local area network (LAN) 2616. LAN 2616 may have one or more of the well-known LAN topologies and may use a variety of different protocols, such as Ethernet. A wide area network (WAN) 2618, such as the Internet, may also be accessed by computer 2602. FIG. 26 shows a router 2620 that may connect LAN 2616 to WAN 2618 in a conventional manner. A server 2622 is shown connected to WAN 204. Of course, numerous additional servers, computers, handheld devices, personal digital assistants, telephones and other devices may also be connected to WAN 2618. In some embodiments, server 2622 stores data, CAD files, control programs and/or other electronic files that may be accessed by computer 2602 and used to produce three-dimensional objects as described herein.

Various embodiments are described herein with various combinations of features and components. It is understood that the features and components of each of the various embodiments described herein may be incorporated into other embodiments described herein.

The use of the system and apparatus described herein provides benefits and advantages over existing technology. For example, consumable cost is greatly decreased, as the apparatus generates little waste and does not require maintaining a large vat of material to be solidified for manufacturing, as do many current technologies. Additionally, the structure of the apparatus does not dictate any specific size limits, and the apparatus may be configured to create an object that is significantly larger than existing technologies. The length of the track and the width of the applicator can be increased as desired without negatively affecting performance, and the size of the room in which the apparatus sits becomes the limit of the size of the apparatus. Further, the apparatus may be configured for manufacturing an object or multiple objects many times faster than any existing technology. The apparatus also provides the ability to manufacture objects from multiple materials, including objects that have removable support structure that is made from a material different from that of the main object. Production of objects from multiple materials that require different exposure sources is enabled as well. The apparatus further provides the ability to manufacture functional objects, such as a window or other transparent object, or a conductive object. Still further, objects manufactured using the apparatus described herein may not require draining liquid material from any internal cavities of the finished object, which may require drilling a hole for drainage. The apparatus is also capable of producing clean, dry, and fully-cured objects, which increases production efficiency. The modular configuration of the apparatus also great versatility, customizability, and other benefits.

Additional advantages are provided by the configuration of the deposition mechanism 30 as an autonomous unit 90 with a vertical adjustment mechanism 120, in combination with a track 14 that can be engaged and disengaged by the unit 90 and a build platform 22 associated with the track 14 and configured for manufacturing of an object 11 in a downward layer-by-layer technique. This configuration permits multiple deposition mechanisms 30 to operate on the same track 14 to apply multiple layers to one or more objects 11 simultaneously. Multiple deposition mechanisms 30 operating on the same track 14 may combine to build one or more objects 11 or may build multiple objects 11 separately and simultaneously on the same build platform 22. This configuration also enables building multiple objects of the same or different materials in separate locations on the same build platform 22 in a rapid manner. This configuration also facilitates maintenance of the deposition mechanism 30, as an autonomous unit 90 can be removed from the production process for maintenance quickly and easily, and may also be quickly and easily replaced with another unit 90 to achieve substantially uninterrupted production. A system including multiple such units 90 can operate with a number of different build platforms 22, such as in a large production facility, where the units 90 can be assigned and re-assigned to specific build areas 13 as needed for optimized production. Still other benefits and advantages over existing technology are provided by the systems, apparatuses, and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A deposition mechanism configured for producing a three-dimensional object within a build area using a flowable material in a layer-by-layer technique, the deposition mechanism comprising:
    a carriage configured for movement relative to the build area;
    an applicator configured for applying the flowable material at an application site within the build area to produce the three-dimensional object;
    an exposure device configured for emitting electromagnetic waves, the exposure device having an array of outlets configured for emitting electromagnetic waves toward an exposure site within the build area to solidify applied flowable material applied by the applicator to produce the three-dimensional object; and
    a lens array positioned between the outlets of the exposure device and the exposure site and configured to focus the electromagnetic waves exiting the outlets toward the exposure site, wherein the lens array comprises a plurality of ball lenses,
    wherein the plurality of ball lenses are arranged in a first row and a second row, such that the ball lenses in the first row are offset from the ball lenses in the second row in an x-direction with respect to the deposition mechanism, and
    wherein the ball lenses in the first row and the ball lenses in the second row are configured to focus the electromagnetic waves together along a line extending in a y-direction with respect to the deposition mechanism.

2. The deposition mechanism of claim 1, wherein the applicator comprises a supply of the flowable material mounted on the carriage and a roller in communication with the supply of the flowable material and rotatably mounted on the carriage, wherein the roller is configured for rotating to carry the flowable material to the application site for application to produce the three-dimensional object.

3. The deposition mechanism of claim 2, wherein the exposure device further has a second array of outlets configured for emitting the electromagnetic waves to an initial exposure site located adjacent to the roller within the supply of the flowable material, to at least partially solidify a layer of the flowable material, and wherein the roller is configured for rotating to carry the layer of the flowable material to the application site, the deposition mechanism further comprising:
    a second lens array positioned between the second array of outlets of the exposure device and the initial exposure site and configured to focus the electromagnetic waves exiting the second array of outlets toward the initial exposure site, wherein the second lens array comprises a plurality of second ball lenses.

4. The deposition mechanism of claim 3, wherein each second ball lens is configured to reduce an image formed by the electromagnetic waves passing through the respective second ball lens.

5. The deposition mechanism of claim 2, wherein the ball lenses are configured to focus the electromagnetic waves together along the line, such that the line extends along a length of the roller at the exposure site.

6. The deposition mechanism of claim 1, wherein the ball lenses are configured to focus the electromagnetic waves emitted by a plurality of the outlets and to reduce an image formed by the electromagnetic waves emitted by the plurality of the outlets.

7. The deposition mechanism of claim 1, wherein the plurality of ball lenses comprises:
a first ball lens configured to focus the electromagnetic waves emitted by a first plurality of the outlets and to reduce an image formed by the electromagnetic waves emitted by the first plurality of the outlets; and
a second ball lens configured to focus the electromagnetic waves emitted by a second plurality of the outlets and to reduce an image formed by the electromagnetic waves emitted by the second plurality of the outlets.

8. The deposition mechanism of claim 7, wherein the first ball lens is in the first row, and the second ball lens is in the second row, and wherein the first ball lens and the second ball lens are offset from each other in both the x-direction and the y-direction with respect to the deposition mechanism.

9. The deposition mechanism of claim 1, wherein the ball lenses in the first row are also offset from the ball lenses in the second row in the y-direction with respect to the deposition mechanism.

10. An apparatus comprising the deposition mechanism of claim 1 and a support assembly having a build platform with the build area defined adjacent to the build platform.

11. The apparatus of claim 10, further comprising a track extending proximate to the build area, wherein the carriage of the deposition mechanism is connected to the track and is configured to travel along the track adjacent to the build area for building the object.

12. The deposition mechanism of claim 1, further comprising:
a lens mounting structure configured for mounting the plurality of ball lenses, the lens mounting structure comprising one or more bodies having a plurality of receivers each receiving one of the ball lenses and a plurality of conduits aligned with the receivers, the conduits extending through the one or more bodies from the outlets to the receivers, such that the electromagnetic waves emitted by the outlets travel through the conduits to the ball lenses received in the receivers.

13. The deposition mechanism of claim 1, wherein:
the exposure device comprises a plurality of circuit boards, each circuit board having a plurality of light emitting devices connected thereto, and a plurality of optical fibers extending from the plurality of light emitting devices to form the array of outlets; and
the deposition mechanism further comprises a supporting structure mounting the plurality of circuit boards on the carriage.

14. The deposition mechanism of claim 13, wherein the plurality of ball lenses are reducing lenses positioned between the outlets of the exposure device and the exposure site and configured to focus the electromagnetic waves exiting the outlets toward the exposure site, wherein the reducing lenses are further configured to reduce an image formed by the electromagnetic waves emitted by the plurality of the outlets.

15. The deposition mechanism of claim 13, wherein the supporting structure comprises a support beam having a plurality of slots distributed along a length of the support beam, each slot receiving one of the circuit boards.

16. The deposition mechanism of claim 13, wherein the supporting structure comprises first and second support beams each having a plurality of slots distributed along a length thereof, wherein the slots of the first and second support beams are arranged in pairs, such that each circuit board is received in one of the pairs of the slots.

17. The deposition mechanism of claim 13, wherein each of the circuit boards has a first terminal on a front surface and a second terminal on a rear surface opposite the front surface, wherein the support structure mounts the circuit boards such that the first terminals of the circuit boards contact the second terminals of adjacent circuit boards to electrically connect the circuit boards together.

18. The deposition mechanism of claim 13, wherein the exposure device has a second array of outlets configured for emitting electromagnetic waves toward a second exposure site to partially solidify the flowable material prior to application by the applicator to produce the three-dimensional object, wherein the exposure device further comprises a plurality of second circuit boards, each second circuit board having a plurality of second light emitting devices connected thereto, and a plurality of second optical fibers extending from the plurality of second light emitting devices to form the second array of outlets, the deposition mechanism further comprising:
a second supporting structure mounting the plurality of second circuit boards on the carriage.

19. The deposition mechanism of claim 13, wherein each circuit board further includes an arm connected to the circuit board and extending from the circuit board, and a holder connected to the arm, each holder having a slot, wherein the slots of the holders hold exit ends of the plurality of optical fibers.

20. The deposition mechanism of claim 1, wherein the ball lenses are configured to reduce an image formed by the electromagnetic waves emitted by the plurality of the outlets.

21. An assembly for use with a deposition mechanism configured for producing a three-dimensional object within a build area using a flowable material in a layer-by-layer technique, the assembly comprising:
an exposure device configured for emitting electromagnetic waves, the exposure device having an array of outlets configured for emitting electromagnetic waves toward an exposure site to solidify applied flowable material to produce the three-dimensional object, wherein the exposure device comprises a plurality of circuit boards, each circuit board having a plurality of light emitting devices connected thereto, and a plurality of optical fibers extending from the plurality of light emitting devices to form the array of outlets; and
a lens array positioned between the outlets of the exposure device and the exposure site and configured to focus the electromagnetic waves exiting the outlets toward the exposure site, wherein the lens array comprises a plurality of ball lenses,
wherein the plurality of ball lenses are arranged in a first row and a second row, such that the ball lenses in the first row are offset from the ball lenses in the second row in an x-direction with respect to the deposition mechanism, and wherein the ball lenses in the first row and the ball lenses in the second row are configured to focus the electromagnetic waves together along a line extending in a y-direction with respect to the deposition mechanism at the exposure site.

22. The assembly of claim 21, further comprising:

a lens mounting structure configured for mounting the plurality of ball lenses, the lens mounting structure comprising one or more bodies having a plurality of receivers each receiving one of the ball lenses and a plurality of conduits aligned with the receivers, the conduits extending through the one or more bodies from the outlets to the receivers, such that the electromagnetic waves emitted by the outlets travel through the conduits to the ball lenses received in the receivers.

23. The assembly of claim 21, further comprising:

a supporting structure mounting the plurality of circuit boards, the supporting structure comprising first and second support beams each having a plurality of slots distributed along a length thereof, wherein the slots of the first and second support beams are arranged in pairs, such that each circuit board is received in one of the pairs of the slots.

24. The assembly of claim 21, further comprising:

a roller in configured for rotating to carry the flowable material to an application site for application to produce the three-dimensional object, wherein the line extends proximate an outer surface of the roller and along a length of the roller.

\* \* \* \* \*